US012780618B2

(12) United States Patent
Brda et al.

(10) Patent No.: US 12,780,618 B2
(45) Date of Patent: Nov. 3, 2026

(54) REMOTE RADIO CONTROL SYSTEM FOR CRANES AND OTHER MOBILE EQUIPMENT

(71) Applicant: Hubbell Incorporated, Shelton, CT (US)

(72) Inventors: Charles Brda, Archdale, NC (US); Robert John Clyde, Reading, PA (US); Roger William Deihm, Mohnton, PA (US); Paul Fetzer, Archdale, NC (US); Robert Ryan Jacobs, New Holland, PA (US); Ashley Elizabeth Kaufman, Reading, PA (US); Jonathan King, Archdale, NC (US); Alec Michael Mercer, New Holland, PA (US); Joe Albert Uhl, Jr., Boyertown, PA (US); Joseph Charles Walter, Wernersville, PA (US); John Victor Zukas, Zionsville, PA (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 18/941,781

(22) Filed: Nov. 8, 2024

(65) Prior Publication Data

US 2025/0153976 A1 May 15, 2025

Related U.S. Application Data

(60) Provisional application No. 63/597,773, filed on Nov. 10, 2023, provisional application No. 63/597,778, filed on Nov. 10, 2023.

(51) Int. Cl.
*B66C 13/44* (2006.01)
*B66C 13/40* (2006.01)
(Continued)

(52) U.S. Cl.
CPC .............. *B66C 13/44* (2013.01); *B66C 13/40* (2013.01); *B66C 23/00* (2013.01); *H02P 23/00* (2013.01); *H02P 25/032* (2016.02)

(58) Field of Classification Search
CPC ......... B66C 13/44; B66C 13/40; B66C 23/00; H02P 23/00
See application file for complete search history.

(56) References Cited

U.S. PATENT DOCUMENTS 8,339,093 B2 * 12/2012 Lu .......................... H02P 27/047 331/25
9,691,304 B2 * 6/2017 Votolato .................. G09F 7/205
(Continued)

FOREIGN PATENT DOCUMENTS

WO 2022/117669 A1 6/2022
WO 2022/251550 A2 12/2022

OTHER PUBLICATIONS

International Search Report dated Jan. 17, 2025, which issued in the corresponding PCT Application PCT/US2024/055170.

*Primary Examiner* — John A Tweel, Jr.
(74) *Attorney, Agent, or Firm* — Dickinson Wright PLLC

(57) ABSTRACT

A platform for an improved radio control system for mobile equipment (e.g., crane) is provided that has different types of Transmitters (Basic Transmitter, Standard Transmitter, Belly Box Transmitter, and Mill-Style Belly Box Transmitter) and different types of Receivers (Standard Crane Mount Receiver, Digital Receiver, Expandable Receiver operable with different internal expansion cards, and different external Receiver boards) from which users can create a customized radio system for their desired radio controlled machine application (e.g., a DC Radio System, or an AC Radio System, for industrial and commercial environments). Transmitters have platform-wide battery pack and charger compatibility. Transmitters/Receivers have USB connec-
(Continued)

tions to obtain data logs, and various indicators (e.g., tricolor LEDs) for battery status, pairing status, and/or operational configuration or status (e.g., fault). Transmitters/Receivers are supplied with a basic Configuration or a Customer Specific Configuration; and a button interface, or a configuration software application and interface, to modify configuration.

8 Claims, 36 Drawing Sheets

(51) Int. Cl.

| | |
|---|---|
| ***B66C 23/00*** | (2006.01) |
| ***H02P 23/00*** | (2016.01) |
| ***H02P 25/032*** | (2016.01) |

(56) References Cited

U.S. PATENT DOCUMENTS

| | | | | |
|---|---|---|---|---|
| 12,043,524 | B2 * | 7/2024 | Appling, Jr. | H04L 67/12 |
| 2003/0209638 | A1 | 11/2003 | Peltz | |
| 2009/0309693 | A1 | 12/2009 | Loeffler et al. | |
| 2014/0306712 | A1 | 10/2014 | Esnard-Domerego | |
| 2015/0117506 | A1 | 4/2015 | Simpson et al. | |
| 2016/0031683 | A1 | 2/2016 | Fenker et al. | |
| 2017/0053569 | A1 | 2/2017 | Votolato | |
| 2017/0148308 | A1 | 5/2017 | Devlin | |
| 2019/0020247 | A1 | 1/2019 | Shahi et al. | |
| 2021/0234393 | A1 | 7/2021 | Sultenfuss et al. | |
| 2021/0325472 | A1 | 10/2021 | Lee et al. | |
| 2022/0179010 | A1 | 6/2022 | Fukushima | |
| 2022/0258029 | A1 | 8/2022 | Crockett | |

* cited by examiner

REMOTE RADIO CONTROL SYSTEM FOR CRANES AND OTHER MOBILE EQUIPMENT

This application claims the benefit of U.S. Provisional Patent Application Ser. No. 63/597,773, filed on Nov. 10, 2023, and U.S. Provisional Patent Application Ser. No. 63/597,778, filed on Nov. 10, 2023, which are hereby incorporated herein by reference in their entireties.

BACKGROUND

Field

The present disclosure relates generally to a system to control a piece of moving equipment, machine or device (e.g., a crane). More specifically, the present disclosure relates generally to a remote radio control system that allows an operator to use a battery powered, wireless transmitter to communicate with a powered receiver connected or otherwise mounted to a Radio-Controlled Machine (RCM) device such as a crane or other mobile equipment to operate that RCM device (e.g., to control motion of that RCM device).

Description of Related Art

A crane is a type of device that can be used both to lift and lower materials and to move them horizontally. It is mainly used for lifting heavy objects and transporting them to other places. The device uses one or more simple machines to create mechanical advantage and thus move loads beyond the normal capability of a human. Cranes are commonly employed in transportation for the loading and unloading of freight, in construction for the movement of materials, and in manufacturing for the assembling of heavy equipment.

Before the rise of radio controls, cranes were operated with one of two kinds of controls: bridge-mounted cab controls or wired pendant controls. The biggest problem with cab controls is that most applications require more than one person to complete. The crane operator often needs assistance on the floor to rig and position a load, and many operations will require a spotter or relay person to direct the operator through visual or verbal instructions.

Wired pendant controls address these problems by placing the operator on the floor near the load. The operator can rig and position the load, and the possibility of a direct line of sight may eliminate the need for a spotter. But wired pendant controls have a few disadvantages as well. They require the operator to follow the crane's path along the floor, which may increase the risk of trip or fall hazards and may slow down operations in situations when the crane could move faster than the operator can walk safely. Wired pendant controls also require the operator to always remain close to the load. This proximity can be especially dangerous when working with heavy or hazardous loads, which increases the risk of injury to the operator. The operator must avoid the load and take care to avoid tangling cables, which can be both unsafe and time-consuming.

Wireless remote radio controls address the problems of cab and wired pendant controls and provide the benefits of both. The operator can perform the rigging and guiding tasks on the floor, so operations require fewer workers to be pulled from other duties. The operator can also have better visibility, as he or she can potentially move to the location on the floor that will provide the best view of the crane operation, possibly eliminating the need for extra spotters or relay persons.

Wireless remote radio controls for cranes, however, have a number of drawbacks such as radio receivers that are too simplistic in providing only two speeds for controlling motorized functions, and that are not easily configurable for use with different types of cranes or other remote controlled equipment or for different applications. For example, some manufacturers of industrial radio transmitters and receivers incorporate some unique features into their radio-controlled product line, but their product line is otherwise not customizable to allow users to customize a commercially available radio control transmitter and/or receiver to their particular application.

SUMMARY

The above and other problems are overcome, and additional advantages are realized, by illustrative embodiments.

An illustrative embodiment of the present disclosure provides a kit comprising at least one transmitter and at least one receiver configured to be paired for wireless communication with each other to control operations of one or more radio controlled machine (RCM) devices. Each receiver among the at least one receiver has electrical outputs connected to respective motorized controls in the radio controlled machine. Each transmitter among the at least one transmitter has configurable user input interfaces, with the transmitter being operable to generate command signals to operate one or more of the motorized controls in response to user manipulation of the corresponding ones of the user input interfaces, and to send the command signals to the receiver, and the receiver being operable to provide output signals to the corresponding one or more of the motorized controls to operate in accordance with the command signals.

In accordance with aspects of illustrative embodiments, the kit further comprises a RCM Configuration Generator application to create a configuration file for at least one transmitter among the at least one transmitter that describes mapping of user manipulation of the user input interfaces that corresponds to transmitter motion speed/direction selections into the output signals of the at least one receiver.

In accordance with aspects of illustrative embodiments, the kit further comprises a RCM Interface application configured for a user to interface, manipulate, and visualize details of at least one RCM device among the one or more RCM devices.

In accordance with aspects of illustrative embodiments, the RCM Interface application is a Windows Operating System Application.

In accordance with aspects of illustrative embodiments, a user can connect at least one RCM device among the one or more RCM devices via a USB connection to a Windows-based computer, and manipulate and interact with that RCM device to perform one or more tasks chosen from transfer of configuration settings, retrieval of operational logs, and initiation of equipment diagnostics.

In accordance with aspects of illustrative embodiments, the RCM Interface application is configured to process the configuration file and transfer configuration settings therefrom to the transmitter.

In accordance with aspects of illustrative embodiments, the kit further comprises a DIP switch provided on the at least one transmitter and on the at least once receiver and configured to allow a user to form DIP switch settings for the corresponding one of the at least one transmitter and the at least one receiver.

In accordance with aspects of illustrative embodiments, the kit further comprises a battery compartment provided in the at least one transmitter and configured to accommodate one or more removable batteries, and wherein the DIP switch is accessible in the battery compartment.

In accordance with aspects of illustrative embodiments, the DIP switch provided on the at least one transmitter is configured to assign a function to a configurable user input interface on the transmitter chosen from a Motion function, and an Auxiliary function, wherein the Auxiliary function is chosen from A/B transmitter functionality, single relay contact enable function, and Momentary/Toggle ON-OFF, Inactivity Time Selection.

In accordance with aspects of illustrative embodiments, the DIP switch provided on the at least one receiver is configured with a DIP switch setting array that permits a user to configure unique settings to the receiver for features chosen from selection of configuration by dip switch control or RCM configuration, relay output for speed operation, external sounder present, channel selection, and system configuration.

In accordance with aspects of illustrative embodiments, the at least one transmitter and at least one receiver are configured to be paired for an operational configuration chosen from pitch and catch, tandem, and festoonless.

Another illustrative embodiment of the present disclosure provides a transmitter for controlling operations of a remote controlled machine (RCM) device having one or more motorized controls for moving at least one component associated with the RCM device, the transmitter comprising: an antenna configured to wirelessly transmit radio frequency signals to one or more remote receivers to which the transmitter is paired; configurable user input interfaces; a battery compartment configured to receive one or more batteries; a battery monitor/power management circuit; and a processor connected to the antenna, the configurable user input interfaces, and the battery monitor/power management circuit. The processor is configured to generate command signals to operate one or more of the motorized controls in response to user manipulation of the corresponding ones of the user input interfaces, and to send the command signals to the one or more remote receivers.

In accordance with aspects of illustrative embodiments, the battery monitor/power management circuit comprises an electrically erasable programmable read-only memory (EEPROM).

In accordance with aspects of illustrative embodiments, the battery monitor/power management circuit is programmed to monitor current supplied by the one or more batteries and voltage of the one or more batteries to determine expected operating time left for the transmitter.

In accordance with aspects of illustrative embodiments, the battery monitor/power management circuit is programmed to track charging cycles, initial amp hour capacity and current amp hour capacity of the one or more batteries.

In accordance with aspects of illustrative embodiments, the battery compartment is configured to be a quick connect battery compartment to electrically connect the one or more batteries to provide power to any of the antenna, the processor, the battery monitor/power management circuit, and other components in the transmitter.

In accordance with aspects of illustrative embodiments, the transmitter further comprises a USB-C connection.

In accordance with aspects of illustrative embodiments, the one or more batteries are charged through the USB-C connection (e.g., in Basic and Standard Transmitters described below). The Standard Transmitter, Belly Box Transmitter, and Mill Style Belly Box Transmitter described below can have their batteries charged through an external battery charger.

In accordance with aspects of illustrative embodiments, the user can use the USB-C connection to access data logs of the transmitter comprising information chosen from RCM-device operations, fault occurrences, operation time, pairing configuration, and condition of the one or more batteries.

In accordance with aspects of illustrative embodiments, the transmitter further comprises an indicator to indicate at least one of battery health, pairing status with the one or more receivers, and fault.

In accordance with aspects of illustrative embodiments, the transmitter further comprises a pendulum switch mounted therein, and the processor is programmed to monitor the pendulum switch and disable the transmitter when the pendulum switch is tipped a selected number of degrees from at least one of a designated normal front to back position and a designated normal back to front position.

In accordance with aspects of illustrative embodiments, the transmitter further comprises a display. The processor is programmed to convey information to the operator via the display, the information being chosen from motion indication, maintenance mode, diagnostics, battery status, pairing selections, device name of each of the one or more receivers paired to the transmitter, E-Stop switch activation status, and tilt warning.

In accordance with aspects of illustrative embodiments, the transmitter is arranged in a belly box housing having configurable paddle switches, and auxiliary switches chosen from a pushbutton switch, a two position toggle switch, a three position toggle switch, a two though ten position configurable selector switch, and an analog switch.

In accordance with aspects of illustrative embodiments, the four position selector switch and the analog switch each have a dedicated input to the processor.

In accordance with aspects of illustrative embodiments, the belly box housing comprises an instrument surface on which the configurable paddle switches and the auxiliary switches are arranged, and a cage bar mounted externally with respect to the belly box housing and extending from the instrument surface to prevent inadvertent activation of paddle switches and the auxiliary switches when the transmitter is dropped.

In accordance with aspects of illustrative embodiments, the cage bar comprises at least one curved portion that provides a hand position portion that ergonomically supports the user's hands while operating the transmitter.

In accordance with aspects of illustrative embodiments, the transmitter further comprises RCM interface software to provide user configuration settings to the transmitter, and RCM interface software conveys information to the processor to configure the radio frequency signals transmitted to the one or more receivers to implement desired functions of the motorized controls of the RCM device. For example, the receiver defines the radio frequencies (channel selection) of operation through a DIP switch setting on the receiver. The transmitter searches through all frequencies (channels) to find a particular receiver.

Yet another illustrative embodiment of the present disclosure provides a receiver for controlling operations of a remote controlled machine (RCM) device having one or more motorized controls for moving at least one component associated with the RCM device, the receiver comprising: an antenna configured to wirelessly receive radio frequency control signals from a remote transmitter; a power interface coupled to a RCM device power source; a processor; and a plurality of configurable control outputs. The processor is configured to process signals received from a remote TX via the antenna and generate corresponding output signals to the one or more motorized controls in the RCM device via at least one of the plurality of configurable control outputs to control the one or more motorized controls in the RCM device.

In accordance with aspects of illustrative embodiments, the receiver comprises a controller area network (CAN) bus interface to communicate with one or more external cards for controlling operation of the RCM device.

In accordance with aspects of illustrative embodiments, the external cards can be mounted to the receiver via one of snap-track mounting or enclosure mounting.

In accordance with aspects of illustrative embodiments, the external cards comprises outputs chosen from relay outputs to operate an AC or DC RCM device, analog outputs to control a variable frequency drive RCM device, and a latching relay output for motorized control to remain in current state during loss of power.

In accordance with aspects of illustrative embodiments, each of the external cards comprises at least one indicator for fault occurrences.

In accordance with aspects of illustrative embodiments, the receiver further comprises at least one indicator operated by the processor to indicate a condition of the receiver chosen from Power status, pairing status, CANbus status, and fault occurrence.

In accordance with aspects of illustrative embodiments, the receiver further comprises a DIP switch to configure receiver settings unique to that Receiver for features chosen from selection of configuration via Dip Switch Control or RCM interface software configuration, Relay Output Speed operation, External Sounder Present, Channel Selection, and System Configuration.

It is an aspect of illustrative embodiments to provide a receiver for controlling operations of a remote controlled machine (RCM) device having one or more motorized controls for moving at least one component associated with the RCM device, the receiver comprising: an antenna configured to wirelessly receive radio frequency signals; a power interface coupled to RCM device power; a processor; and a plurality of card slots, each card slot being configured to removably receive an expansion card chosen from a group of expansion cards having different types of control outputs, a plurality of the control outputs of the expansion cards connected to respective ones among the plurality of card slots being configurable depending on the type of the RCM device and the operations of the RCM device that are to be controlled. The processor is configured to process signals received from a remote transmitter via the antenna and generate corresponding output signals to the one or more motorized controls in the RCM device via at least one of the plurality of configurable control outputs to control the one or more motorized controls in the RCM device. The configurable control outputs are chosen from a plurality of control output types comprising a Form A relay contact output, a Form C relay contact output, a DC relay output, a latching relay output, and an analog output. In addition to the Card slot expansion cards, an external expansion card connects to the receiver through the CAN bus interface for additional control outputs.

In accordance with aspects of illustrative embodiments, a quantity of the configurable control outputs can be selected from a range of 1 through 48 control outputs. Through the external expansion cards up to 256 control outputs can be selected.

In accordance with aspects of illustrative embodiments, the group of expansion cards comprises expansion cards configured with respective ones of the plurality of control output types.

In accordance with aspects of illustrative embodiments, the antenna receives from the remote transmitter radio frequency signals in accordance with a 900 MegaHertz (MHz) wireless communication protocol.

In accordance with aspects of illustrative embodiments, the receiver further comprises a controller area network bus (CANbus) interface.

In accordance with aspects of illustrative embodiments, at least one of the expansion cards connected to a respective one of the plurality of card slots comprises a controller area network bus (CANbus) interface.

In accordance with aspects of illustrative embodiments, the receiver further comprises at least one of an indicator chosen from an optical indicator for indicating diagnostic conditions of the receiver, an optical indicator mounted externally on the receiver, an audible indicator mounted externally on the receiver, and a connector configured to be connected to an external audible indicator.

In accordance with aspects of illustrative embodiments, the processor is configured to operate the indicator to output a first type of indication that corresponds to the receiver being powered, and to output a second type of indication that corresponds to the receiver and the processor being operational to process signals received from the remote transmitter and to generate the corresponding output signals.

In accordance with aspects of illustrative embodiments, the processor is configured to operate the indicator to output a third type of indication that corresponds to the receiver being paired to the remote transmitter, and to output a fourth type of indication that corresponds to at least one of a receiver fault and the receiver being unable to pair to the remote transmitter.

In accordance with aspects of illustrative embodiments, the receiver further comprises a configurable power source.

In accordance with aspects of illustrative embodiments, the receiver further comprises at least one external card connected to the receiver via snap-track or enclosure mounting and installed through a CANbus interface.

In accordance with aspects of illustrative embodiments, at least one external card can have outputs chosen from relay outputs to operate an AC RCM device, a DC RCM device, analog outputs to control a RCM device with variable frequency device, and a latching relay output to remain in current state during loss of power.

Additional and/or other aspects and advantages of illustrative embodiments will be set forth in the description that follows, or will be apparent from the description, or may be learned by practice of the illustrative embodiments. The illustrative embodiments may comprise apparatuses and methods for operating same having one or more of the above aspects, and/or one or more of the features and combinations thereof. The illustrative embodiments may comprise one or more of the features and/or combinations of the above aspects as recited, for example, in the attached claims.

BRIEF DESCRIPTION OF THE DRAWINGS

The above and/or other aspects and advantages of the illustrative embodiments will be more readily appreciated from the following detailed description, taken in conjunction with the accompanying drawings.

Throughout the drawing figures, like reference numbers will be understood to refer to like elements, features and structures.

DETAILED DESCRIPTION OF ILLUSTRATIVE EMBODIMENTS

Figure 1:
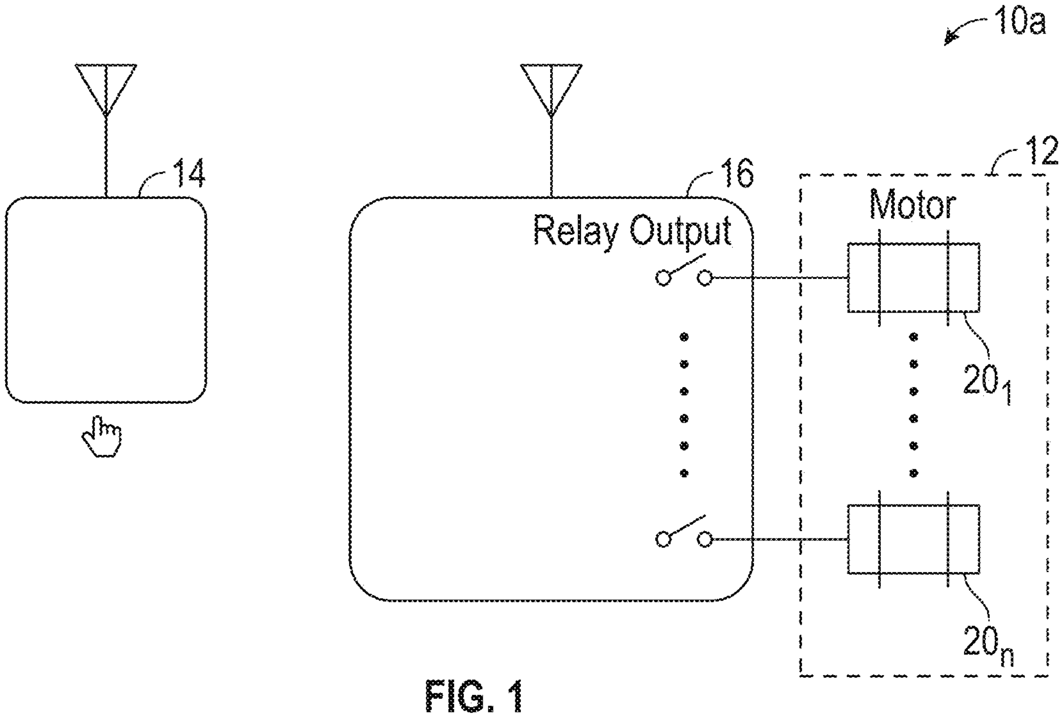
FIG. 1 depicts an example Standard Radio Control System for a Radio-Controlled Machine (RCM) device such as a Crane.

Reference will now be made in detail to illustrative embodiments, which are depicted in the accompanying drawings. The embodiments described herein exemplify, but do not limit, the illustrative embodiments by referring to the drawings. Example embodiments of the present disclosure are described herein with respect to radio control of cranes (e.g., cranes used in steel mill environments and at mines), but can be used in other applications such as controlling other types of mobile equipment and in other environments such as in a railway system.

An improved radio control system is described herein with different example radio transmitter embodiments and different example embodiments of radio receiver embodiments including various boards and expansion cards from which users can select to create a customized radio system for their desired radio controlled machine (RCM) application. Controller Area Network (CAN) communication is provided for all of the receiver boards to allow them to communicate with each other to create user-configurable and customizable receiver systems. These radio transmitters have an improved battery pack and charger compared with radio units in existing radio control systems. These radio transmitters and receivers also have a USB connection accessible to obtain data logs and programing, among other advantageous features. Handheld-type radio transmitters have beneficial indicators (e.g., one or more tricolor LEDs) for indicating battery status and pairing status, and can have an optional tricolor LED to indicate operational configuration. The radio receivers also have beneficial indicators (e.g., one or more tricolor LEDs) for indicating pairing status, as well as an LED to indicate a fault condition.

A standard radio crane control system 10*a* is depicted in FIG. 1. A radio crane control system 10*a* consists of a portable transmitter (i.e., hereinafter referred to as the Transmitter (Tx)) 14 that generates control signals, plus receiving equipment (i.e., the receiver(s)) that are each permanently or removably installed on the crane and electrically connected to the crane's motor controls 20, and are hereinafter referred to as the Receiver (Rx) 16. As described below, the control system 10*a* can have a wide array of load handling options as well as the capability to control multiple hoists at the same time. The Transmitters 14 are built to last in harsh environments and are composed of industrial strength materials for years of service in the harshest of environments. The standard radio crane control system 10*a* in FIG. 1 allows for dedicated communication between one Transmitter 14 and one Receiver 16, and pairing to another Receiver 16 is required to end the communication between the original Transmitter and Receiver pair.

The radio control systems 10 described herein in accordance with example embodiments uses the 900 MegaHertz (MHz) wireless band and related signal technology (e.g., frequency hopping spread spectrum (FHSS) modulation at 902.971-926.653 MHz with AES≥128 bit encryption). The Receiver 16 is connected to the crane's control unit. A switch, lever or button interface on the Transmitter 14 creates a control signal (e.g., a specified combination of pulses) that is transmitted to the Receiver 16. The Receiver 16 then decodes the control signal (e.g., pulses) and transmits the pulses to the crane's motor controllers.

Remote control of a crane via a Transmitter 14 allows for the operator to be the person who does the hooking and attaching of the load. With fixed position controls, two people may need to be involved, or one person goes back and forth between the load and the controls. With a remote portable pendant, the operator can be involved in the load lifting as well as the load handling.

At the other end of the crane control system is the Receiver 16. The Receivers 16 can be provided pre-wired with a length of cable and mounting hardware for fast installation to the crane 12 and associated motor controllers 20. The Receivers are also provided with onboard diagnostic and output LEDs to provide system status information. The Receivers 16 are fully enclosed to provide protection in the harshest indoor or outdoor environments preventing dust, mist or water from entering the receiver.

The following are a number of definitions of terms used herein to describe example embodiments of the improved radio control system 10.

AC: AC is an alternating current (e.g., an electric current that periodically reverses its direction). The standard current used by utilities in the U.S. is 60 cycles per second and in Europe and other parts of the world it is 50 cycles per second.

Antenna: A physical structure that captures and/or transmits radio electromagnetic waves. The antenna on a Transmitter is preferably internal.

Bridge: The bridge is the track for the crane.

DC: DC is a direct current (e.g., an electric current that flows in one direction only).

Deadman Switch: A switch that is designed to be activated if the human operator becomes incapacitated.

Discovery: The process by which the Transmitter makes an announcement and collects a list of all Receivers that reply.

Festoon: A specialized suspension system designed to hang, support and move hoses and cables around a working environment. A Festoonless system allows for one transmitter to control two different functions on two receivers. An example: one receiver would control the bridge and the other would control the trolley.

Hoist: The hoist lifts the load up and down.

Pairing: A form of information registration for linking devices. After pairing is completed, communication between the two devices can occur.

Pitch and Catch: Crane operation that allows two operators to efficiently move a load over a long bay. The radio transfer from one operator to another is seamless. One operator would pick up the load and send the crane down the bay to the other operator.

Radio Control System: A Radio Crane Control System includes at least one transmitter and at least one receiver.

RCM: Radio-Controlled Machine (RCM)

RCM Configuration Generator: The RCM Configuration Generator is an application used to create a configuration file. This configuration file describes the mapping of Transmitter motion speed/direction selections to Receiver control outputs.

RCM Interface: The RCM Interface is an application used for allowing the user to interface, manipulate, and visualize details of RCM Devices.

Receiver: A Receiver interprets the required actions suggested by the Transmitter and translates that information to output controls for the RCM device (e.g., a crane).

Standard: "Standard" as used in the present disclosure with respect to a Transmitter or Receiver, or a card or board deployed in a Transmitter or Receiver, refers to a grouping of features in a Transmitter or Receiver that is different as compared, for example, to another Transmitter or Receiver (e.g., a Standard Transmitter has a different set of features as compared to a Basic Transmitter according to their respective example embodiments described herein, and a Standard Receiver has a different set of features as compared to a Digital Receiver according to their respective example embodiments described herein). "Standard" as used herein does not mean "conventional."

Tandem: Tandem lift is also an operational procedure that is vastly used in the industrial sector. In this process, the operator can handle more than one crane or hoist at once to lift a huge load.

Transceiver: An electronic circuit that transmits and receives wireless data.

Transmitter: A Transmitter is the operator interface to control a movement of a RCM device such as a crane.

Transfer Switch: A device that allows the safe connection or disconnection of different sources of electricity to an electric load.

Trolley: The trolley is the vehicle that travels on the bridge.

In crane operations, some pendant controls allow for operations beyond typical basic lifting controls. In more complex crane installations, additional features may be needed. For example, in accordance with an example embodiment, a Belly Box Transmitter can have a button that is configured to be an A/B Selector Switch (AB) such as a three-position selector switch allows one operator to switch operation between two trolley/hoists (A, B, or Both) that are located on a single bridge. The operator can easily identify which trolley hoist is active on the crane by the position of the A/B Selector Switch.

Figure 2:
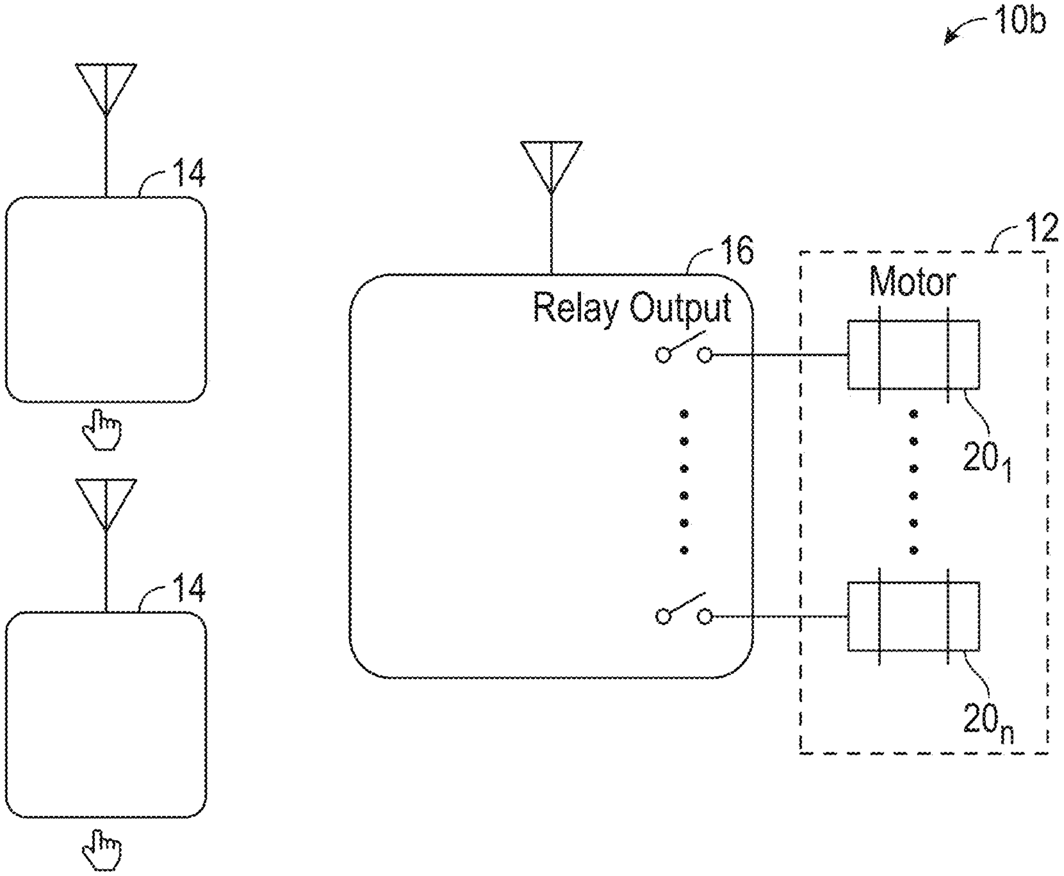
FIG. 2 depicts an example Pitch and Catch Crane Control System.

FIG. 2 illustrates a Pitch and Catch system topology for a Pitch and Catch crane control system 10*b*, for example, that allows for communication between more than one Transmitter to one Receiver. During initial setup, each Transmitter 14 is paired to the Receiver 16. During operation, only one Transmitter 14 can communicate with the Receiver 16. The initial operating Transmitter 14 must release/pitch the communication to the Receiver for another Transmitter to catch and communicate with the Receiver. At no point can two Transmitters control one receiver at the same time.

Figure 3:
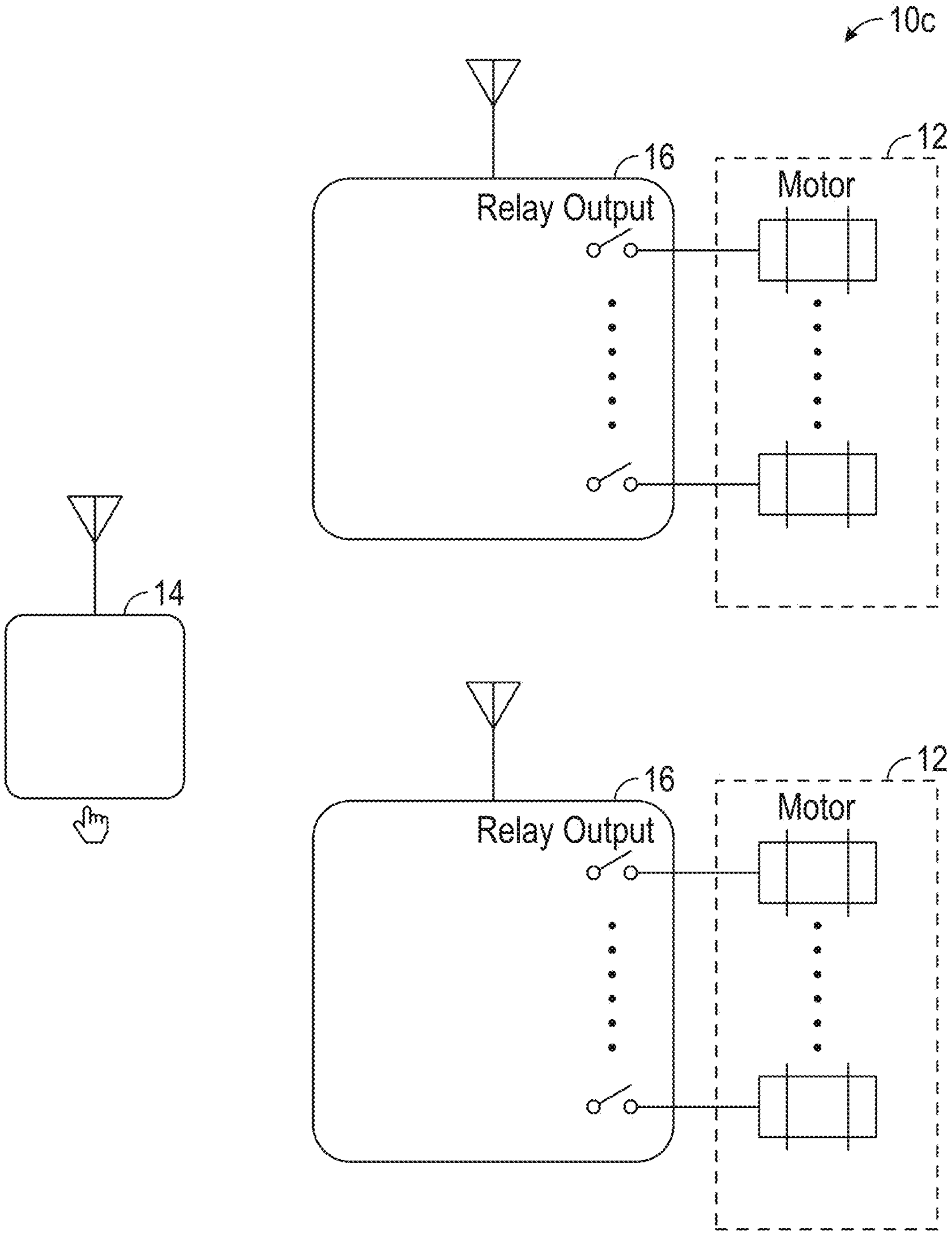
FIG. 3 depicts an example Tandem or Festoonless Crane Control System.

In accordance with other example embodiments, the Transmitters 14 and Receivers 16 of the present disclosure can be configured for Tandem or Festoonless operation as illustrated in the Festoonless/Tandem crane control system 10*c* shown in FIG. 3, for example. A Tandem system topology allows for one Transmitter 14 to control the same function of two Receivers 16 simultaneously. This operation therefore can be used to operate two Receivers 16 working in tandem to accomplish one operation. The Tandem system topology can also allow two operators to control two bridge cranes or trolley/hoists independently or simultaneously with the three position selector switch. One operator can maximize the capabilities and lift power of two bridge cranes or both users can operate each bridge crane independently.

A Festoonless system topology is also represented in FIG. 3. A Festoonless system allows for one Transmitter 14 to control two different functions on two Receivers 16. For example, one Receiver 16 can be configured to control the bridge and the other Receiver 16 can be configured to control the trolley. Since the Festoonless system 10*c* allows one operator to select multiple Receivers at one time, one operator can control up to 2 bridges and 4 trolley/hoists simultaneously or independently, for example. This simplifies installation by eliminating the control festooning running from bridge to bridge.

The improved radio control system 10 described herein in accordance with example embodiments of the present disclosure comprises a catalog or platform having different types of Transmitters 14 with different capabilities and features, and different types of Receivers 16 with different capabilities and features, from which a user can choose to design a customized radio control system for their specific application.

Example embodiments described herein make user design and customization of a radio control system 10 convenient and versatile by providing the user with choices among different advantageous Transmitter 14 and the Receiver 16 form factors and corresponding features of the example embodiments described herein for the Transmitter and the Receiver. Further, convenient configuration is facilitated by example embodiment features such as DIP switches, an RCM Configuration Generator application and RCM Interface software, among other features. Versatility of Receiver outputs for controlling different types of RCM devices in different applications is provided by different Receiver form factors and expansion cards, and CANbus connectivity, among other features. Thus, example embodiments described herein allow users to conveniently design their remote control crane system 10 depending on their particular application and preferred system topology, that is, a Standard crane control system 10*a*, a Pitch and Catch crane control system 10*b*, Tandem crane control system 10*c*, or a Festoonless crane control system 10*c*, for example.

In accordance with example embodiments, the platform of the improved radio control system 10 is provided with at least four different types of Transmitters; that is, the Basic Transmitter 14*a*, the Standard Transmitter 14*b*, the Belly Box Transmitter 14*c* and the Mill-Style Belly Box Transmitter 14*d*, which are described further below.

In accordance with example embodiments, the platform of the improved radio control system is provided with at least three different types of Receivers; that is, a Standard Receiver 16*a*, a Digital Receiver 16*b*, and an Expandable Receiver 16*c*. The Expandable Receiver 16*c* is configured to operate, through the CANbus Interface, with different external expansion cards including, but not limited to an External Card for DC Crane Relays Outputs [Card Slot Form A (ECDR) 22*a*], an External Form A Output Card [Card Slot Form A (ECFA) 22*b*], an External Form C Output Card [Card Slot Form A (ECFC) 22*c*], an External Card Latching Outputs [External Card Latching Outputs (ECLO) 22*d*], and an External Card with analog outputs 22*e*, described further below. The expandable receiver operates with, but not limited to, Card Slot Form A Relay Output CFSA, Card Slot Form C Relay Output CSFC and Card Slot Analog Interface CSAI.

The improved radio control system 10 is designed to utilize a unified program for all of the Transmitter 14 and Receiver 16 types within its platform. In other words, every Transmitter 14 can operate on the same transmitter program, and every Receiver 16 can operate on the same receiver program. There is flexibility within the improved radio control system 10 to use similarly configured Transmitters 14 with the similarly configured Receiver 16 (e.g., for pitch and catch operations). As stated above, not every Transmitter 14 or Receiver 16 has the same capabilities. The type of Transmitter 14 and Receiver 16 used within a particular radio control system 10 will be dependent upon the required application.

In accordance with an example embodiment, the improved radio control system 10 can have a graphical user interface (Graphical User Interface (GUI) display 32) on a Transmitter 14 that allows the configuration of the Transmitter actuators and corresponding Receiver outputs. A GUI configuration file can be used to select and locate the Transmitter actuators, the Receiver outputs, and the system drawings.

Some of the Transmitter 14 types provided in the platform of the improved radio control system 10 have a GUI display 54 that provides feedback on certain operations, top level fault conditions, and a first in first out (FIFO) log that provides faults, and actuator inputs. Some of the Receiver 16 types provided in the platform of the improved radio control system 10 can also have a GUI display that provides the same aforementioned types of information as the Transmitter. However, the fault feedback provided by the Receivers 16 is more detailed to help maintenance personnel isolate and troubleshoot specific problems. The Transmitter 14 and Receiver 16 actuator logs can be used in a postmortem investigation to reconcile the user inputs against the Receiver 16 outputs. All logged information can have time and date stamps to pinpoint when occurrences happened.

The Transmitters 14 and Receivers 16 are supplied with a basic Configuration or a Customer Specific Configuration using a Crane Control Feature Requirement Form. The Transmitters and Receivers can be modified by the system user with a button interface or Crane Control Configuration Software that is described below. The Transmitter/Receiver pair configuration can be stored using the Crane Control Configuration Software. The system is provided with a default configuration from the factory. The system user can modify the configuration through the button interface or the Crane Control Configuration Software.

The default Standard/Pitch and Catch crane control system 10*b* has two Transmitters 14 paired to a single Receiver 16. The default Standard crane control system 10*a* has a configuration in which the Transmitter 14 will be paired to the Receiver 16 with the default settings. Each Transmitter 14 has a duplicate configuration setting. The operation can therefore include the Standard operation or Pitch and Catch operation. The Basic Transmitters 14*a* and the Standard Transmitters 14*b* come with this configuration.

The Tandem crane control system 10*c* has one Transmitter 14 paired to two Receivers 16. The Tandem crane control system Receivers 16 have identical operation. The one Transmitter 14 controls the same complimentary outputs from each Receiver 16 concurrently using the same activation. The Standard Transmitter 14*b* comes with this configuration option. The Basic Transmitter 14*a* does not come with this configuration option.

The Festoonless crane control system 10*c* has one Transmitter 14 paired to two Receivers 16. The Festoonless crane control system Receivers 16 have different operations. The one Transmitter 14 controls the outputs from each Receiver 16 using different activations. The Standard Transmitter 16*b* comes with this configuration option. The Basic Transmitter 16*a* does not come with this configuration option.

Due to the complexity of the Belly Box Transmitter 16*c*, the radio control system 10 can have a default system configuration, or the Transmitter 14/Receiver 16 combination can instead employ completion of the Crane Control Feature Requirement Form for more customized settings.

The improved radio control system 10 catalog or platform controlled in accordance with example embodiments of the present disclosure comprises components to create a DC Radio System, or an AC Radio System for industrial and commercial markets. The Mill-Style Belly Box Transmitter 14*d* and related equipment is particularly useful in a subset of the industrial control market segment.

The Transmitters 14 and Receivers 16 herein with respect to example embodiments of the present disclosure operate in accordance with common software interfaces including, but not limited to Crane Control Configuration Software comprising a Radio-Controlled Machine (RCM) Configuration Generator 26, and a Radio-Controlled Machine (RCM) Interface 28.

The Radio-Controlled Machine (RCM) Configuration Generator 26 is an application used to create a configuration file 26*a*. This configuration file 26*a* describes the mapping (e.g., Bit function) of Transmitter motion speed/direction selections to Receiver control outputs. The configuration file 26*a* is consumed by the Radio-Controlled Machine Interface 28 application which transfers the configuration settings to a Transmitter 14.

The Radio-Controlled Machine (RCM) Interface 28 is an application used for allowing the user to interface, manipulate, and visualize details of Radio-Controlled Machine Devices. For example, the RCM Interface 28 application can be implemented as a Windows Operating System Application 28, for example. A user can then connect a Radio-Controlled Machine Device 12 via a USB connection to their Windows-based computer 24, and then manipulate/interact with that RCM device 12. The RCM Interface 28 application tasks can include, but are not limited to, transfer of configuration settings, retrieval of operational logs, and initiation of equipment diagnostics.

An example Basic Transmitter 14*a* will now be described with reference to FIGS. 4A through 7. The Basic Transmitter 14*a* is configured for use in commercial environments and includes generally only the basic features needed to operate a crane and therefore is less expensive and a simpler implementation of a remote crane control system 10 in comparison to the Standard Transmitter 14*b* described below with reference to FIGS. 8A through 10 and the Belly Box Transmitters 14*c* and Mill-Style Belly Box Transmitters 14*d* described below with reference to FIGS. 11A through 17. The Basic Transmitter 14*a* has Mylar covered pushbuttons, and LED indicators for power, communications, A and B receiver status, and fault events for operation indications. The Basic Transmitter is primarily designed to operate with the Standard Receiver described below with reference to FIGS. 18A through 19, but can also operate the Expandable Receiver described below with reference to FIGS. 21A through 22 and the Digital Receiver described below with reference to FIG. 20.

Figure 4A:
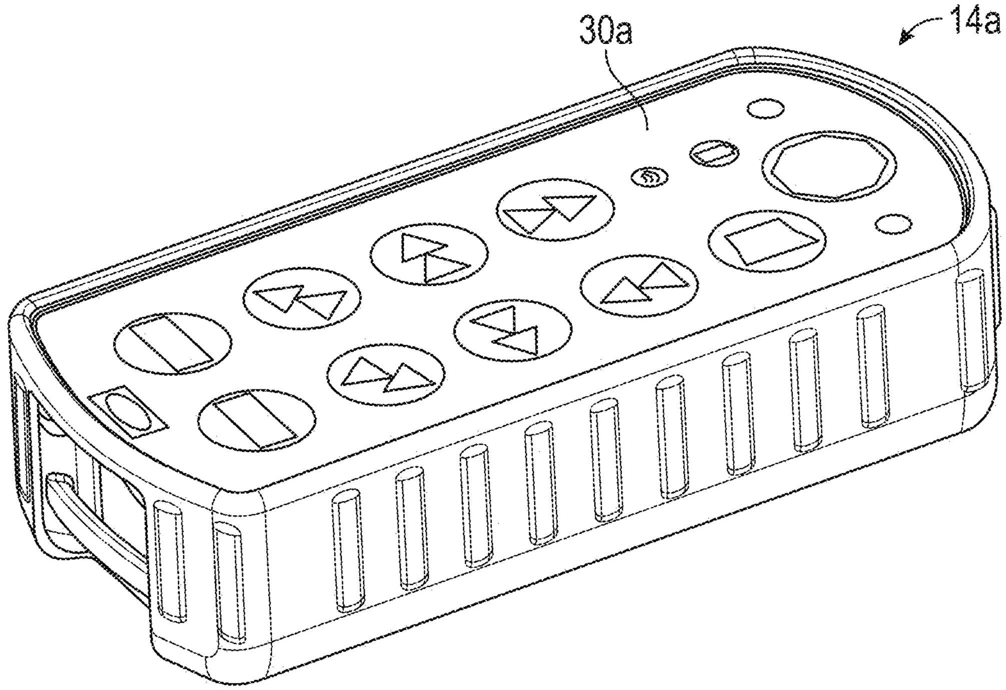
FIGS. 4A and 4B are top and bottom perspective views of an example handheld form factor for a Basic Transmitter constructed in accordance with an example embodiment.
Figure 4B:
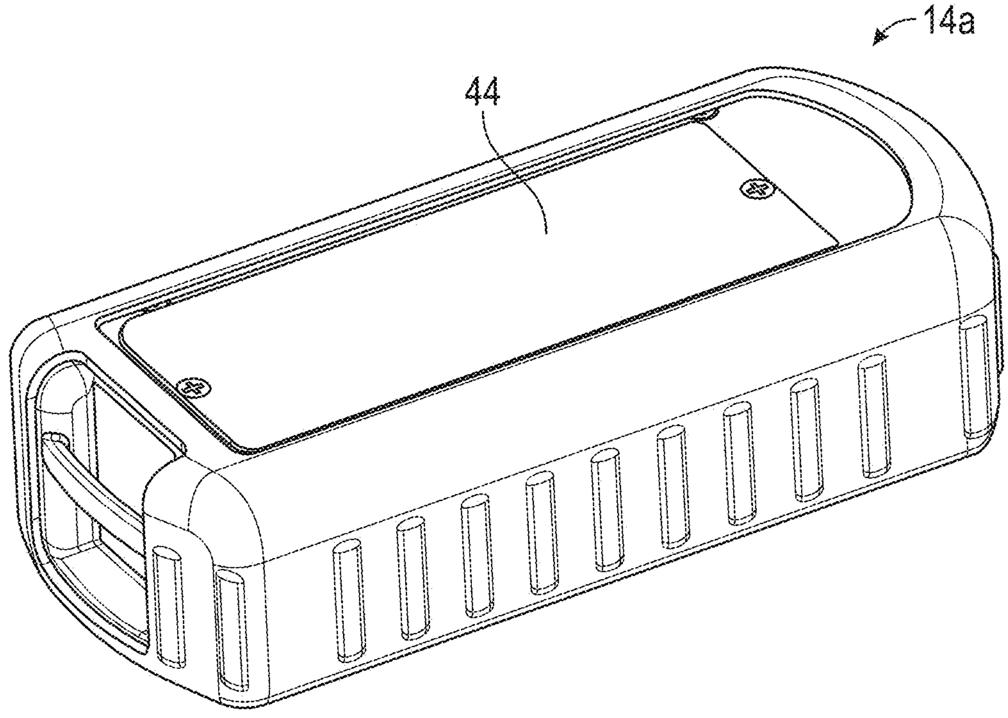
Figure 5C:
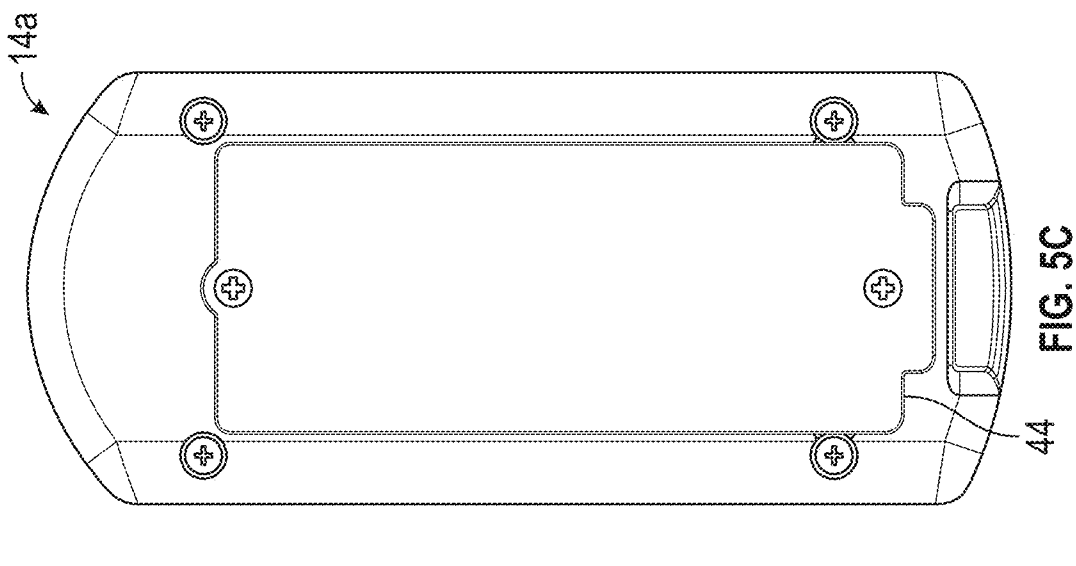
FIGS. 5A, 5B and 5C are, respectively, a top, side and bottom view of a Basic Transmitter in accordance with an example embodiment.
Figure 5B:
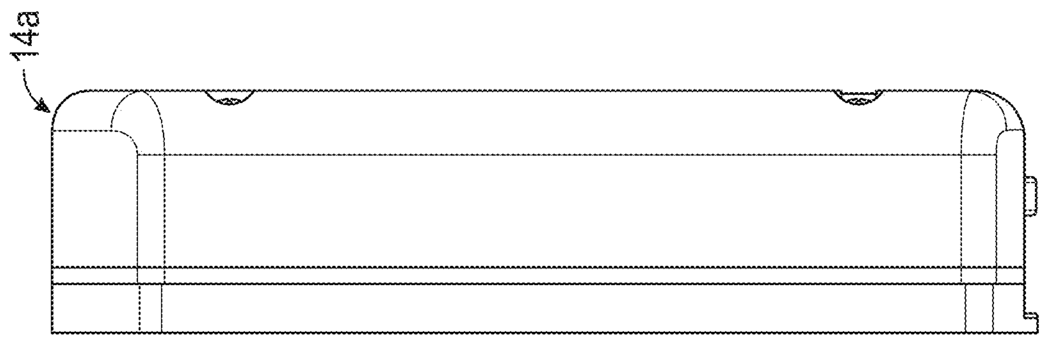
Figure 5A:
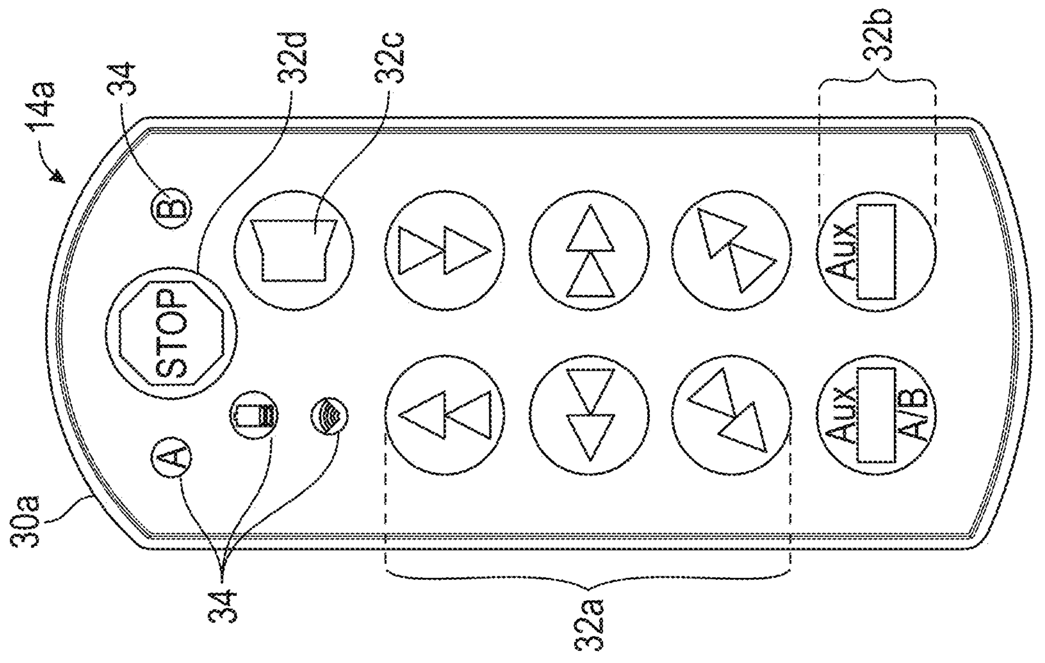

FIGS. 4A and 4B are top and bottom perspective views of an example handheld form factor for a Basic Transmitter 14*a* constructed in accordance with an example embodiment. FIGS. 5A, 5B and 5C are, respectively, a top, side and bottom view of a Basic Transmitter 14*a* in accordance with an example embodiment. The handheld Basic Transmitter is configured to allow an operator to (a) hold the Basic Transmitter 14*a* in one hand while the Transmitter is strapped to the operator's wrist and (b) access and use all buttons on the user interface 30*a* on the handheld Basic Transmitter, while the handheld Basic Transmitter conveniently and comfortably fits in the operator's palm.

As described below, the battery-operated handheld Basic Transmitter 14*a* has push button inputs 32 and indicators 34 (e.g., LED status indicators) on its user interface 30*a*. These buttons 32 include three pairs of two speed motions 32*a*, an additional single action momentary pair 32*b* to be user defined and a START button 32*c* and a STOP button 32*d*. LED status indicators 34 are configured to report battery status, communications, and A/B receiver status. The Basic Transmitter 14*a* wirelessly sends the status of its buttons 32 to a line powered Receiver(s) 16 which in turn will control electrical outputs associated with running cranes or other mobile equipment 12.

Figure 6A:
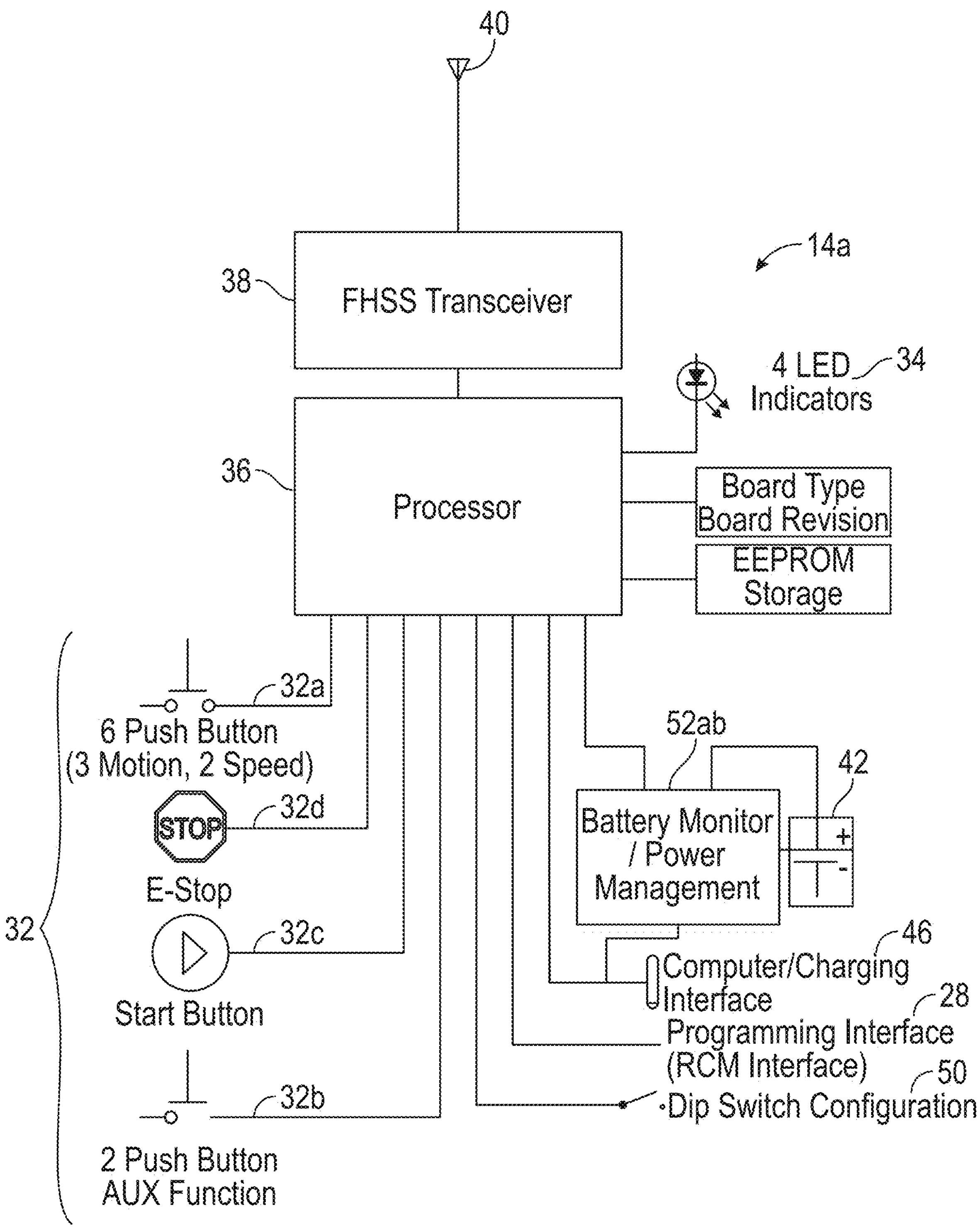
FIG. 6A is a block diagram of a Basic Transmitter in accordance with an example embodiment.
Figure 6B:
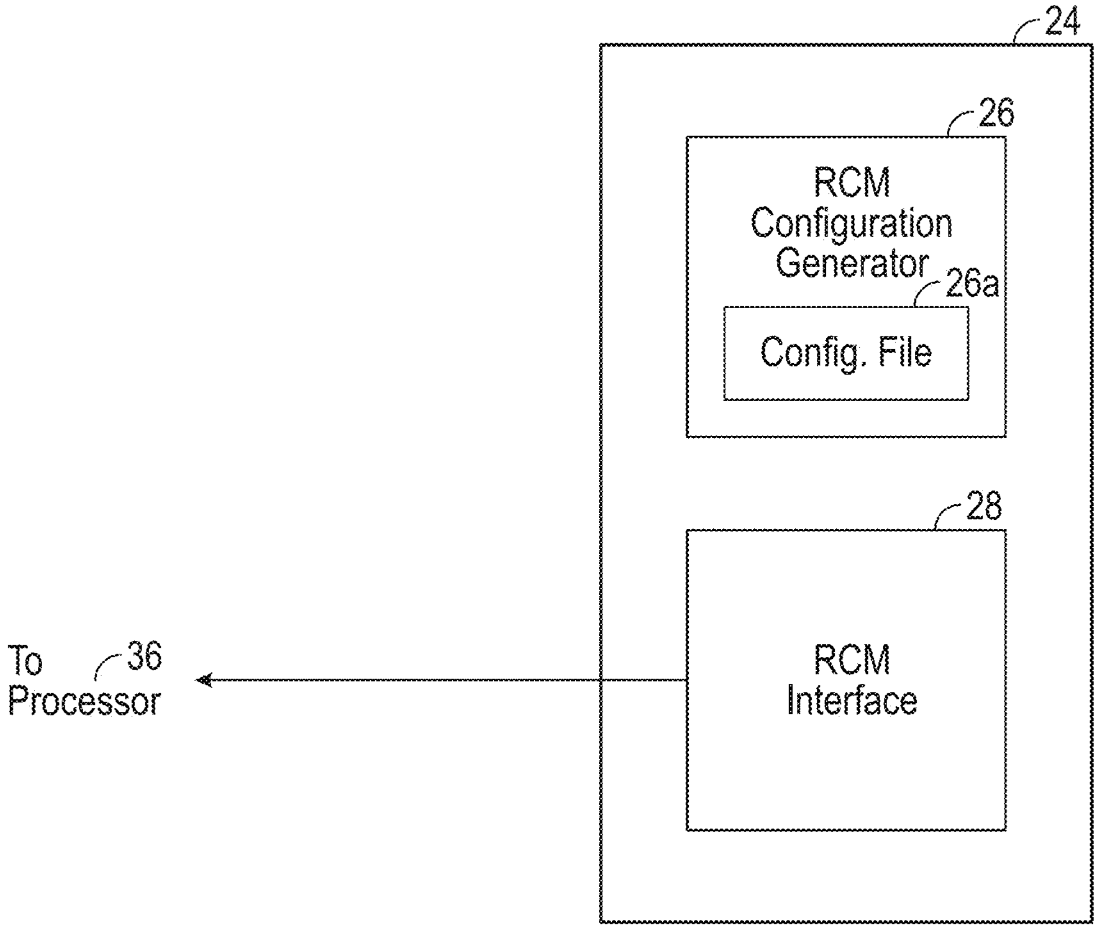
FIG. 6B is a block diagram of a computer with a RCM Interface application that can be connected to the Basic Transmitter in accordance with an example embodiment.

FIG. 6 is a block diagram of a Basic Transmitter 14*a* in accordance with an example embodiment. The Basic Transmitter 14*a* has a processor 36 and a transceiver module 38. The transceiver module 38 has a built-in antenna 40 to prevent damage and to provide adequate support to ensure the antenna does not separate from the transceiver 38 during severe shock loading. The Basic Transmitter 14*a* further has a Lithium battery 42 that is replaceable through a quick connect battery compartment indicated at 44 in FIG. 5C. The battery is charged through a USB-C connection as indicated by the computer/charging interface 46 in FIG. 6. A Battery Monitor/Power Management circuit 52*a* is provided in described with reference to FIG. 7. The Standard and Basic Transmitters 14*a* and 14*b* can also have the battery charged through a separate remote charger module.

With continued reference to FIGS. 5A, 5B, 5C and 6, the Basic Transmitter 14*a* has 10 push buttons for crane operation, including:

- One Start/Horn button 32*c* to initiate operation of the crane, and beep the horn.
- One Stop button 32*d* which serves dual functions: (a) on start-up, it momentarily connects battery power to the processor through a normally open connection which initiates the processor's start-up and activates a latch circuit that maintains the battery connection; and (b) while the latch circuit is active, if the processor detects the closure of the stop button, it will terminate all currently active functions.
- Three pairs of 2-detented speed buttons indicated at 32*a* to operate a crane in three directions.
- Two configurable Auxiliary buttons indicated at 32*b*.

For example, the Stop button can be pressed and held to power the Basic Transmitter on, and pressed again at any time to cease operation of the currently selected Receiver(s) A or B. The first three pairs of push buttons can by default control Hoist/Trolley/Bridge motions. The A/next/Aux-1 configurable auxiliary button can be used to select the A Receiver or control Aux1 or 2nd Hoist Up. The B/enter/Aux-2 configurable auxiliary button can be used to select the B Receiver or control Aux2 or 2nd Hoist Down. These 10 buttons are also used for self-diagnostics of the Transmitter, such as stuck or open button contacts.

With continued reference to FIGS. 5A, 5B, 5C and 6, the Basic Transmitter has four indicators 34 (e.g., LEDs) for User Indications such as:

- One indicator to indicate pairing mode/wireless communication to the Receiver (e.g., e.g., a tri-color LED can be used wherein Green indicates communication, Solid Red indicates no communication, and Blinking Red indicates fault).
- One indicator (e.g., a Tri-color LED) to indication Battery Health.
- One indicator for the A Receiver (e.g., RX1 in FIG. 3). For example, a Tri-color LED can be used whereby Off indicates no connection to the A Receiver, Orange indicates the A Receiver is selected but not active, Green indicates the A Receiver is active, and Red indicates fault.
- One indicator for the B Receiver (e.g., RX2 in FIG. 3). For example, Tri-color LED whereby Off indicates no connection to the B Receiver, Orange indicates the B Receiver is selected but not active, Green indicates the B Receiver is active, and Red indicates fault.

The Basic Transmitter 14*a* is provided with Dip Switches 50, including a DIP switch setting array that is accessible, for example, through the battery compartment 44 on the back of the Transmitter 14*a* (e.g., to configure unique settings to the Transmitter). For example, the DIP switch 50 settings can be used to define function of the fourth row of push buttons on the Basic Transmitter such as, Motion or Auxiliary, whereby Motion is two direction and one speed operation. The Auxiliary Function can be A/B transmitter functionality, single relay contact enable function, and Momentary/Toggle ON-OFF. The DIP switch settings can also be for Inactivity Time Selection.

A default configuration for the Basic Transmitter 14*a* assigns Hoist/Trolley/Bridge motions to the first three pairs of buttons 32*a*. As stated above, the fourth pair of buttons 32*b* are defined by the DIP switches on the back of the Transmitter. START and STOP buttons 32*c* and 32*d* are not configurable. If needed, the first three button pairs 32*a* of the Transmitter 14*a* can be reconfigured for different functions using the RCM Configuration Generator 26, and then transferring the configuration file to the Transmitter 14 and Receiver 16 through the RCM Interface 28.

Figure 7:
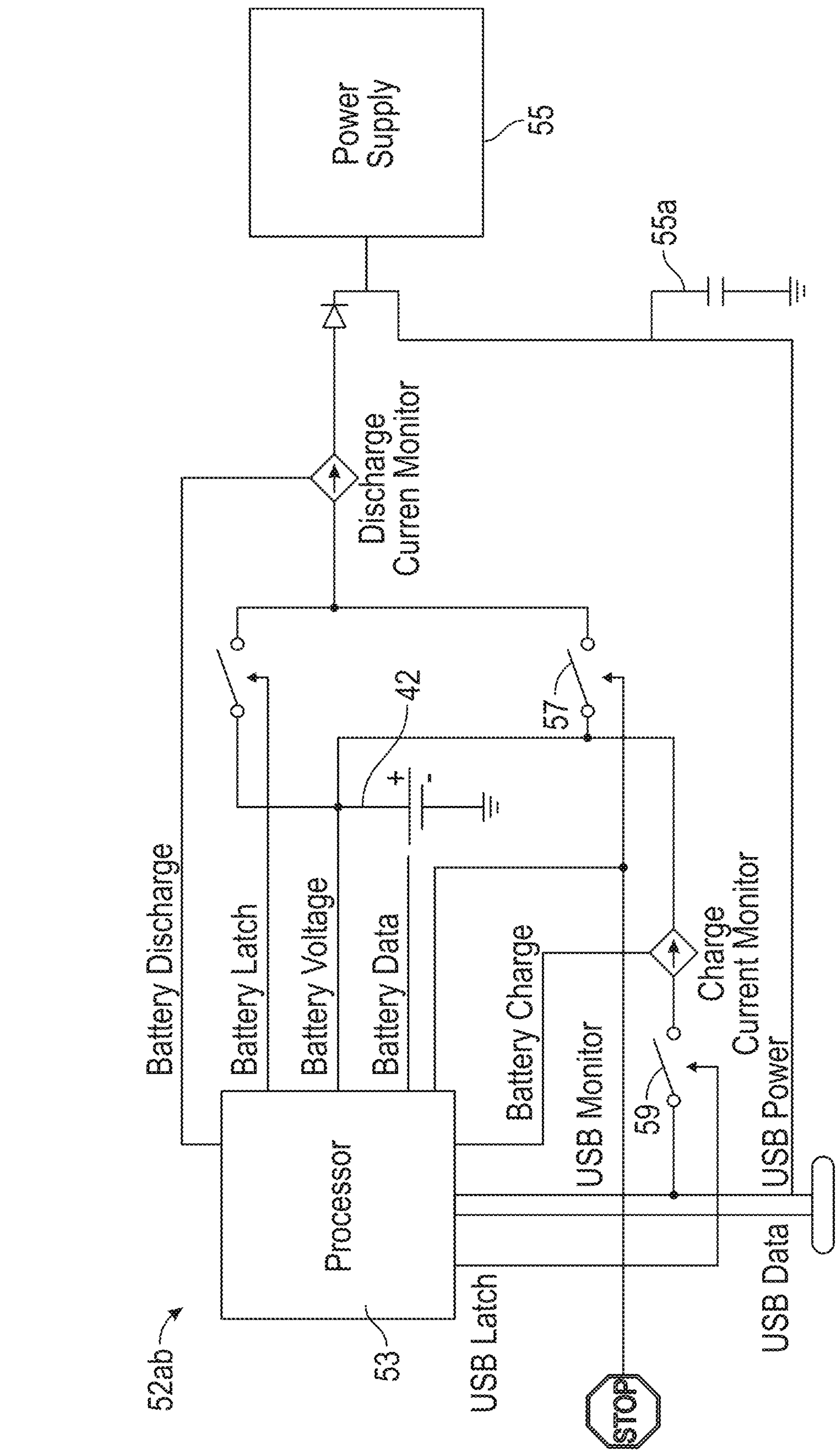
FIG. 7 is a block diagram of a Battery Monitor/Power Management circuit deployed in a Basic Transmitter or a Standard Transmitter in accordance with an example embodiment.

FIG. 7 is a block diagram of an example Battery Monitor/Power Management circuit 52*ab* deployed in a Basic Transmitter 14*a* or a Standard Transmitter 14*b* in accordance with an example embodiment. The Battery Monitor/Power Management circuit 52*ab* has a processor 53 (e.g., an EEPROM) included in its battery assembly to track charging cycles, initial Amp Hour capacity and current Amp Hour capacity. The Basic Transmitter 14*a* is configured to monitor current supplied by the battery and voltage of the battery 42 to determine the expected operating time left for the Transmitter. Start Up operation of the Basic Transmitter 14*a* can be triggered by activating the Stop Button 32*d* for 3 seconds. In this time, a latch circuit 57 will connect the battery 42 to the Basic Transmitter 14*a* for operation. During the power down, the processor 36 can reset the latch 57 and disconnect the battery power from the Basic Transmitter before the discharge of the power supply 55 capacitor 55*a* for proper power down sequencing. After the power down sequence, recycling the Stop button 32*d* is required for Transmitter operation. The Basic Transmitter 14*a* charges the battery 42 during installation through the USB-C connection 46. During the charge operation, the USB-C connection 46 charges the battery 42 and supplies power to the Basic Transmitter 14*a* for an efficient battery charge cycle. At the beginning of the charge cycle, the processor 36 detects the USB-C voltage and measures the no load battery voltage. After the processor determines battery no load voltage, the processor connects the USB-C 46 to the battery 42 as indicated at 59 for the charging cycle. The battery can also be charged through an external battery charger assembly.

By way of an example, the Basic Transmitter 14*a* can analyze the percentage of battery remaining and give appropriate indications at the following levels:

| Battery LED (Tri-Color) Battery Monitor | |
|---|---|
| Battery Life >50% | Green |
| Battery Life >20%, <50% | Yellow |
| Battery Life >10%, <20% | Red |
| Battery Life <10% | Slow Blinking Red, After Operation will not restart |
| Battery replacement | Fast Blinking Red |

Below 10% battery life the Basic Transmitter will not allow operation. The Basic Transmitter 14*a* can also analyze the percentage of battery 42 charging status and give appropriate indications at the following levels:

| Battery LED (Tri-Color) Battery Monitor | |
|---|---|
| Battery Charge 100% | Solid Green |
| Battery Charge >90%, <100% | Blinking Green |
| Battery Charging <90% charged | Blinking Yellow |
| Battery Charge Fault | Red |

The Basic Transmitter has a USB-C connection accessible externally to the Basic Transmitter to obtain data logs of the device. The Logs can be accessed through the RCM Configuration Generator to obtain information on the RCM-device Operations, Fault Occurrences, Operation Time, Pairing Configuration, and Battery Condition.

The processor in the Basic Transmitter analyzes and reports faults during normal operation and shows them by illuminating the Communication LED solid red. Receiver faults are indicated by the A or B LED also illuminating solid red. To recover from a fault, an operator generally reconciles the originating fault. For some faults, an operator performs a System Startup procedure to continue operation. For example, the processor can monitor for Loss of Communication (e.g., the Transmitter is currently communicating with a Receiver and it does not get a message acknowledged within 1 second). To resume radio communications after a Loss of Communication, an operator must press START/HORN. The processor can also monitor for Invalid Combination of Switches. For example, if an invalid combination of Transmitter switches is detected, the Transmitter will disable the motion having the fault. When this error is cleared, the Communication LED 34 will return to normal and normal operation can resume for this motion. The processor can also monitor for Receiver Faults (e.g., If the Transmitter is currently communicating with a Receiver 16 and there is an error reported by the Receiver). Action to mitigate this type of failure is generally undertaken by the Receiver 16 and further troubleshooting is performed by assessing the Receiver separately.

Figure 8A:
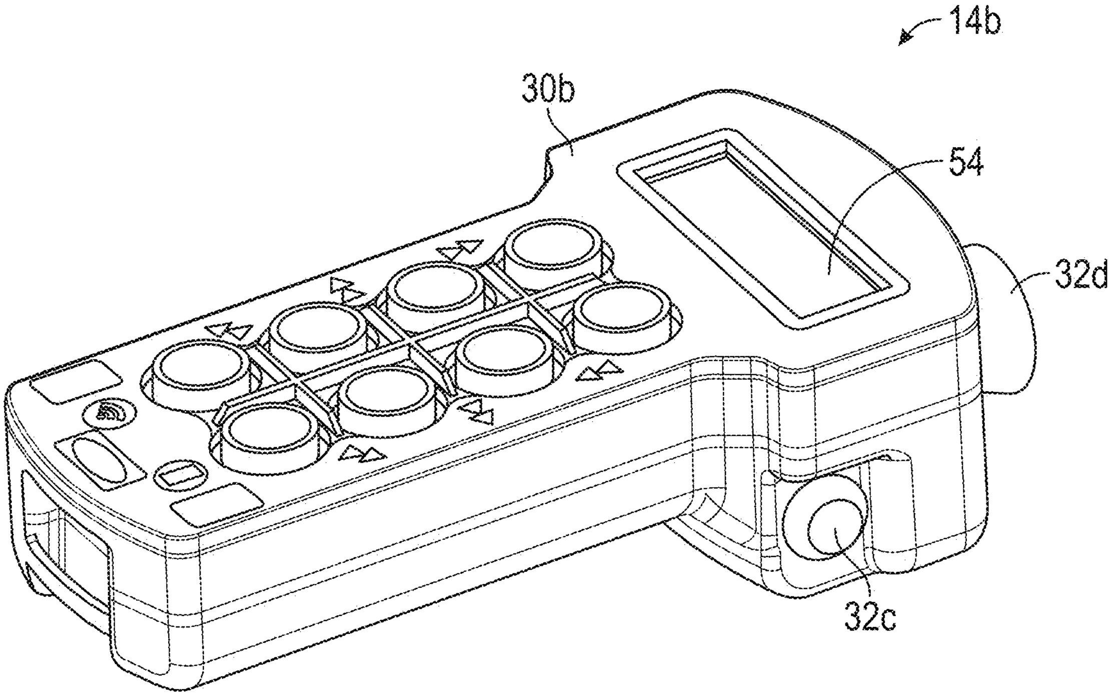
FIGS. 8A and 8B are top and bottom perspective views of an example handheld form factor for a Standard Transmitter constructed in accordance with an example embodiment.
Figure 8B:
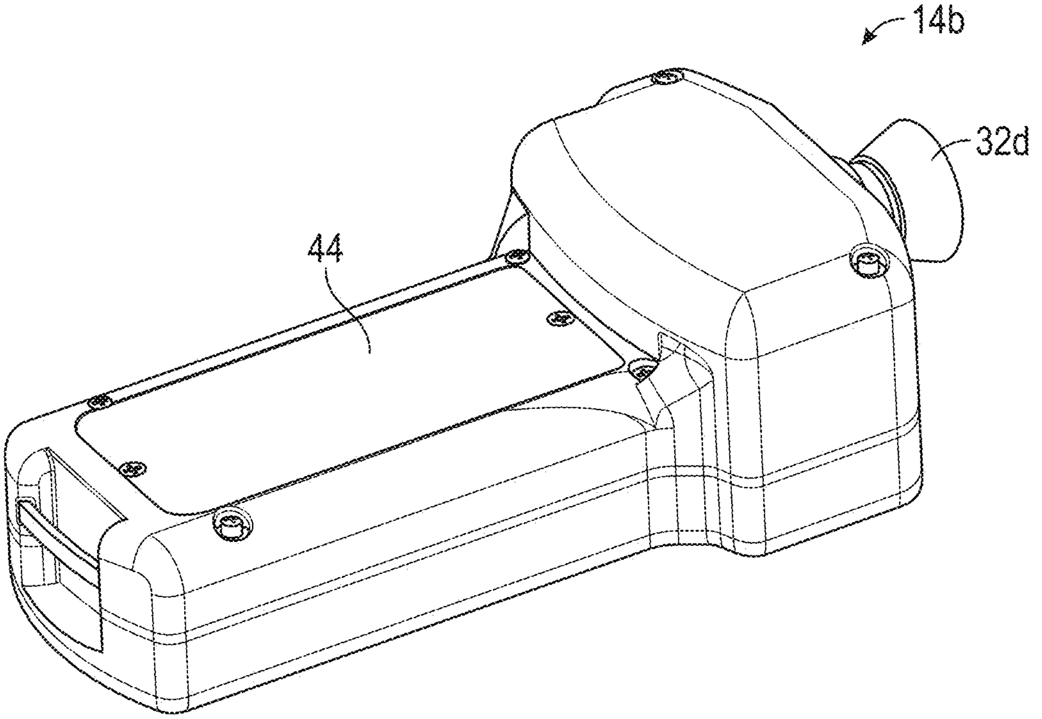
Figure 9C:
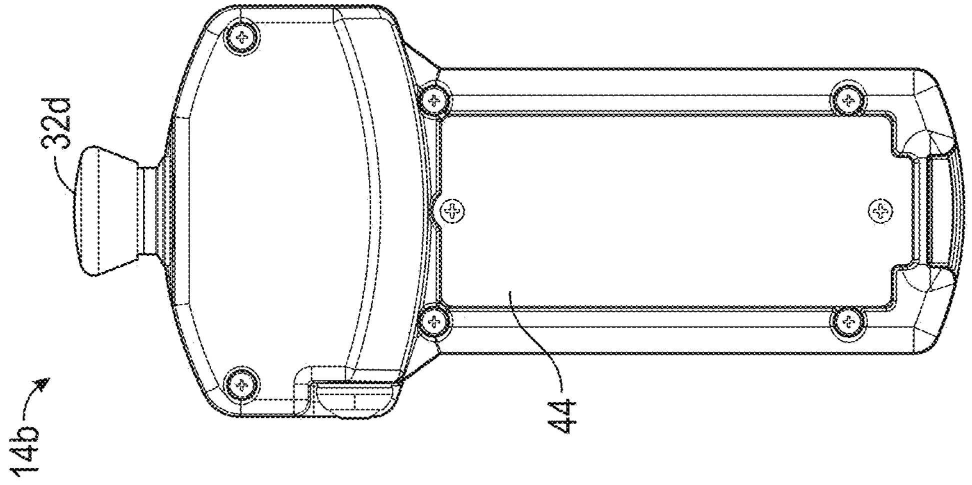
FIGS. 9A, 9B and 9C are, respectively, a top, side and bottom view of a Standard Transmitter in accordance with an example embodiment.
Figure 9B:
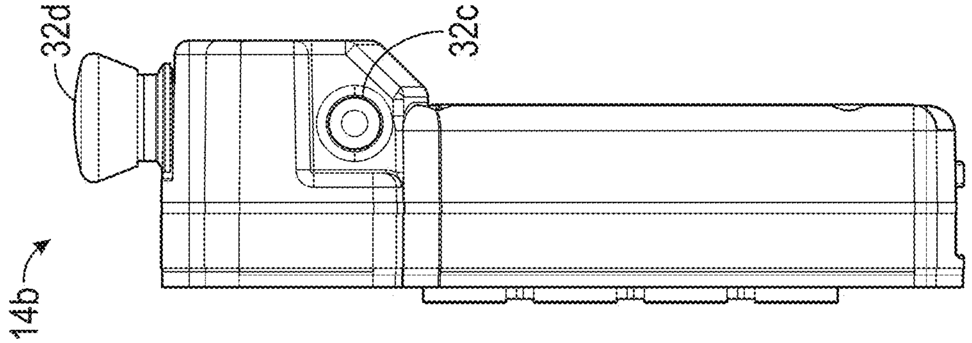
Figure 9A:
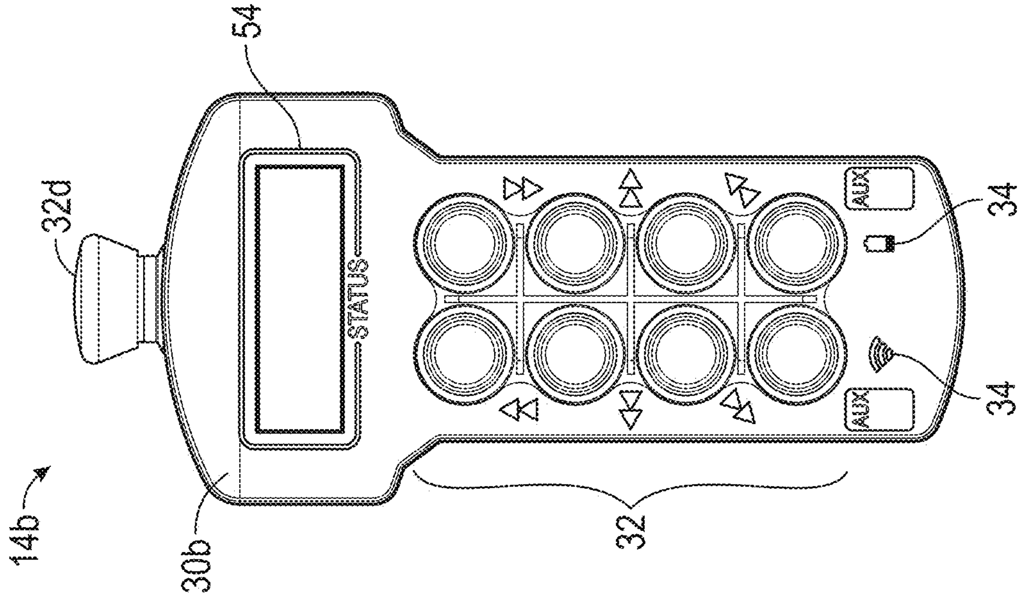
Figure 10:
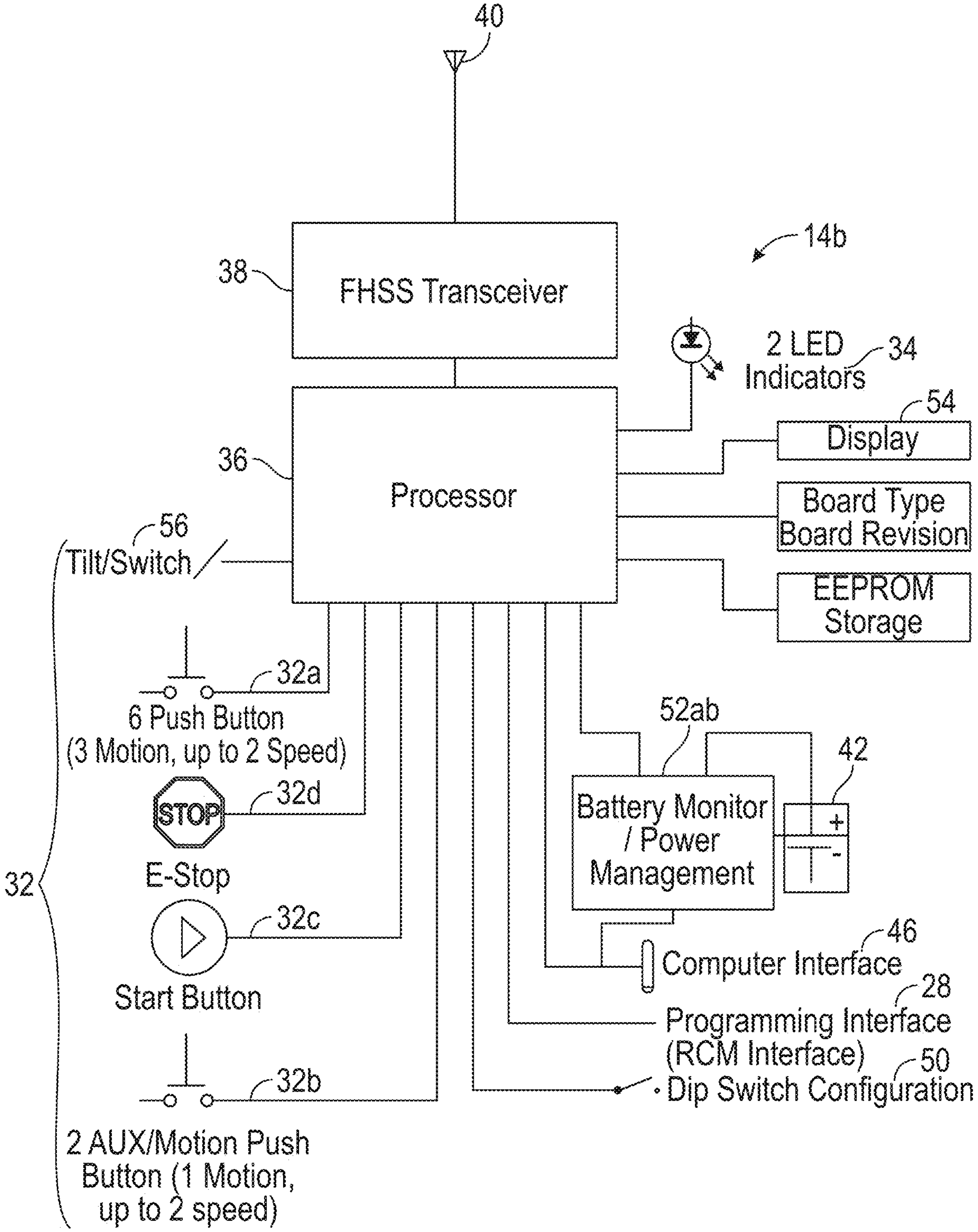
FIG. 10 is a block diagram of a Standard Transmitter in accordance with an example embodiment.

In accordance with another example embodiment of the present disclosure, the platform of the improved radio control system 10 comprises another form factor for a transmitter which is the Standard Transmitter 14*b* shown in FIGS. 8A through 10. FIGS. 8A and 8B are top and bottom perspective views of an example handheld form factor for a Standard Transmitter 14*b* constructed in accordance with an example embodiment. FIGS. 9A, 9B and 9C are, respectively, a top, side and bottom view of a Standard Transmitter 14*b* in accordance with an example embodiment. FIG. 10 is a block diagram of a Standard Transmitter 14*b* in accordance with an example embodiment. The Standard Transmitter 14*b* has the same Battery Monitor/Power Management circuit 52*ab* as that deployed in the Basic Transmitter and described above in connection with FIG. 7.

With reference to FIGS. 8A through 9C, the Standard Transmitter 14*b* can be used in commercial environments and includes actuators to operate a crane, for example. The Standard Transmitter 14*b* has Elastomer covered pushbuttons indicated at 32*a* and 32*b*, a Start/Horn button 32*c* on indented side of enclosure, and an Emergency Stop Twist Lock button 32*d*. The Standard Transmitter 14*b* includes indicators 34 (e.g., LED indicators) for battery health and communications. The Standard Transmitter 14*b* is primarily designed to operate with the Standard Receiver 16*a*, but can also operate with the Expandable Receiver 16*c* described below with reference to FIGS. 21A through 22 and the Digital Receiver 16*b* described below with reference to FIG. 20. The handheld Standard Transmitter 14*b* is configured to allow an operator to (a) hold the Standard Transmitter in one hand while the Transmitter is strapped to the operator's wrist or waist, for example, and (b) access and use all buttons 32 on the handheld Standard Transmitter, while the handheld Standard Transmitter conveniently and comfortably fits in the operator's palm.

As described below and shown in FIG. 10, the battery-operated handheld Standard Transmitter 14*b* with user interface having push button inputs indicated at 32*a* and 32*b*, status indicators 34, a Display 54 such as an OLED display, and a twist lock E-STOP button 32*d*. The buttons 32 include three pairs 32*a* of two speed motions, an additional two speed pair 32*b* to be user defined, as well as a START button 32*c* and the twist lock E-STOP button 32*d*. The status indicators 34 are configured to report battery 42 status, and radio communication status. The Standard Transmitter 14*b* wirelessly sends the status of its buttons 32 to a line powered Receiver(s) 16 which in turn will control electrical outputs associated with running cranes or other mobile equipment 12.

With reference to FIG. 10, the Standard Transmitter 14*b* has a processor 36 and a transceiver module 38. The transceiver module 38 has an internally mounted antenna 40 to prevent damage and to provide adequate support to ensure the antenna does not separate from the transceiver module 38 during severe shock loading. The Standard Transmitter 14*b* further has a Lithium battery 42 that is replaceable through a quick connect battery compartment indicated at 44 in FIG. 9C. The battery 42 is charged through a USB-C connection as indicated by the computer/charging interface 46 in FIG. 10. The battery can also be charged through an external battery charger assembly. A Battery Monitor/Power Management circuit is provided in described with reference to FIG. 7. The Standard Transmitter can also have the battery 42 charged through a separate remote charger module such as the battery charger 158 described below in connection with FIGS. 32A-32C.

With continued reference to FIGS. 9A, 9B, 9C and 10, the Standard Transmitter 14*b* has 10 push buttons for crane operation, including:

- One Start/Horn button 32*c* to initiate operation of the crane, and beep the horn.
- One Emergency Stop Twist Lock button 32*d* which serves dual functions: (a) on start-up, it momentarily connects battery power to the processor 36 through a normally open connection which initiates the processor's start-up and activates a latch circuit that maintains the battery connection; and (b) while the latch circuit is active, if the processor 36 detects the closure of the stop button, it will terminate all currently active functions.
- Three pairs of 2-detented speed buttons 32*a* to operate a crane in three directions. The detents are implemented through mechanical transition.
- Two configurable 2-detented speed Auxiliary buttons 32*b*.

For example, the E-Stop button 32*d* can be activated at any time to cease operation of the currently selected Receiver(s) 16, and also used in the System Startup procedure. The START/HORN button 32*c* can be pressed to initiate operation of the crane or mobile equipment as well as to beep the horn, as well as be used as a Select button in a Transmitter Maintenance mode. The first three pairs of push buttons 32*a* can by default control Hoist/Trolley/Bridge motions. One of the buttons indicated at 32*b* can be an Aux-1/Next configurable auxiliary button used to select between Receivers 16 or control Aux1 or 2nd Hoist Up, as well as a Next selector in the Transmitter Maintenance mode. The other one of the buttons indicated at 32*b* can be an Aux-2 configurable auxiliary button used to control Aux2 or 2nd Hoist Down. These 10 buttons indicated at 32*a* through 32*d* are also used for self-diagnostics of the Transmitter 14*b*, such as stuck or open button contacts.

With continued reference to FIGS. 9A, 9B, 9C and 10, the Standard Transmitter 14*b* has two LEDs 34 for User Indications such as:

One Tri-Color LED to indicate pairing mode/wireless communication to the Receiver (e.g., Green indicates communication, Solid Red indicates no communication, and Blinking Red indicates fault); and One Tri-color LED to indication Battery Health.

The Standard Transmitter 14*b* has a pendulum or tilt switch 56 that is mounted inside the transmitter and is configured to disable the Standard Transmitter when it is tipped 30° from normal front to back or back to front position. The Standard Transmitter has a Display 54 to convey detailed information to the operator such as, but not limited to, motion indication, maintenance mode/diagnostics, battery status, pairing selections, currently paired device name, E-Stop activated, and tilt warning.

The Standard Transmitter 14*b* is provided with Dip Switches 50, including a DIP switch setting array that is accessible, for example, through the battery compartment 44 on the back of the Transmitter 14*b* (e.g., to configure unique settings to the Transmitter). For example, the DIP switch settings can be used to define function of the 4th row of push buttons on the Standard Transmitter such as, Motion or Auxiliary, whereby Motion is two direction and up to two speed operation. The Auxiliary Function can be A/B transmitter functionality, single relay contact enable function, and locked function. The DIP switch 50 settings can also be for System Configuration, Inactivity Time Selection and Tilt Switch Activation.

A default configuration for the Standard Transmitter 14*b* assigns Hoist/Trolley/Bridge motions to the first three pairs of buttons indicated at 32*a*. As stated above, the speed pair of buttons indicated at 32*b* are defined by the DIP switches 50 on the back of the Transmitter. START and twist lock E-STOP buttons 32*c* and 32*d* are not configurable. The first three button pairs 32*a* of the Transmitter 14*b* can be reconfigured for different functions using the RCM Configuration Generator 26, and then transferring the configuration file 26*a* to the Transmitter 14*b* and Receiver 16 through the RCM Interface 28 in the same manner as described above with respect to the Basic Transmitter 14*a* and shown in FIG. 6B.

FIG. 7 is a block diagram of an example Battery Monitor/Power Management circuit 52*ab* deployed in a Basic Transmitter 14*a* or a Standard Transmitter 14*b* in accordance with an example embodiment. The Battery Monitor/Power Management circuit 52*ab* has processor 53 (e.g., an EEPROM) included in its assembly, as shown in FIG. 7, to track charging cycles, initial Amp Hour capacity and current Amp Hour capacity. The Standard Transmitter 14*b* is configured to monitor current supplied by the battery and voltage of the battery 42 to determine the expected operating time left for the Transmitter. Start Up operation of the Standard Transmitter can be triggered by activating the E-Stop button 32*d*. In this time, a latch circuit 57 can connect the battery to the Standard Transmitter 14*b* for operation. During the power down/time out expiration, the processor 53 can reset the latch and disconnect the battery power from the Standard Transmitter 14*b* before the discharge of the power supply 55 capacitor 55*a* for proper power down sequencing. The Standard Transmitter 14*b* charges the battery 42 during installation through the USB-C connection 46. During the charge operation, the USB-C connection 46 charges the battery 42 and supplies power to the Standard Transmitter 14*b* for an efficient battery charge cycle. At the beginning of the charge cycle, the processor 53 detects the USB-C voltage and measures the no load battery voltage. After the processor 53 determines battery no load voltage, the processor 53 connects the USB-C 46 to the battery 42 as indicated at 59 for the charging cycle.

By way of an example, the Standard Transmitter 14*b* can analyze the percentage of battery remaining and give appropriate indications at the following levels:

| Battery LED (Tri-Color) Battery Monitor | |
|---|---|
| Battery Life >50% | Green |
| Battery Life >20%, <50% | Yellow |
| Battery Life >10%, <20% | Red |
| Battery Life <10% | Slow Blinking Red, After Operation will not restart |
| Battery replacement | Fast Blinking Red |

Below 10% battery life the Standard Transmitter 14*b* will not allow operation. The Transmitter can also analyze the percentage of battery charging status and give appropriate indications at the following levels:

| Battery LED (Tri-Color) Battery Monitor | |
|---|---|
| Battery Charge 100% | Solid Green |
| Battery Charge >90%, <100% | Blinking Green |
| Battery Charging <90% charged | Blinking Yellow |
| Battery Charge Fault | Red |

The Standard Transmitter 14*b* has a USB-C connection 46 accessible externally to the Standard Transmitter (e.g., through the battery compartment 44) to obtain data logs of the device. The Logs can be accessed through the RCM Interface Software (e.g., RCM Configuration Generator 26) to obtain information on the RCM-device 12. Operations, Fault Occurrences, Operation Time, Pairing Configuration, and Battery Condition.

The processor 36 in the Standard Transmitter 14*b* analyzes and reports faults during normal operation and shows them by illuminating the Communication LED 34 either solid for Transmitter faults or intermittently flashing for a Receiver fault. Operation will cease, and the Display 54 gives details as to the nature of the fault. To recover from a fault, an operator generally reconciles the originating fault. For some faults, an operator performs a System Startup procedure to continue operation. For example, the processor 36 can monitor for Loss of Communication (e.g., the Transmitter 14*b* is currently communicating with a Receiver 16 and it does not get a message acknowledged within 1 second). To resume radio communications after a Loss of Communication, an operator must press START/HORN button 32*c*. The processor 36 can also monitor for Invalid Combination of Switches. For example, if an invalid combination of Transmitter switches is detected, the Transmitter 14*b* will disable the motion having the fault. When this error is cleared, the Communication LED 34 can return to normal and normal operation will resume for this motion. The processor 36 can also monitor for the Tilt Switch 56 activation. As stated above, the Standard Transmitter is equipped with a Tilt Switch 56 which must remain <30 degrees to remain functional. To resume radio communications after Tilt Switch 56 activation, the operator must restore the Standard Transmitter to a proper angle and press START/HORN button 32*c*. The processor 36 can also monitor for Receiver 16 Faults (e.g., If the Transmitter 14*b* is currently communicating with a Receiver 16 and there is an error reported by the Receiver 16). Action to mitigate this type of failure is generally undertaken by the Receiver 16 and further troubleshooting is performed by assessing the Receiver separately.

Figure 11A:
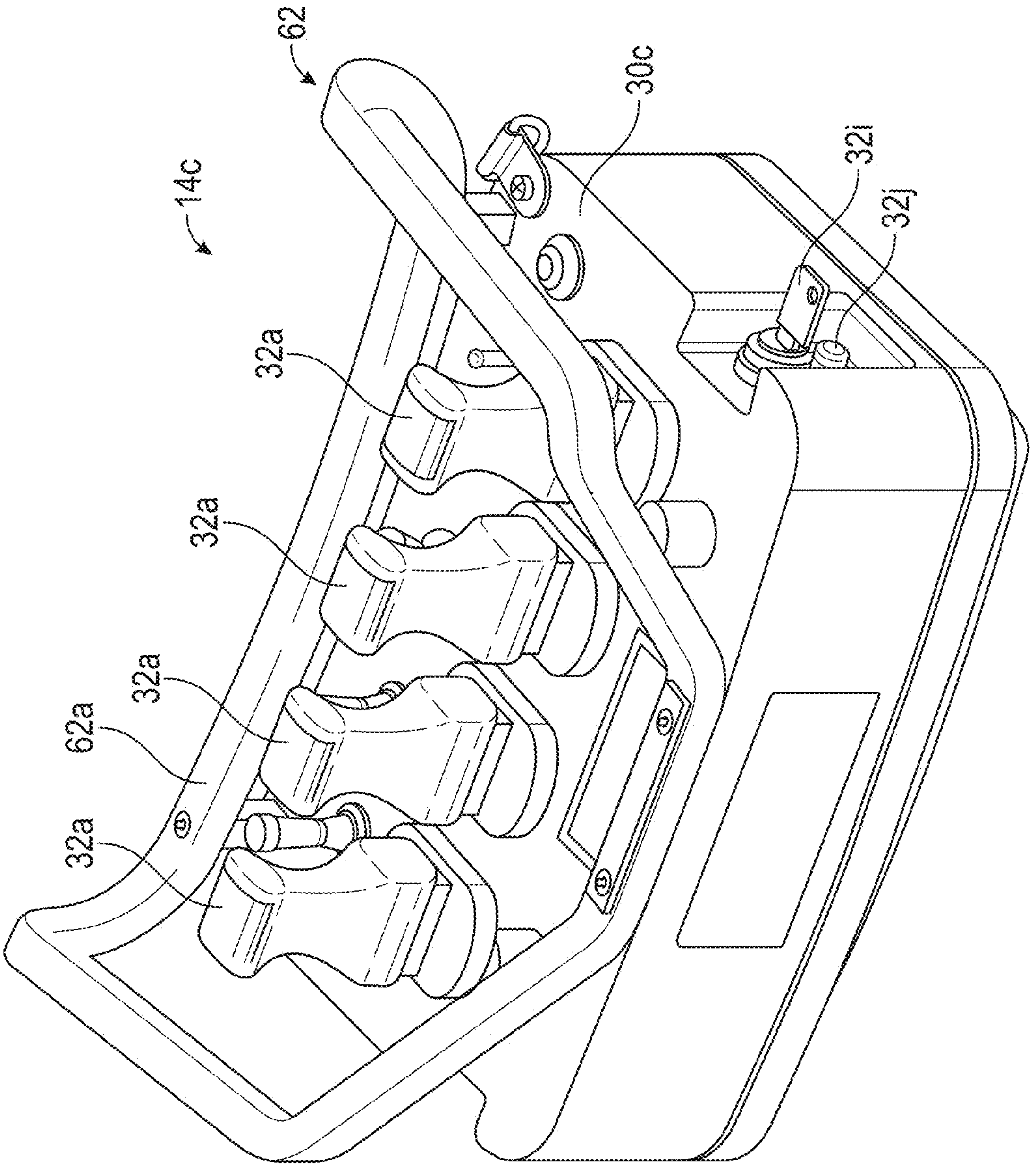
FIGS. 11A, 11B and 11C are, respectively, top, bottom and side perspective views of an example Belly Box Transmitter constructed in accordance with an example embodiment.
Figure 15A:
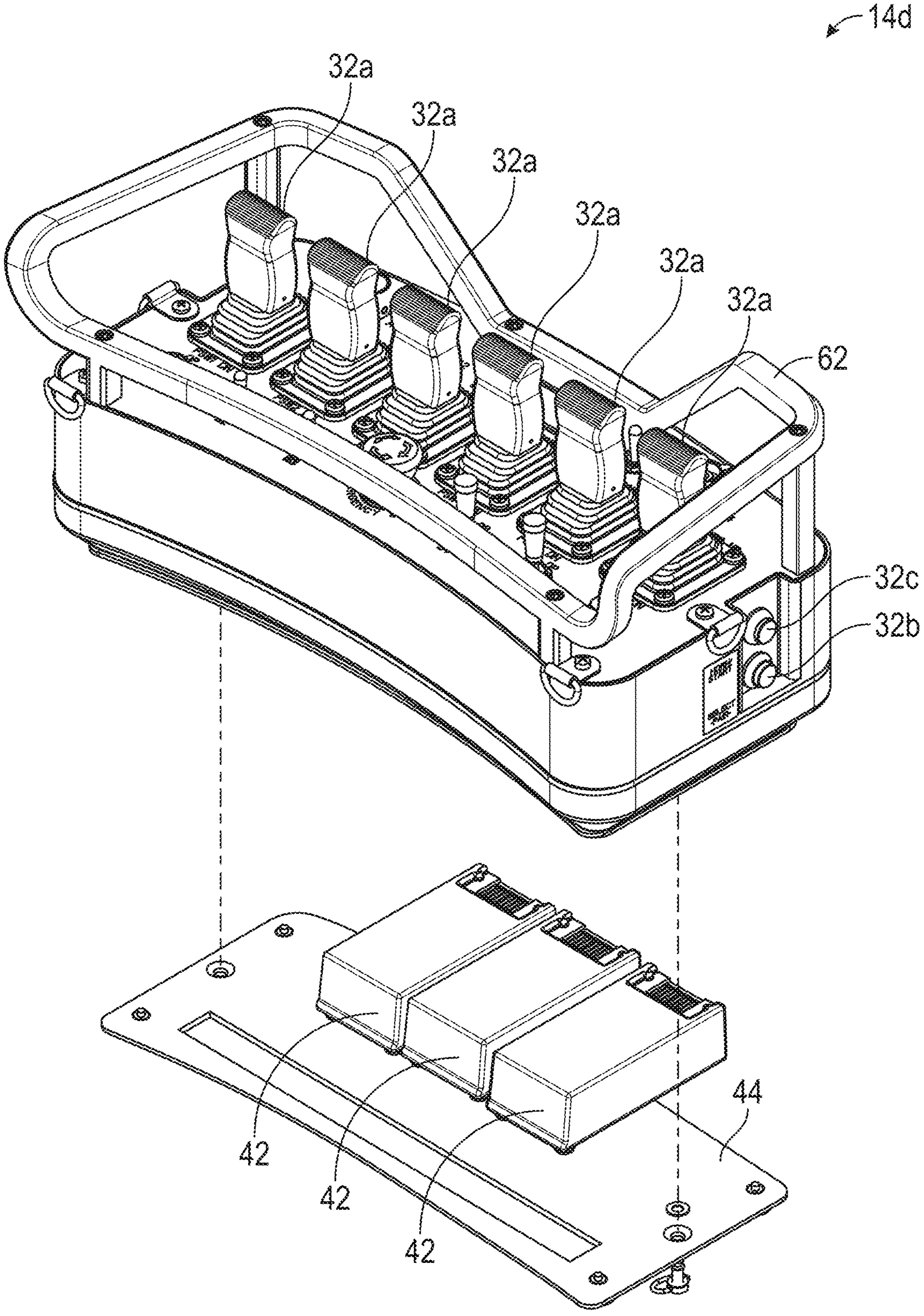
FIGS. 15A and 15B are, respectively, top and bottom perspective views of an example Mill-Style Belly Box Transmitter constructed in accordance with an example embodiment.
Figure 15B:
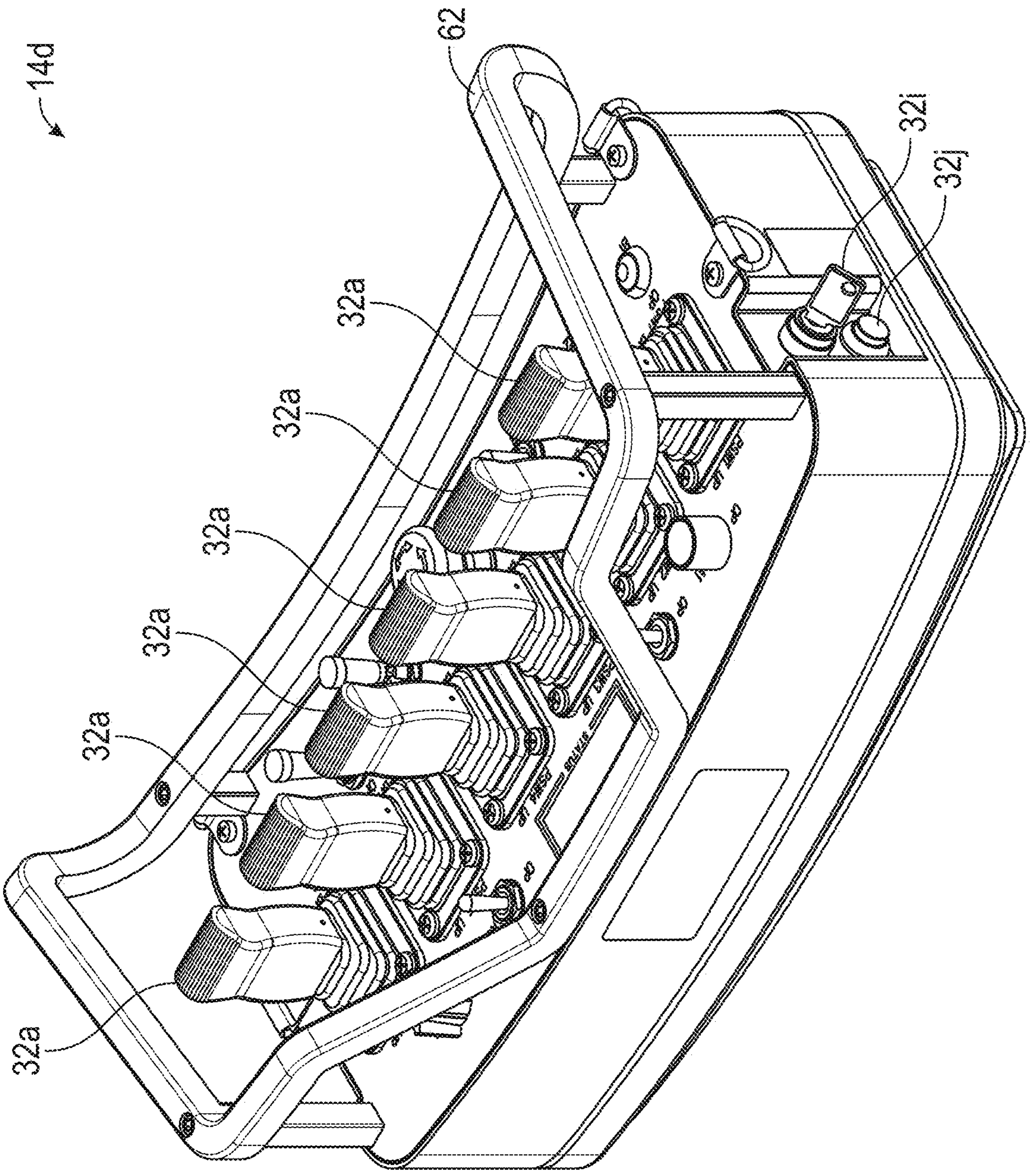
Figure 16:
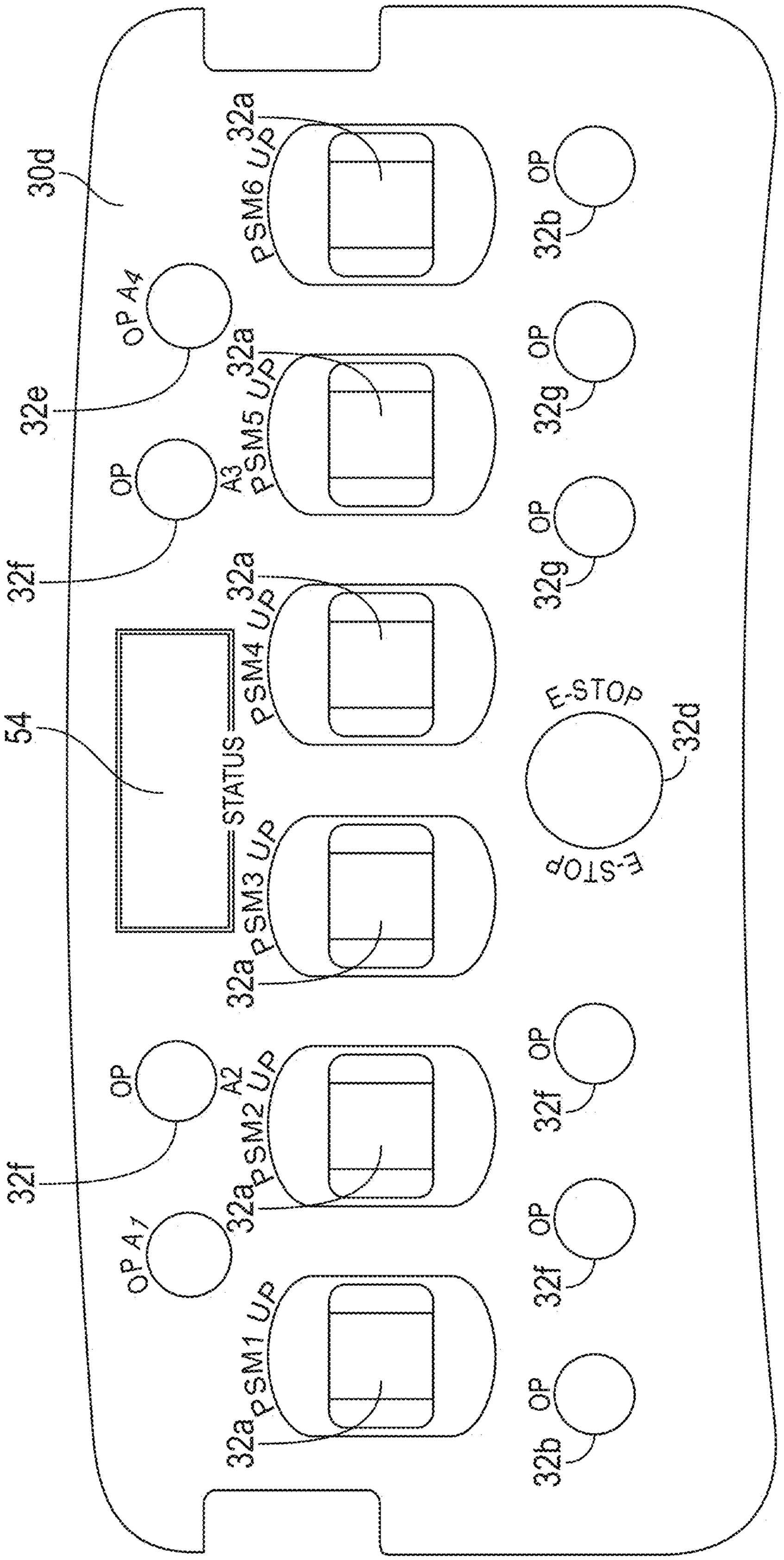
FIG. 16 is a top view of the user interface of a Mill-Style Belly Box Transmitter in accordance with an example embodiment.
Figure 17:
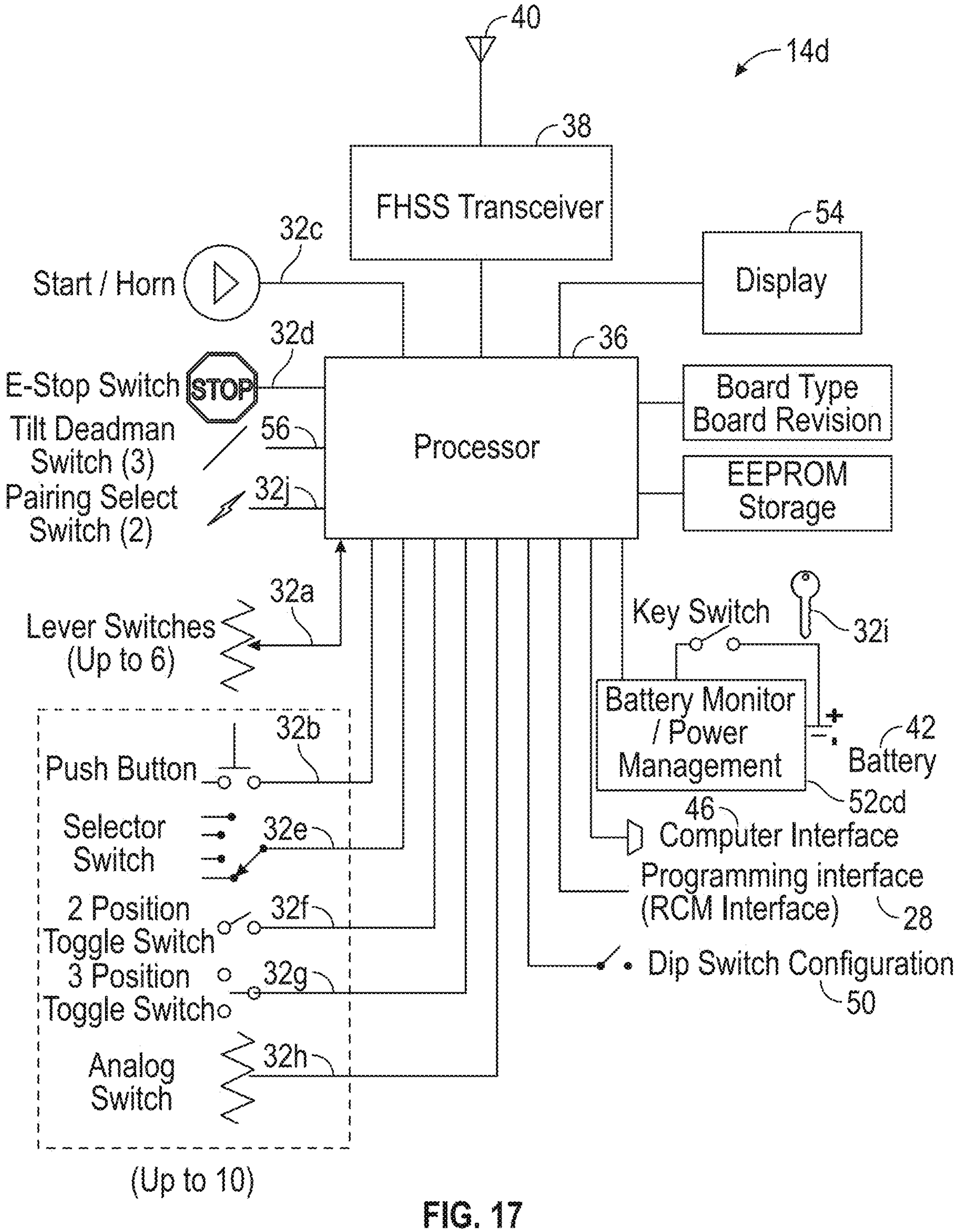
FIG. 17 is a block diagram of a Mill-Style Belly Box Transmitter in accordance with an example embodiment.

In contrast with the handheld form factors of the Basic and Standard Transmitters 14*a* and 14*b* described above (e.g., with reference to FIGS. 4A and 4B and FIGS. 8A and 8B), another form factor for a Transmitter 14 in the improved Radio Control System 10 that is a Belly Box form factor, which will now be described with reference to the Belly Box Transmitter 14*c* shown in FIGS. 11A-11C and the Mill-Style Belly Box Transmitter 14*d* shown in FIGS. 15A and 15B. In accordance with advantageous embodiments of the present disclosure, the Belly Box Transmitter 14*c* shown in FIGS. 11A-11C and the Mill-Style Belly Box Transmitter 14*d* shown in FIGS. 15A and 15B are both provided with a cage or safety bar 62 on a Belly Box or console with switches so that, if the Transmitter gets dropped, the safety bar 62 can prevent inadvertent button presses or motions. At least a portion 62*a* of the safety bar is curved to provide a comfortable place for an operator to rest their hands rest on the bar. Actuators on the Belly Box Transmitter 14*c* allow an operator flexibility to select the type actuator and their positions on the console or Belly Box. The Belly Box-type console can be provided with a strap connected to harness attachment D-rings 64 to facilitate a user wearing the Belly Box console at their waist level for convenient and comfortable access and manipulation of the switches and other user inputs on the console.

With reference to FIGS. 11A-11C, 13 and 14, the Belly Box Transmitter 14*c* is used in industrial environments and includes actuators on a user interface 30*c* to operate a crane or other mobile equipment. The battery-operated Belly Box Transmitter 14*c* has various control inputs 32*a*, a twist lock E-STOP button 32*d*, a START button 32*c*, a Power ON/OFF key switch 32*i*, a PAIRING switch 32*j*, a SELECT switch 32*e* and a Display 54. The Belly Box Transmitter 14*c* wirelessly sends the status of its buttons to a line powered Receiver(s) which in turn can control electrical outputs associated with running cranes or other mobile equipment 12. The Belly Box Transmitter 14*c* is primarily designed to operate with the Expandable Receiver 16*c* and the Digital Receiver 16*b*, but can also operate with the Standard Receiver 16*a*. In accordance with an advantageous embodiment of the present disclosure, the Belly Box Transmitter 14*c* is a customer defined, configurable belly box.

Figure 11B:
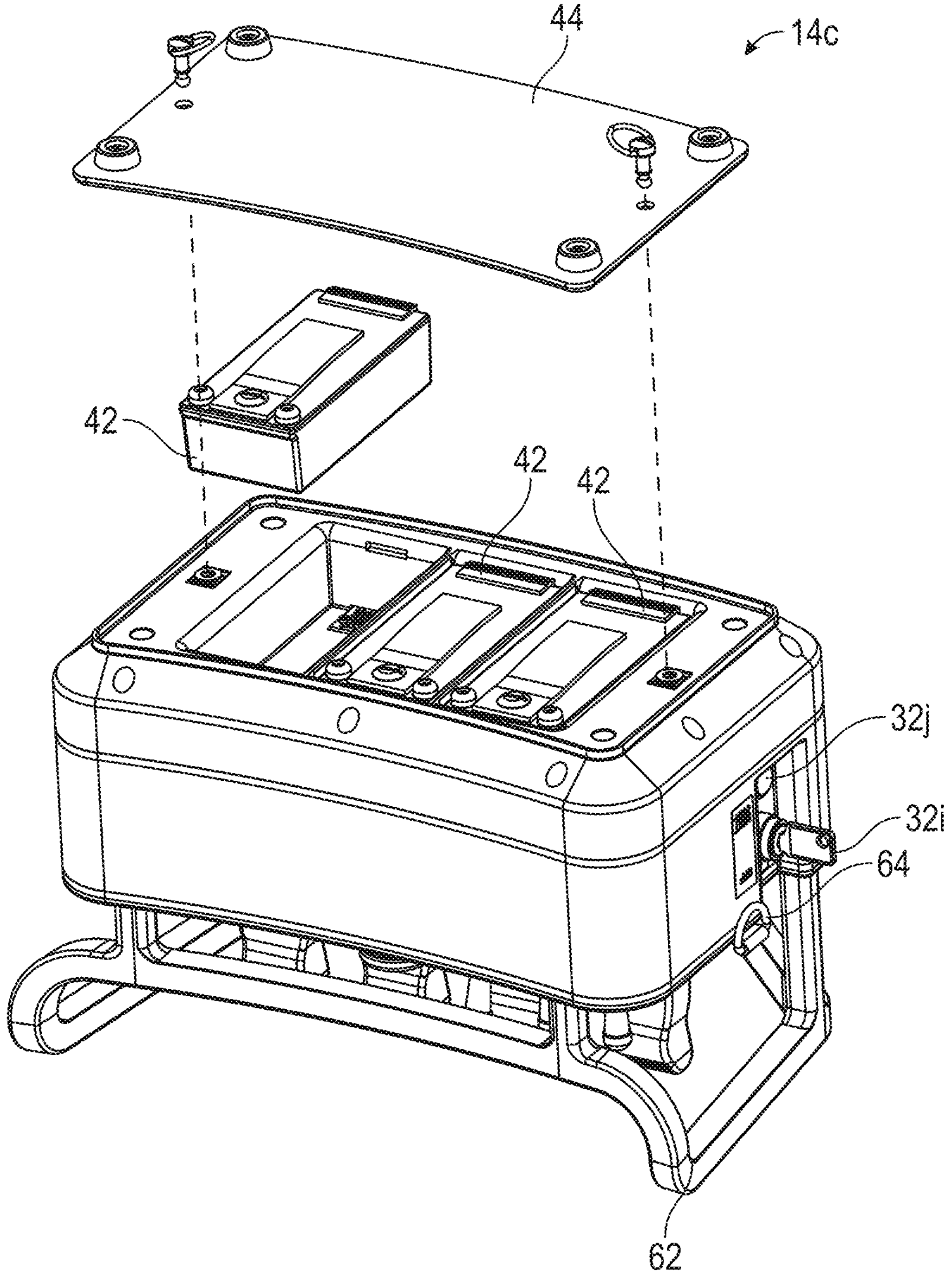
Figure 11C:
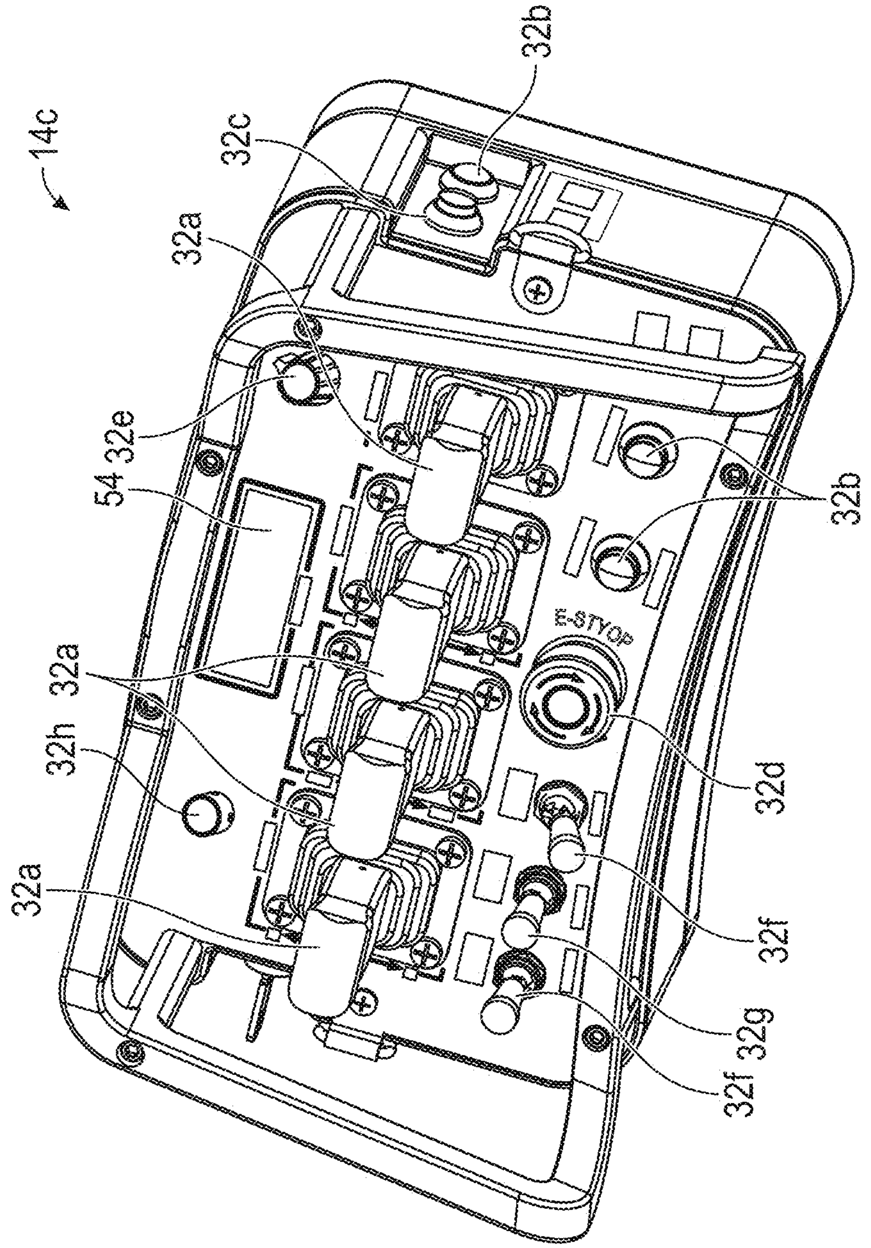

With reference to FIGS. 11B and 11C, the following Belly Box Transmitter 14*c* components are shown and labeled as follows:

1. Paddle Switches 32*a;*
2. Momentary Pushbutton 32*b;*
3. Locking Two Position Toggle Switch 32*f;*
4. Three Position Toggle Switch 32*g;*
5. OLED Display 54;
6. Removable Battery 42 in a battery compartment 44;
7. Side Mount Horn/Start Pushbutton 32*c;*
8. Side Mount Selector Pushbutton 32*b;*
9. Emergency Stop (E-STOP) Twist Lock 32*d;*
10. Keylock On-Off Switch 32*i;*
11. Selector Switch 32*e;*
12. Potentiometer 32*h;*
13. Side Mount Pairing Pushbutton 32*j*; and
14. Ref Des 14 Harness Attachment D-Rings 64.

Figure 13:
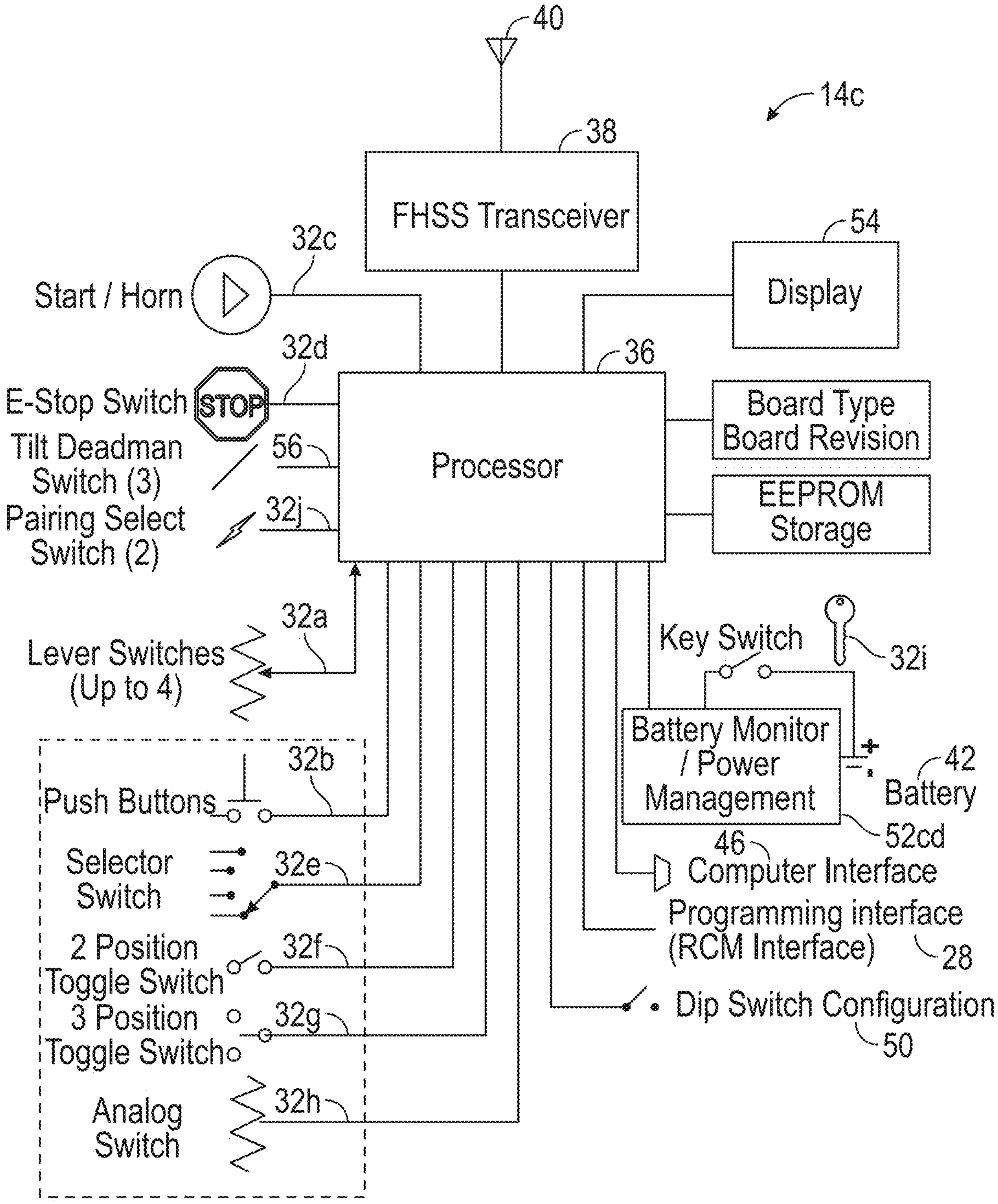
FIG. 13 is a block diagram of a Belly Box Transmitter in accordance with an example embodiment.

FIG. 13 is a block diagram of a Belly Box Transmitter 14*c* in accordance with an example embodiment. The Belly Box Transmitter 14*c* has a processor 36 and a transceiver module 38. The transceiver module 38 has a built-in antenna 40 to prevent damage and to provide adequate support is provided to ensure the antenna does not separate from the transceiver during severe shock loading. For safety reasons, the Belly Box Transmitter 14*c* is provided with a Tilt Switch 56 (e.g., two pendulum switches that are mounted inside the Transmitter) that can disable the Transmitter 14*c* when the Transmitter is tipped 30° from normal front to back position or from side to side beyond an acceptable level position. The Belly Box Transmitter 14*c* is further provided with a Deadman Switch 56 such as a SPST momentary pushbutton or actuator bar that must be maintained to enable operation. The Belly Box Transmitter 14*c* has a Battery Monitor/Power Management circuit 52*cd* described in connection with FIG. 14 that is essentially the same as the Battery Monitor/Power Management circuit 52*ab* deployed in the Basic and Standard Transmitters 14*a* and 14*b* and described above in connection with FIG. 7.

Figure 12:
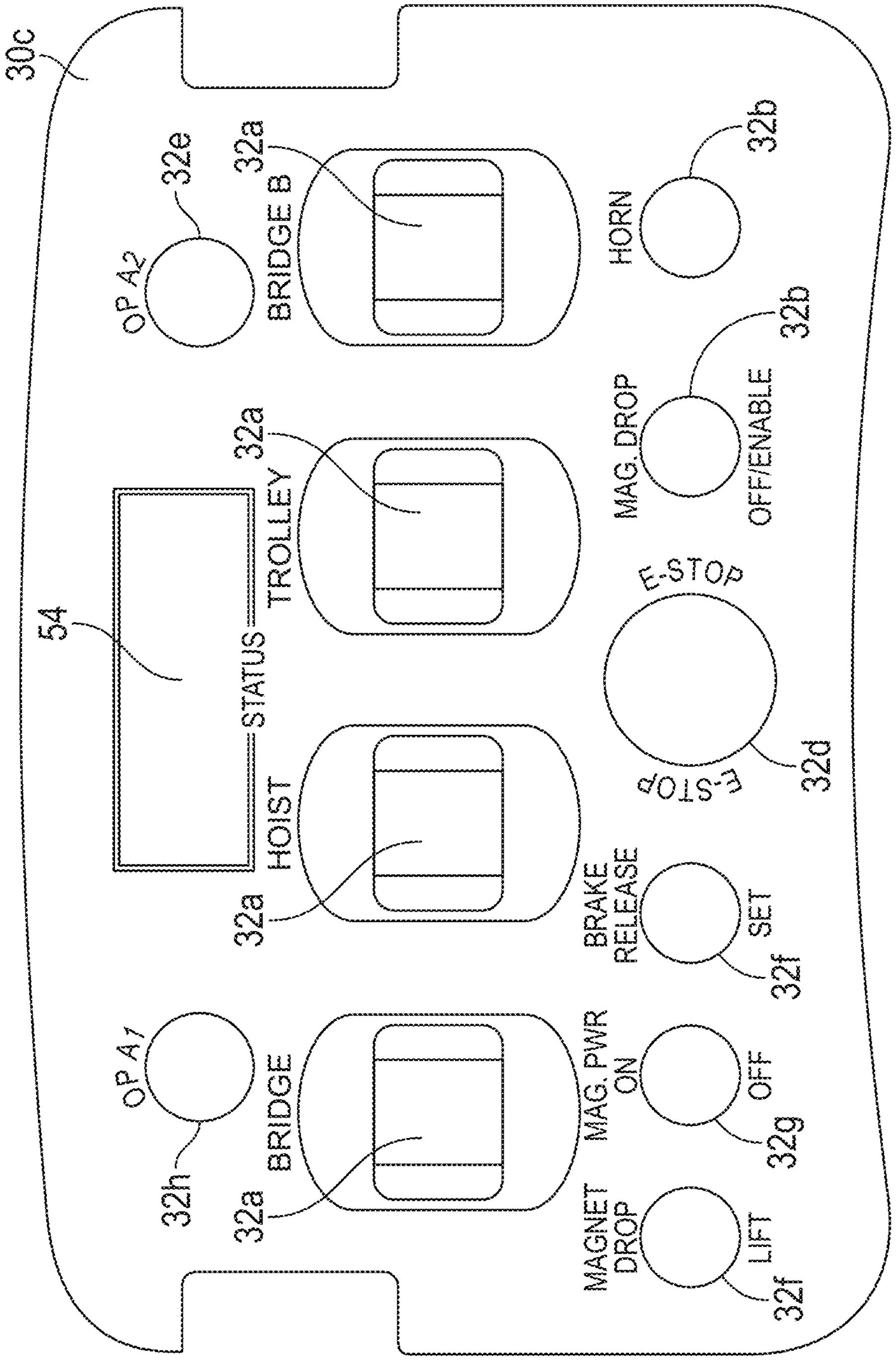
FIG. 12 is a top view of the user interface of a Belly Box Transmitter in accordance with an example embodiment.

With reference to FIGS. 12 and 13, the Belly Box Transmitter 14*c* has a standard set of controls for crane operation, for example:

- One Side-mounted Start/Horn button 32*c* to initiate operation of the crane;
- One Emergency Stop Twist Lock button 32*d* to terminate operation of the crane;
- Two Side Mounted Pairing switches 32*j* to link the belly box to a receiver;
- One Side Mounted Removable Key Switch 32*i* to Power the belly box; and
- One Display 54 to convey crane operation to the operator.

These Buttons 32 are also used for self-diagnostics of the Belly Box Transmitter 14*c*, such as stuck or open button contacts. The Display 54 provides detailed information to the operator such as, but no limited to, Motion/Speed Indication, Function Activation, Maintenance Mode/diagnostics, Overall battery Status, Pairing Selections, Currently Paired Device Name, E-Stop Activation, and Tilt Warning.

With continued reference to FIGS. 12 and 13, the Belly Box Transmitter 14*c* has up to four bidirectional spring-to-center Lever Switches or Paddle Switches 32*a* with up to eleven programmable lever status indications such as:

- Vibration at Transition—The lever can vibrate momentarily at the transition between speeds. The indication of the speed is also on the display.
- Vibration at Speed—The lever can vibrate at a predetermine rate at each defined speed. The higher speed the increase in vibration amplitude. The indication of the speed is also on the display.

None—The lever has no vibration. The indication of the speed is only on the display.

The Belly Box Transmitter 14*c* can have configurable operators based on Customer requirements and application including the following Switch Configurator positions:

Paddle Switch Position PSW1;
Paddle Switch Position PSW2;
Paddle Switch Position PSW3;
Paddle Switch Position PSW4;
Operator Position A1;
Operator Position A2;
Operator Position B1;
Operator Position B2;
Operator Position B3;
Operator Position B4; and
Operator Position B5.

As shown in FIG. 13, the Belly Box Transmitter 14*c* is be operated with up to seven Auxiliary Switches including, but not limited to, one or more Pushbutton Switches 32*b*, a Two Position Toggle Switch 32*f*, a Three Position Toggle Switch 32*g*, a two through ten configurable Selector Switch (maximum of 1) 32*e*, and an Analog Switch (maximum of 1) 32*h*. To implement the different functions, the RCM Interface Software 28 conveys information to the processor 36 to correctly configure the signals. The Four Position Selector Switch 32*e* and Analog Switch 32*h* have a dedicated input to the processor 36.

Figure 14:
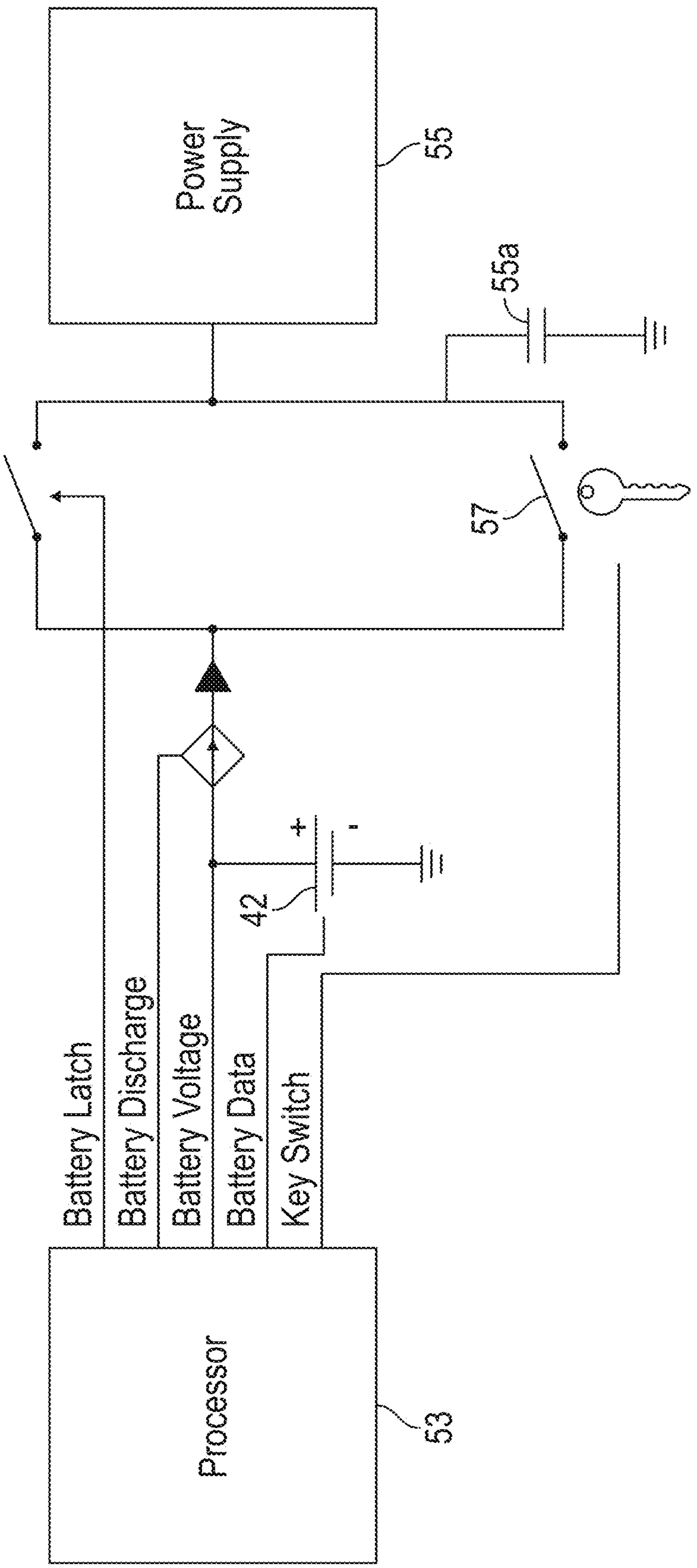
FIG. 14 is a block diagram of a Battery Monitor/Power Management circuit deployed in a Belly Box Transmitter or Mill-Style Belly Box Transmitter in accordance with an example embodiment.

FIG. 14 depicts example Belly Box Transmitter 14*c* battery connections. The Belly Box Transmitter 14*c* is provided with Lithium batteries 42 (e.g., 4 Lithium batteries) that are replaceable through a quick connect battery compartment 44 shown in FIG. 11B. Each battery 42 has an EEPROM included in its assembly to track charging cycles, initial Amp Hour capacity and current Amp Hour capacity. For example, one through three batteries 42 can be installed at one time. The batteries 42 are charged externally to the Belly Box Transmitter 14*c*. Power up of the Belly Box Transmitter 14*c* is triggered by turning the POWER Key Switch 32*i* to the ON position. In this time, a latch circuit 57 can connect the battery to other components in the Belly Box Transmitter 14*c* for operation. During the power down/time out expiration, the processor 36 can reset the latch 57 and disconnect the battery power from these other components in the Belly Box Transmitter 14*c* before the discharge of the power supply 55 capacitor 55*a* for proper power down sequencing. Recycling the Start Switch 32*c* is needed for further operation of the Belly Box Transmitter 14*c*.

The Belly Box Transmitter 14*c* has a DIP switch 50 setting array accessible through the battery compartment 44 to configure unique settings to the Transmitter 14*c* such as, but not limited to, Inactivity Time Selection, Tilt Switch Activation, and Deadman Activation. The Belly Box Transmitter 14*c* is factory configured by customer request with the correct number and type of switches required by the system. The Transmitter 14*c* arrangement of levers/switches/buttons is custom based on the customers' needs and, as such, a custom configuration is loaded into each one. Twist lock E-STOP button 32*d*, START button 32*c*, ON/OFF key switch 32*i*, NEXT button and SELECT momentary pushbuttons 32*b* are not configurable. The RCM Configuration Generator 26 is used to generate a custom switch configuration (e.g., using a configuration file 26*a*). The configuration is then transferred to the Transmitter 14*c* through the RCM Interface 28 via USB, for example. The Transmitters 14 and Receivers 16 can be modified by a system user with the RCM Interface 28 Software. The Transmitter/Receiver pair configuration and logs can be accessed using the RCM Interface 28 Software.

The processor 36 in the Belly Box Transmitter 14*c* analyzes and reports faults during normal operation and shows them on the display. To recover from a fault, an operator generally reconciles the originating fault. For some faults, an operator performs a System Startup procedure to continue operation. For example, the processor 36 can monitor for Loss of Communication (e.g., the Transmitter 14*c* is currently communicating with a Receiver 16 and it does not get a message acknowledge within 1 second). To resume radio communications, press START/HORN button 32*c* is used. The processor 36 can also monitor for an Invalid Combination of Switches. For example, if an invalid combination of Transmitter 14*c* switches 32 is detected, the Belly Box Transmitter 14*c* can disable the motion having the fault. When this error is cleared, the normal operation can resume for this motion. The processor 36 can also monitor the Tilt Switch 56 which should remain <30 degrees to remain functional. When this error is cleared, normal operation can resume. The processor 36 also monitors the Deadman Switch or Bar 56 which should remain activated for normal operation. In the event of a Deadman fault, the Display 54 can indicate a fault and all operation will stop. When this error is cleared, normal operation will resume. The processor 36 also monitors Receiver Faults (e.g., if the Transmitter 14*c* is currently communicating with a Receiver and there is an error reported by the Receiver 16). Action to mitigate this failure can be by the Receiver and further troubleshooting is performed by assessing the Receiver separately.

The Mill-Style Belly Box Transmitter 14*d* will now be described with reference to FIGS. 15A and 15B, 16 and 17. The Mill-Style Belly Box Transmitter 14*d* is designed for use in Mill environments and includes actuators to operate a crane 12. Since the Mill Style Belly Box Transmitter 14*d* is used in Mill environments, the Mill Style Belly Box Transmitter is a more durable and expandable version of the industrial Belly Box Transmitter 14*c*. For example, the Mill-Style Belly Box Transmitter 14*d* has up to six bidirectional spring to center Lever Switches or Paddle Switches with up to 11 programmable lever status indications instead of only the four bidirectional spring to center Lever Switches 32*a* provided in the Belly Box Transmitter 14*c* described above with reference to FIGS. 11A-11C and 12-14. Both of the Belly Box Transmitter 14*c* and the Mill-Style Belly Box Transmitter 14*d* are highly configurable to adapt to many crane topologies. Their designs include levers or joysticks 32*a*, 32*c*, toggle switches 32*f*, 32*g*, 32*h*, selector switches 32*e* in addition to pushbuttons 32*b*, 32*j*, locking E-Stop button 32*d*, Key Switch 32*i*, LED indicators 34 for power, communications, and fault events, and a Display 54 for descriptive information.

The Basic, Standard, Belly Box, and Mill-Style Belly Box Transmitters 14*a* through 14*d* are advantageous because they are configured to have a Transmitter Maintenance Mode, among other reasons and advantages. Operations such as, but not limited to, Discover, Delete, Factory Reset, General Diagnostics, Radio Diagnostics, Rx Log Transfer, Rx Config Transfer are initiated through this Maintenance Mode. Entering the Maintenance Mode is possible using user interface buttons and may vary depending on the type of Transmitter (i.e., Basic, Standard, Belly Box, or Mill-Style Belly Box Transmitter 14*a* through 14*d*). A Transmitter 14 maintains a selection list of Receivers 16 which it builds from doing a Discover. A Transmitter 14 is placed into Discover Mode to add Receivers 16 to the selection list. A Transmitter 14 is placed into Delete Mode to delete Receivers 16 from the selection list. A Transmitter 14 is placed into Factory Reset mode to restore the Transmitter back to factory settings. To perform General Diagnostics, a Transmitter 14 is placed into General Diagnostic Mode. A Transmitter 14 can be placed into Radio Diagnostic Mode to perform diagnostics. To fetch the Receiver 16 log, a Transmitter is placed into Receiver Log Transfer Mode. The Transmitter 14 generally only has available space to store a selected number of the last logs transferred. These logs can be transferred to a PC via the RCM Software 26, 28. A Transmitter 14 is placed into Receiver Configuration Transfer Mode to transfer the configuration to the Receiver 16. Prior to the Receiver Configuration Transfer, a user needs to load a configuration (e.g., using a configuration file 26*a*) through the RCM Software 26, 28 onto the Transmitter 14.

The different Receivers 14 provided in the platform of the improved radio control system 10 will now be described in accordance with example embodiments of the present disclosure. The different example Receivers 16 are: a Standard Receiver 16*a* described with reference to FIGS. 18A-18C and 19, a Digital Receiver 16*b* described with reference to FIGS. 18A-18C and 20, and an Expandable Receiver 16*c* described with reference to FIGS. 21A-21C and 22. Example Expansion Cards 22 for use with the Expandable Receiver 16*c* are described with reference to FIGS. 23-27. FIGS. 28-32 illustrate different example installations for the Receivers 16.

The Standard, Digital and Expandable Receivers 16*a* through 16*c* each have at least the following common features:

- An antenna 74 on the Receiver 16 that is mounted externally to the Receiver enclosure and with optional length extensions;
- An externally visible LED 90 for fault indication along with internal diagnostic LEDs 88 and optionally a display (not shown) for detailed information;
- A functional ability to support self-diagnostics; and
- A data log that is stored for Receiver operations and fault occurrences which can be accessed through a computer interface or through a paired receiver.

The Standard Receiver 16*a* described with reference to FIGS. 18A-18C and 19 below is configured for use in commercial environments and includes minimum features to operate a crane to make it an affordable option for more simple or basic crane applications. The Standard Receiver 16*a* also comprises relay outputs to control an AC Crane. The relay outputs have pluggable connectors on a single PCBA for convenient field replacement, and a color-coded and numbered wire pigtail cable is provided to facilitate field installation. The Standard Receiver has a CANbus interface to further expand the number of control outputs. The external cards can be snap-track or enclosure mounted. The external cards can be relay outputs to operate AC or DC cranes, analog outputs to control a VFD Crane or a latching relay output to control requirement to remain in current state during loss of power. Each card has its own set of LEDs for fault indications.

The Digital Receiver 16*b* described with reference to FIGS. 18A-18C and 20 below is configured for use in either commercial or industrial environments. The Digital Receiver has a network connection to access system level equipment in a plant or other installation location that includes network capable cranes. The Digital Receiver employs a CANbus architecture to expand to external cards for control operation. The external cards can be snap-track or enclosure mounted. The external cards can be relay outputs to operate AC or DC cranes, analog outputs to control a VFD Crane or a latching relay output to control requirement to remain in current state during loss of power. Each card its own set of LEDs for fault indications.

The Expandable Receiver 16*c* described with reference to FIGS. 21A-21C and 22 below is also configured for use in either commercial or industrial environments, and also has a network connection to access system level equipment in a plant or other installation location that includes network capable cranes. The Expandable Receiver includes configurable output cards internal to its enclosure to control an AC Crane. The pluggable cards 22 can be relay outputs to operate an AC crane or analog outputs to control a VFD crane. The outputs have removable connectors on the configurable output cards for convenient field replacement, and a color-coded and numbered wire pigtail cable is provided to facilitate field installation. Each card has its own set of LEDs for fault indications. For added expansion, external cards can be installed in the system through a CANbus interface. The external cards can be snap-track or enclosure mounted. The external cards can be relay outputs to operate AC cranes, analog outputs to control a VFD Crane or a latching relay output to control requirement to remain in current state during loss of power. Each card has its own set of LEDs for fault indications.

A Receiver 16 (e.g., a Standard Receiver 16*a*, a Digital Receiver 16*b*, or an Expandable Receiver 16*c*) can generate the following Responses to the following example Transmitter Requests: a Discover Request (e.g., the Receiver can identify itself by sending a message containing its unique address along with other pertinent information); a Start Remote Operation Request (e.g., the Receiver can enable and verify the power to its outputs, and can act upon the received motion, speeds, and auxiliary functions based on its configuration settings); a Transfer Operational Log Request (e.g., the Receiver can send a history of control changes); and a Transfer Configuration Request (e.g., the Receiver can accept and store a set of configuration settings). For Wireless Remote-Control Operation of Equipment, a Transmitter can send status of all levers/switches/inputs to the paired Receiver(s) at a rate of <=300 ms intervals.

A Receiver 16 (e.g., a Standard Receiver 16*a*, a Digital Receiver 16*c*, or an Expandable Receiver 16*c*) updates its output status according to what inputs have changed. For Data Logging, the improved radio control system logs a history of Receiver control changes (e.g., via the Receiver or the Transmitter). The log can be transferred and viewed using the RCM Interface. For Shutdown, the Receiver typically does not have any power saving modes and will turn on when power is applied and turn off when power is disconnected.

A Receiver 16 (e.g., a Standard Receiver 16*a*, a Digital Receiver 16*b*, or an Expandable Receiver 16*c*) also performs Fault Detection/Safety Monitoring. For Fault Detection/Safety Monitoring, the improved radio control system analyzes and report faults (e.g., at the Receiver or Transmitted) during normal operation and shows them by illuminating the Fault LED as well as disabling power to its outputs. To recover from a fault, an operator generally must reconcile the originating fault. For some faults, the System Startup procedure on the Transmitter needs to be performed to continue operation. For a Main Line Contactor Fault, the Receiver 16 monitors the output status of the Main Line Contactor and, if there is a discrepancy in the status of what the Receiver 16 assumes the output status should be versus what it is, this will cause a fault and output power will be disconnected. For Loss of Communication (e.g., if the Receiver is currently communicating with a Transmitter 14 and it does not get a message acknowledged within one second), output power will be disconnected. To resume operation, an operator can re-establish communication between the Transmitter 14 and Receiver 14 by pressing the START/HORN button 32*c* on the Transmitter 14. For a CANbus Communication Fault (e.g., a fault has occurred if the Receiver 16 has not received a message from a configured CANbus slave(s) within one second), associated motions that are being controlled on this CANbus slave will be rendered inoperable but other motions can continue to operate. A Digital Receiver 16*b* can also be configured to monitor for an Ethernet 110 Communication Fault and/or for a MODBus 112 Communication Fault.

Figure 18A:
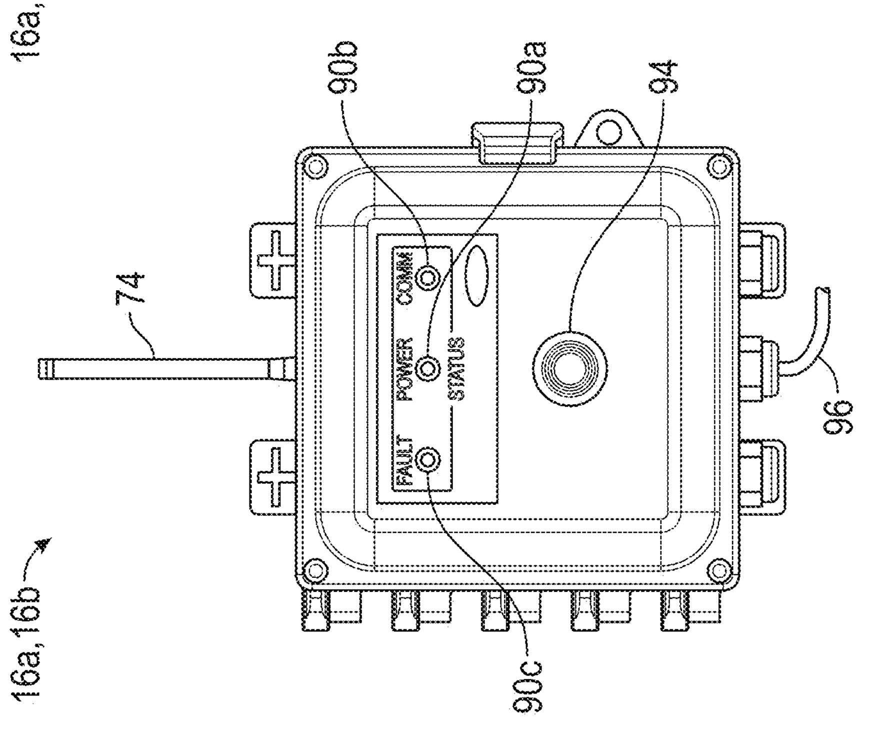
FIGS. 18A, 18B and 18C are, respectively, front, back and side views of an example enclosure for a Standard Receiver or a Digital Receiver in accordance with an example embodiment.
Figure 18B:
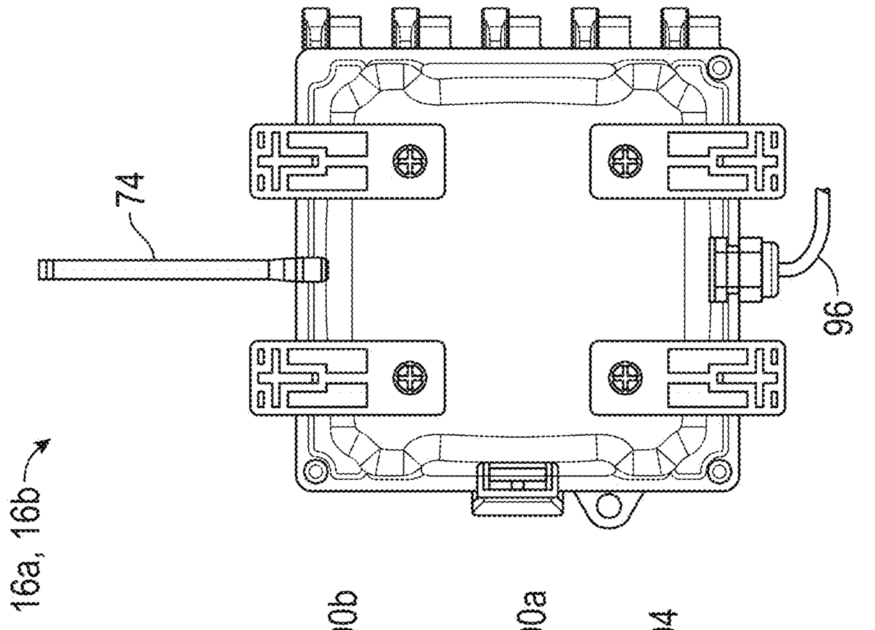
Figure 18C:
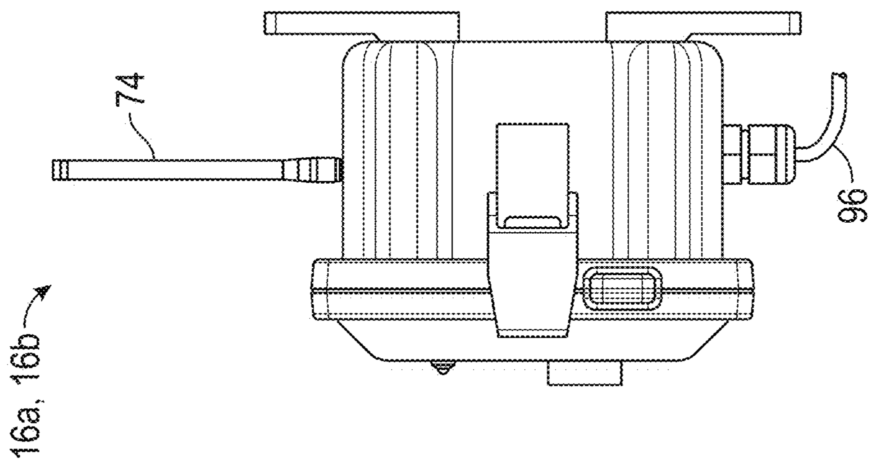
Figure 19:
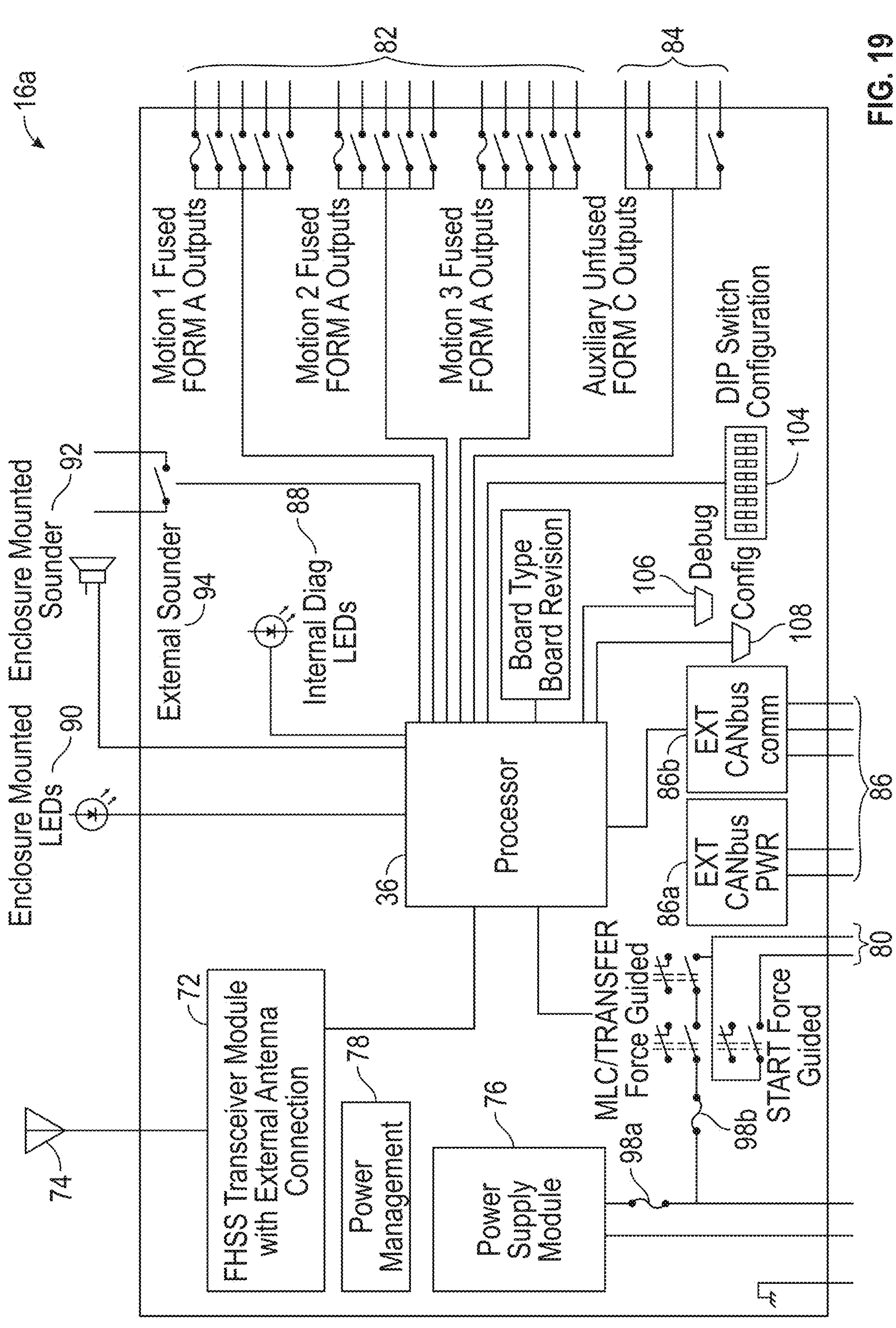
FIG. 19 is a block diagram of a Standard Receiver in accordance with an example embodiment.

FIGS. 18A, 18B and 18C are, respectively, front, side and back views of an example enclosure for a Standard Receiver 16*a* or a Digital Receiver 16*b* in accordance with an example embodiment. FIG. 19 is a block diagram of a Standard Receiver 16*a* in accordance with an example embodiment. With reference to FIGS. 18A-18C and 19, the Standard Receiver 16*a* is primarily configured to operate with the Basic Transmitter 14*a* (e.g., described in connection with FIGS. 4A through 7), but can also operate with the Standard Transmitter 14*b* (e.g., described in connection with FIGS. 8A through 10 and FIG. 7) with only 2 speed activation, as well as operate with the Belly Box Transmitter 14*c* (e.g., described in connection with FIGS. 11A through 14) or the Mill-Style Belly Box Transmitter 14*d* (e.g., described in connection with FIGS. 15A through 17) but with limited operation. The Standard Receiver 14*a* can be implemented, for example, with a number of PCBAs such as a Receiver Main Board shown in FIG. 19 with processor 36, a Transceiver Module 72 with external antenna connector to externally mount an antenna 74 for increased reception/transmission range, and a Power Supply Module. Further, the Standard Receiver 16*a* has at least the following features:

- Configurable Power Source 78;
- Main Line Contactor Interface 80;
- 12 Form A Outputs 82;
- 2 Form C Outputs 84;
- External CANbus interface 86 (e.g., power interface 86*a* and communication interface 86*b*) for further expansion;
- Internal Diagnostic LEDS 88;
- Enclosure Mounted LEDs 90;
- Enclosure Mounted Sounder 92;
- External Horn Connection 94; and
- Cable 96 (e.g., pigtail cable 96 shown in FIGS. 18A-18C that can be 4 feet for example).

For example, the Standard Receiver 16*a* is configurable by the Power Supply Module 76 to operate Universal AC (84-265 VAC) power supply or Low Voltage 24 Vac/Vdc power supply. The Standard Receiver 16*a* begins operation by handshaking between a Main Line Contactor (MLC) and its start function. An operator initiates a start operation from a Transmitter 14 that connects an external Start Relay Input to the Main Line Contactor through a Start Relay (e.g., using Start Force Guided relays) using a Main Line Contactor Interface indicated generally at 80. During the initial set up, the Standard Receiver 16*a* monitors force guided Main Line Contactor relays to verify a relay is not faulted or that other faults have not occurred. If Receiver 16*a* is faulted, the Receiver can discontinue start-up operation. With no faults, the Receiver 14*a* then enables its Main Line Contactor Relays for crane operation. The Internal Main Line Contactor relays are triggered through an output from the processor 36 and a watchdog timer. If the processor 36 output clears through an E-stop condition or system fault or a watchdog function clears through a processor failure, the Main Line Contactor Interface circuit indicated at 80 is disabled and power to all other outputs is disabled rendering the Receiver 16*a* inactive. The Receiver 16*a* further comprises one or more field replacement fuses (e.g., 98*a* and 98*b*) that protect the Power Supply Module 76 input, Main Line Contactor interface 80, and the selected motion outputs 82, 84.

With continued reference to FIGS. 18A-18C and 19, the Standard Receiver 16*a* is provided with enclosure mounted indicators 90 (e.g., LEDs). For example, the Standard Receiver 16*a* has connections for externally mounted LEDs 90 shown in FIG. 18A for user visual notification such as, but not limited to:

- Front panel mounted Power/Heartbeat LED 90*a* to indicate Receiver power and processor operation;
- Front panel mounted LED 90*b* to indicate pairing mode/wireless communication to a Receiver;
- Front panel mounted LED 90*c* to indicate a fault condition.

The Standard Receiver 16*a* also has an optional enclosure mounted sounder 92 for user audible notification.

With continued reference to FIGS. 18A-18C and 19, the External CANbus 86 provided to the Standard Receiver 16*a* allows for added output expansion. The address definition is defined on the external CANbus devices (e.g., card 22) by way of a selector switch 116 on the external CANbus devices (e.g., cards 22*a* through 22*d* shown in FIGS. 23-26). If the hardware configuration and the RCM Interface 28 software configuration do not synchronize, a fault is detected, and the Receiver will not operate. The Standard Receiver 16*a* is configured to operate with the Assemblies described below. The Digital Receiver 16*b* is configured to operate with the following Assemblies described below:

- ECFA—Expansion Card Form A Relay Output;
- ECFC—Expansion Card Form C Relay Output
- ECDR—Expansion Card for DC Crane Relays Outputs;
- ECAI—Expansion Card Analog Interface; and
- ECLO—Expansion Card Latching Output With continued reference to FIGS. 18A-18C and 19, the Standard Receiver 16*a* is equipped with 14 relays outputs. Functions of the relays can include but are not limited to:

- 3 bi-directional 2-speed motions (12 relay outputs) 82; and
- 2 Configurable Relays (2 single dedicated relay outputs) 84.

For the 3 bi-directional 2-speed motions, each motion pair is common fused, and correlate to the Motion/Speed Pushbuttons (e.g., 32*a*) on the Transmitters 14. For the two Configurable Relays 84, the outputs are not fused. Normally Closed and Normal Open Outputs are supplied, and are correlated to the fourth Speed/Auxiliary Pushbuttons (e.g., 32*b*) on the Transmitters 14 (e.g., 2 directional single speed motion, and two generic output contacts). The Standard Receiver further comprises a DIP switch 104 setting array to configure unique settings to the Receiver for such features as: Dip Switch Control or RCM configuration, Relay Output for Speed operation, External Sounder 92 Present, Channel Selection, and System Configuration. For example, 3 positions of the DIP switches 104 can be used to configure Relay Output Speed to be one of the following: Single Speed; Two Speed, shared speed relay; Two Speed Open/Closed Speed; Two Speed Closed/Closed Speed; Two Speed Slow/Fast Type A; or Two Speed Slow/Fast Type B. Features other than the following require the operator to use the RCM Interface software for configuration.

The Standard Receiver 16*a* can access data logs through the RCM Interface 28 software by either of two paths; that is, a USB connection 108 provided on the Receiver 16*a*, or remotely through the link established with a Transmitter 14. The data logs can include the following information: Receiver Operations, Fault Occurrences, Operation Time, and Pairing Configuration.

Figure 20:
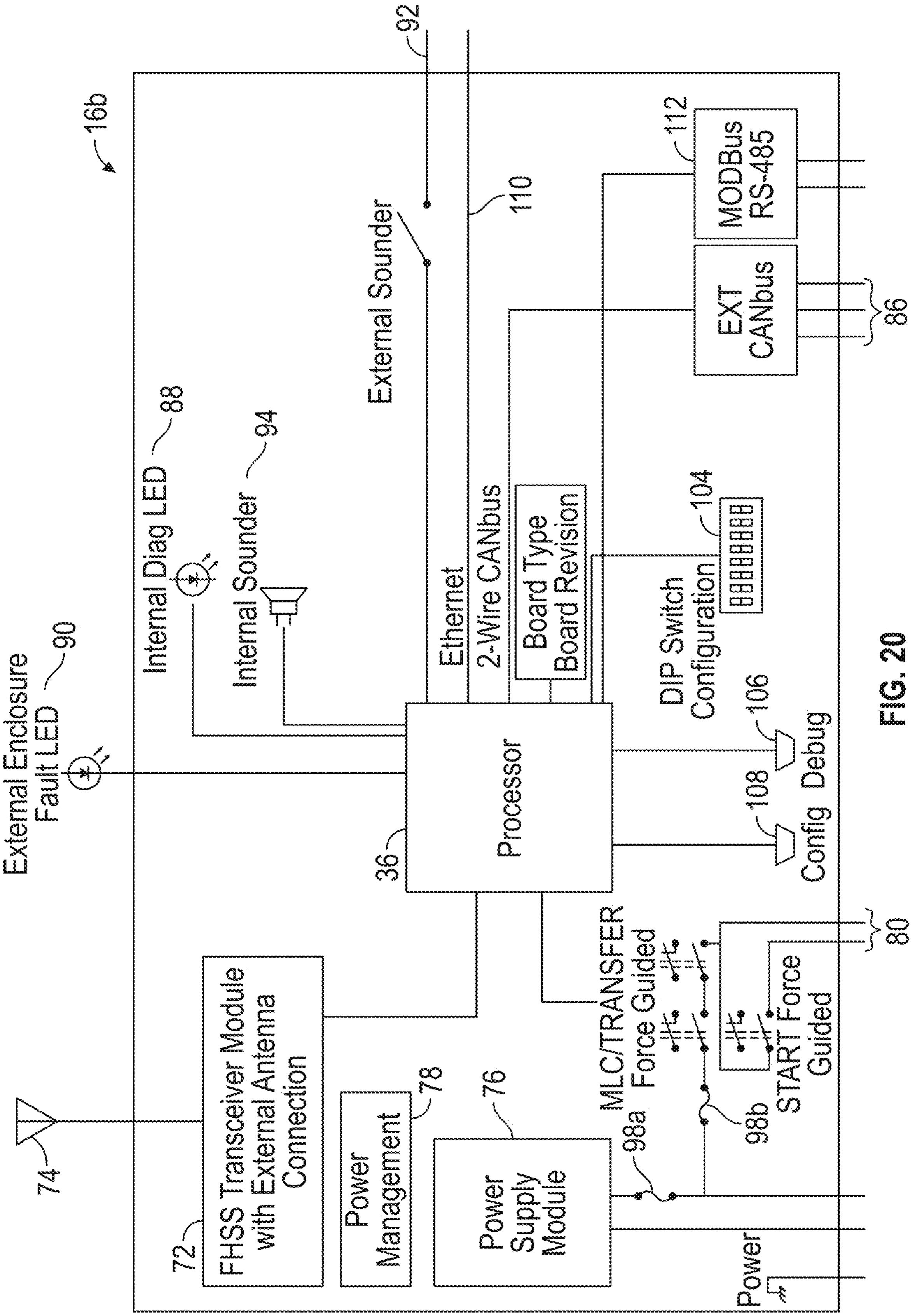
FIG. 20 is a block diagram of a Digital Receiver in accordance with an example embodiment.

FIG. 20 is a block diagram of a Digital Receiver 16*b* in accordance with an example embodiment. With reference to FIGS. 18A-18C and 20, the Digital Receiver 16*b* has a CANbus 86 that provides access to optional output control cards for digital and analog outputs based on crane requirements. An Ethernet port 110 is available to interface to a network to operate a crane 12 through PLCs or directly to a crane. The Digital Receiver 16*b* is primarily configured to operate with the Standard Transmitter 14*b* (e.g., described in connection with FIGS. 8A through 10 and FIG. 7), as well as operate with the Belly Box Transmitter 14*c* (e.g., described in connection with FIGS. 11A through 14) or the Mill-Style Belly Box Transmitter 14*d* (e.g., described in connection with FIGS. 15A through 17). The Digital Receiver 16*b* can also operate with the Basic Transmitter 14*a* (e.g., described in connection with FIGS. 4A through 7) but with limited operation. The Digital Receiver 16*b* can be implemented, for example, with a number of PCBAs such as a Digital Receiver Carrier Board shown in FIG. 20 with a processor 36, a Transceiver Module 72 with external antenna 74 connector to externally mount an antenna for increased reception/transmission range, and a Power Supply Module 76. Further, the Digital Receiver 16*b* has at least the following features:

- Configurable Power Source 78;
- Main Line Contactor Interface 80;
- External CANbus interface for further expansion 86;
- External Ethernet interface for network connections 110;
- Internal Diagnostic LEDS 88;
- Enclosure Mounted LEDs 90;
- Enclosure Mounted Sounder 92; and
- External Horn Connection 94.

For example, the Digital Receiver 16*b* is configurable by the Power Supply Module 76 to operate with a 24 Vdc power supply. Alternatively, the Digital Receiver can operate with a Universal AC (84-265 VAC) power supply. The Digital Receiver 16*b* begins operation by handshaking between a Main Line Contactor (MLC) and its start function. An operator initiates a start operation from a Transmitter 14 that connects an external Start Relay Input (e.g., using Start Force Guided relays) to the Main Line Contactor through the Start Relay using a Main Line Contactor Interface indicated generally at 80. During the initial set up, the Digital Receiver 16*b* monitors force guided Main Line Contactor relays to verify a relay is not faulted or that other faults have not occurred. If Receiver 16*b* is faulted, the Receiver can discontinue start-up operation. With no faults, the Receiver 16*b* then enables its Main Line Contactor relays for crane operation. The Internal Main Line Contactor relays are triggered through an output from the processor 36 and a watchdog timer. If the processor 36 output clears through an E-stop condition or system fault or a watchdog function clears through a processor failure, the Main Line Contactor Interface circuit indicated at 80 is disabled and power to all other outputs is disabled rendering the Receiver 16*b* inactive. The Digital Receiver Carrier Board further comprises one or more field replacement fuses (e.g., 98*a*, 98*b*) that protect the Power Supply Module 76 input, and the Main Line Contactor interface 80 located on the Digital Receiver Carrier Board.

With continued reference to FIGS. 18A-18C and 20, the Digital Receiver 16*b* is provided with enclosure mounted indicators 90 (e.g., LEDs). For example, the Digital Receiver has connections for externally mounted LEDs for user visual notification such as, but not limited to:

- Front panel mounted Power/Heartbeat LED 90*a* to indicate Receiver power and processor operation;
- Front panel mounted LED 90*b* to indicate pairing mode/wireless communication to a Receiver;
- Front panel mounted Fault LED 90*c* to indicate a fault condition.

The Digital Receiver 16*b* also has an optional enclosure mounted sounder 92 for user audible notification.

Figure 23:
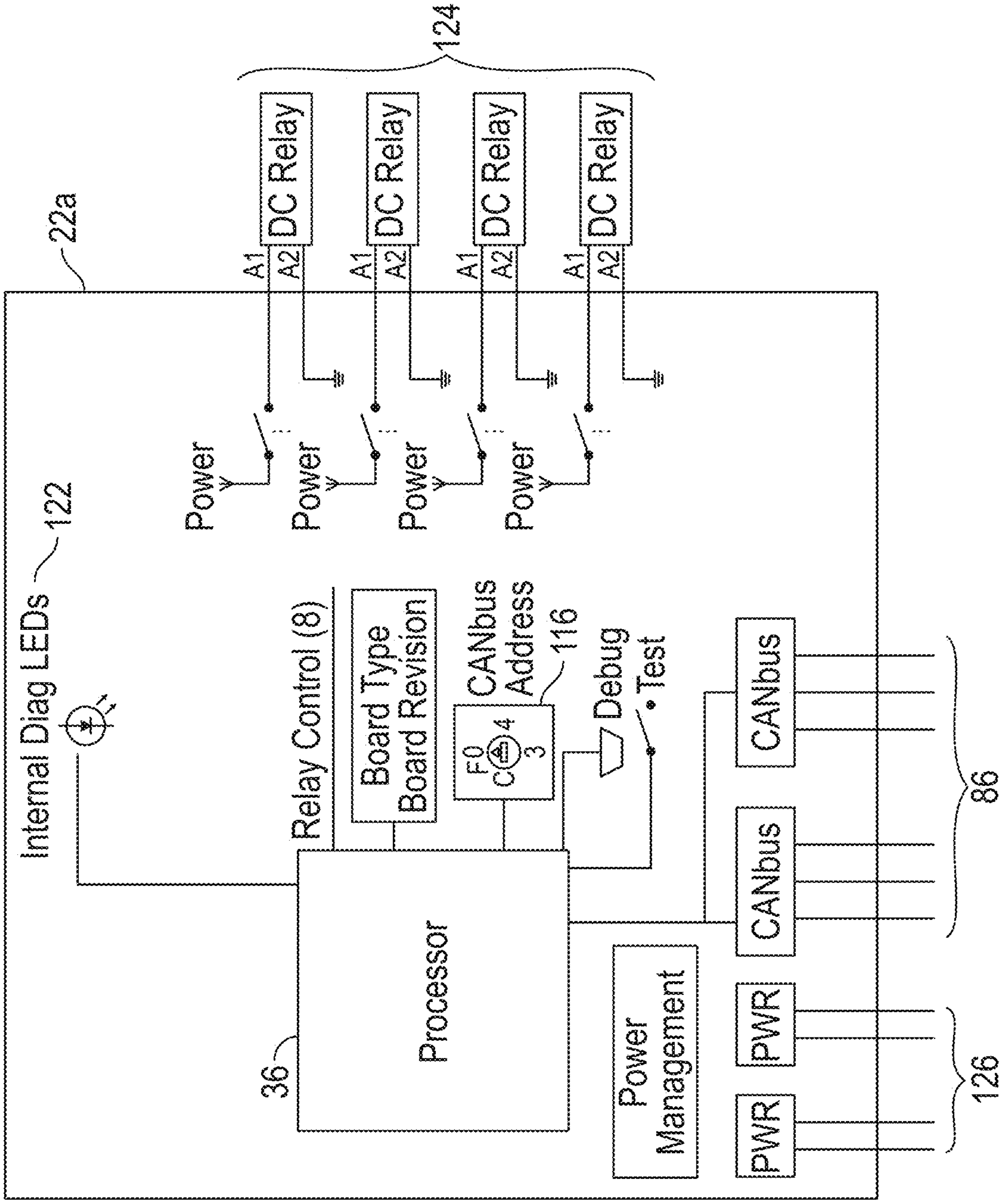
FIG. 23 is a block diagram of an Expansion Card for DC Relays Outputs that can be deployed with an Expandable Receiver in accordance with an example embodiment.
Figure 24:
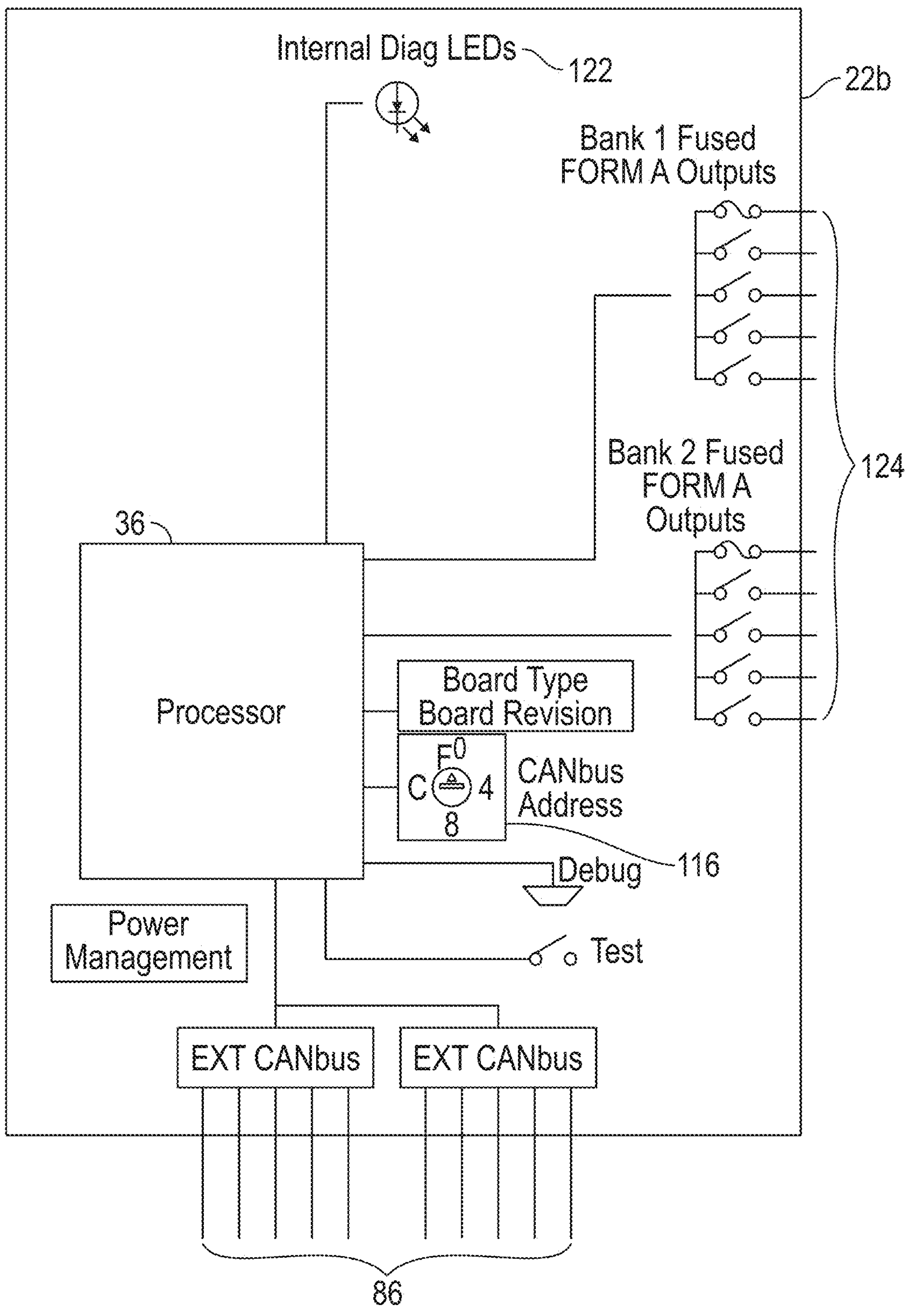
FIG. 24 is a block diagram of an Expansion Form A Output Card that can be deployed with an Expandable Receiver in accordance with an example embodiment.
Figure 25:
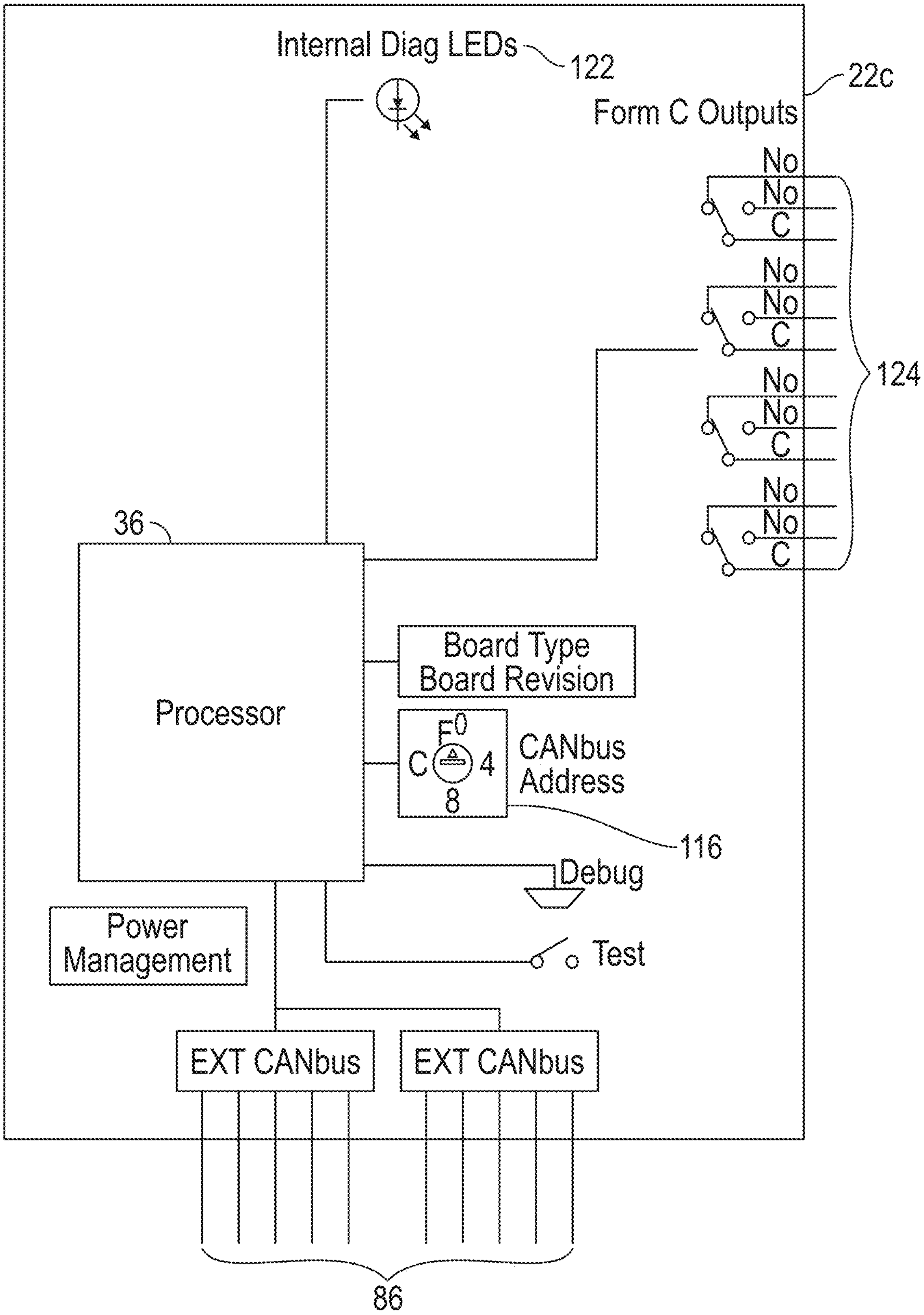
FIG. 25 is a block diagram of an Expansion Form C Output Card that can be deployed with an Expandable Receiver in accordance with an example embodiment.
Figure 26:
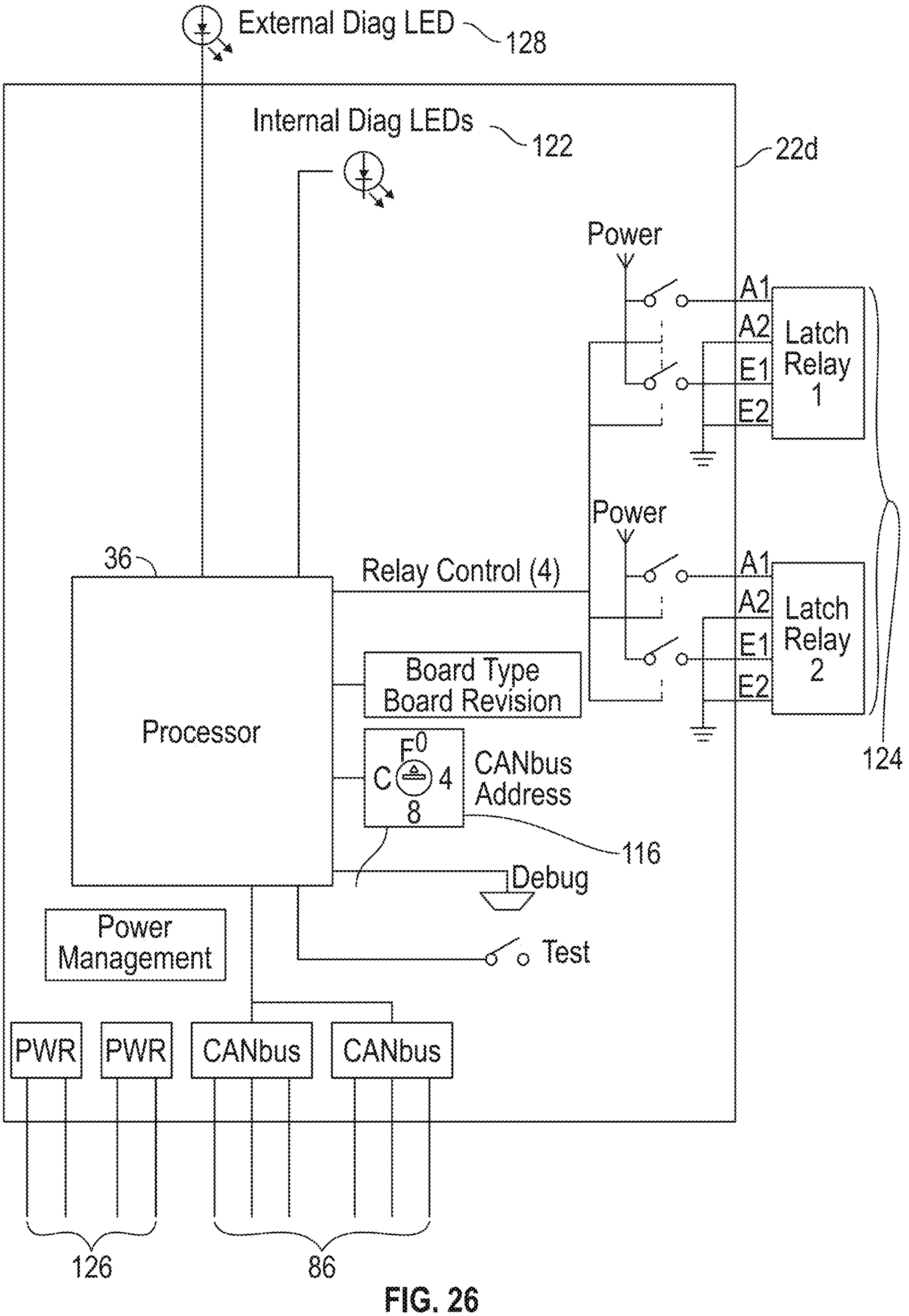
FIG. 26 is a block diagram of an Expansion Card for Latching Outputs that can be deployed with an Expandable Receiver in accordance with an example embodiment.
Figure 27:
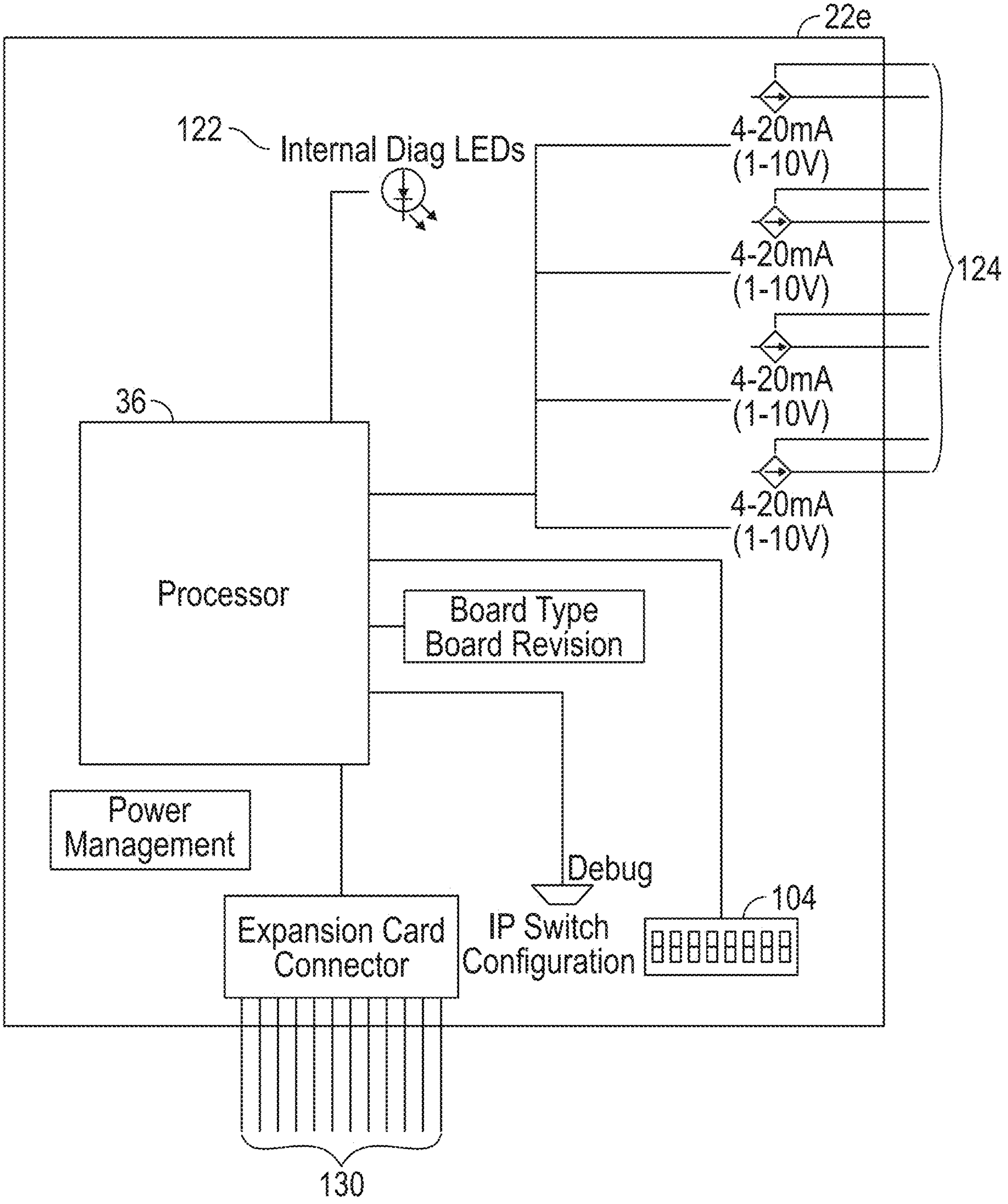
FIG. 27 is a block diagram of an Expansion Card with Analog Outputs that can be deployed with an Expandable Receiver in accordance with an example embodiment.

With continued reference to FIGS. 18A-18C and 20, the External CANbus 86 provided to the Digital Receiver 16*b* allows for added output expeceansion. The address definition is defined on the external CANbus devices (e.g., a card 22) by way of a selector switch 116 on the external CANbus devices (e.g., cards 22*a* through 22*d* shown in FIGS. 23-26). If the hardware configuration and the RCM Interface 28 software configuration do not synchronize, a fault is detected, and the Receiver 16*b* will not operate. The Digital Receiver 16*b* is configured to operate with the following Assemblies described below:

- ECFA—Expansion Card Form A Relay Output 22*b* shown in FIG. 24;
- ECFC—Expansion Card Form C Relay Output 22*c* shown in FIG. 25;
- ECDR—Expansion Card for DC Crane Relays Outputs 22*a* shown in FIG. 23;
- ECAI—Expansion Card Analog Interface 22*e* shown in FIG. 27; and
- ECLO—Expansion Card Latching Output 22*d* shown in FIG. 26.

As stated above, the Digital Receiver 16*b* further has an Ethernet port 110 to interface to a network to operate a crane through PLCs or directly to a crane.

The Digital Receiver 16*b* further comprises a DIP switch 104 setting array to configure unique settings to the Receiver for such features as: Dip Switch Control or RCM configuration, Relay Output for Speed operation, External Sounder Present, Channel Selection, and System Configuration.

The Digital Receiver 16*b* can access data logs through the RCM Interface 28 software by either of two paths; that is, a USB connection 108 provided on the Receiver, or remotely through the link established with a Transmitter. The data logs can include the following information: Receiver Operations, Fault Occurrences, Operation Time, and Pairing Configuration. The Debug connection 106 and the USB connection 108 can alternatively be implemented using a single common connection.

Figure 21C:
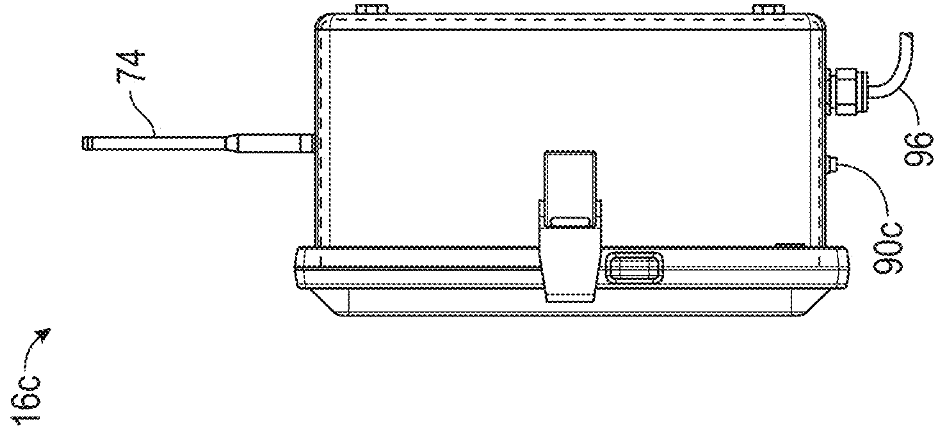
FIGS. 21A, 21B and 21C are, respectively, front, side and back views of an example enclosure for an Expandable Receiver in accordance with an example embodiment.
Figure 21B:
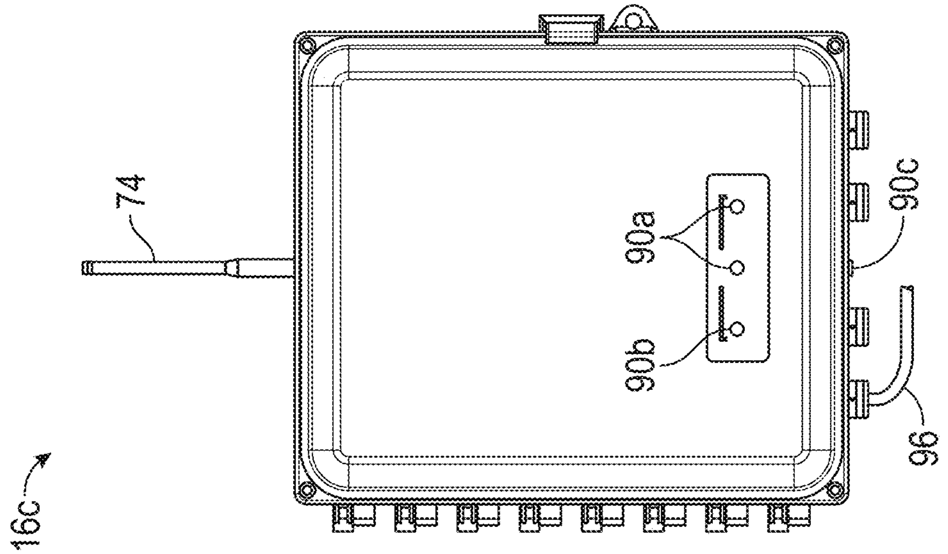
Figure 21A:
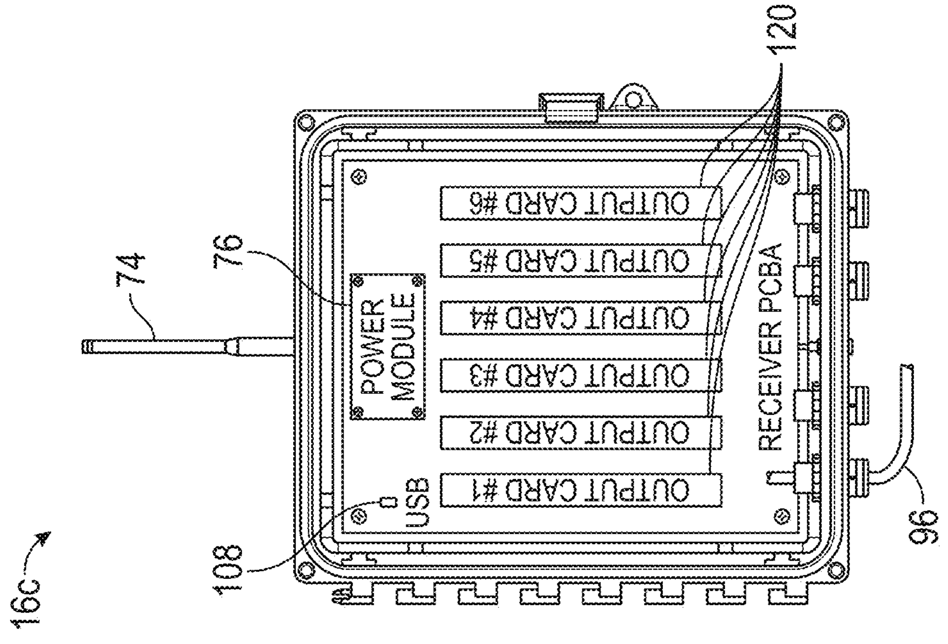
Figure 22:
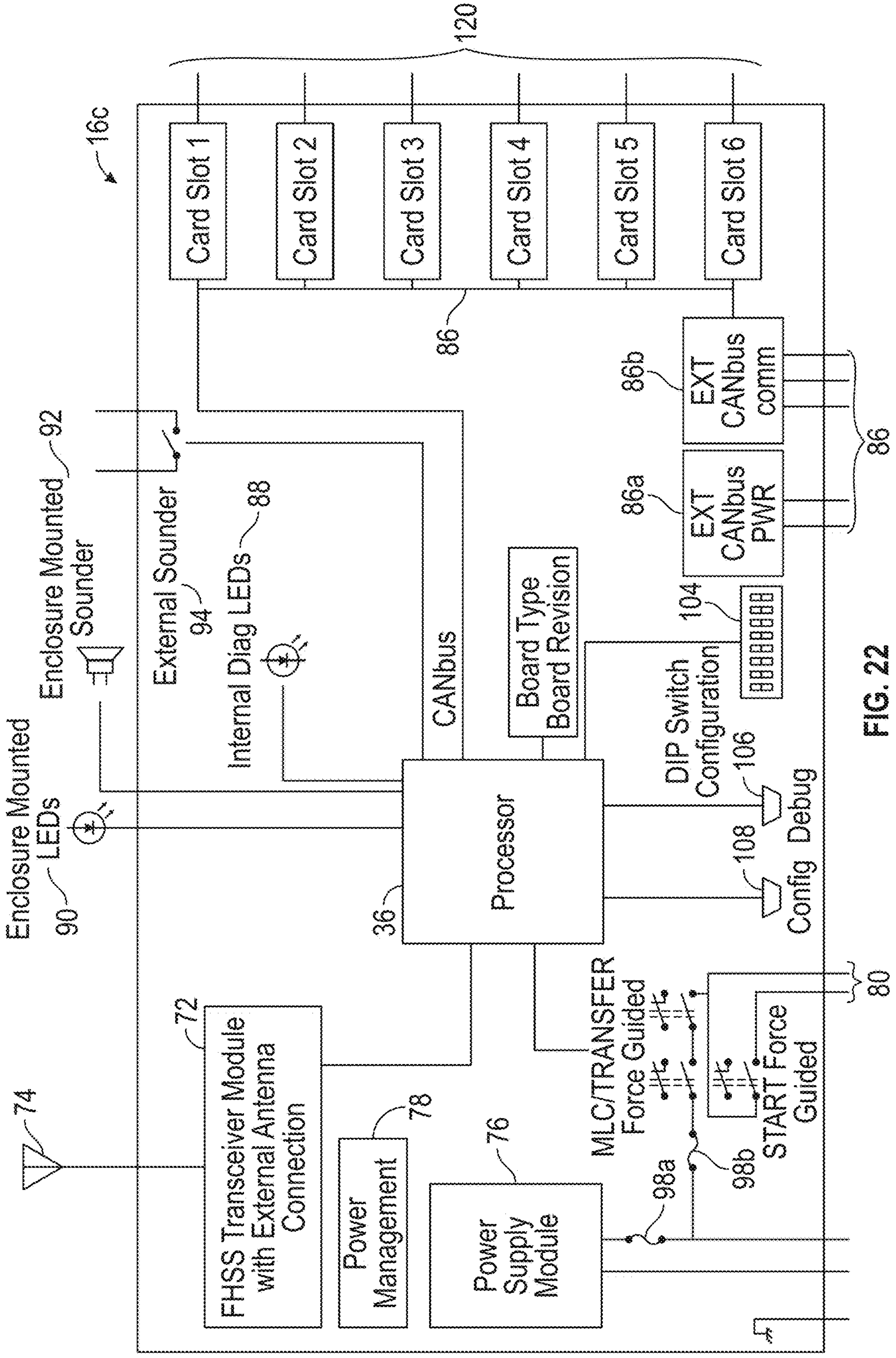
FIG. 22 is a block diagram of an Expandable Receiver in accordance with an example embodiment.

FIGS. 21A, 21B and 21C are, respectively, front, side and back views of an example enclosure for an Expandable Receiver 16*c* in accordance with an example embodiment. FIG. 22 is a block diagram of an Expandable Receiver 16*c* in accordance with an example embodiment. With reference to FIGS. 21A-21C and 22, the Expandable Receiver 16*c* has a base board with standard operations and includes expandable digital and analog outputs (e.g., via a card 22 in a card slot, or snap track or enclosure mounting generally indicated at 120) based on crane 12 requirements. The Expandable Receiver 16*c* is primarily configured to operate with the Standard Transmitter 14*b* (e.g., described in connection with FIGS. 8A through 10 and FIG. 7), as well as operate with the Belly Box Transmitter 14*c* (e.g., described in connection with FIGS. 11A through 14) or the Mill-Style Belly Box Transmitter 14*d* (e.g., described in connection with FIGS.

15A through 17). The Expandable Receiver 16*c* can also operate with the Basic Transmitter 14*a* (e.g., described in connection with FIGS. 4A through 7) but with limited operation. The Expandable Receiver 16*c* can be implemented, for example, with a number of PCBAs such as a Receiver Carrier Board shown in FIG. 22 with a processor 36, a Transceiver Module 72 with external antenna connector to externally mount an antenna 74 for increased reception/transmission range, a Power Supply Module 76, a Card Slot Form A Relay Output, a Card Slot Form C Relay Output, and a Card Slot Analog Interface, for example, indicated generally at 120. Further, the Expandable Receiver 16*c* has at least the following features:

- Configurable Power Source 78;
- Up to 48 Configurable Control Outputs indicated generally at 120;
- Main Line Contactor Interface indicated generally at 80;
- External CANbus interface 86 for further expansion;
- Internal Diagnostic LEDS 88;
- Enclosure Mounted LEDs 90;
- Enclosure Mounted Sounder 92;
- External Sounder Connection 94; and
- Cable 96 shown in FIGS. 21A-21C (e.g., 3', 10' or 25' extension pigtail cables).

For example, the Expandable Receiver 16*c* is configurable by the Power Supply Module 76 to operate Universal AC (84-265 VAC) power supply or Low Voltage 24 Vac/Vdc power supply located on the Receiver Carrier Board shown in FIG. 22. The Expandable Receiver 16*c* begins operation by handshaking between a Main Line Contactor (MLC) and its start function via a Main Line Contactor Interface indicated generally at 80 and as described above in connection with the Receiver 16*b*. An operator initiates a start operation from a Transmitter 14 that connects an external Start Relay Input to the Main Line Contactor through the Start Relay. During the initial set up, the Expandable Receiver 16*c* monitors the force guided Main Line Contactor relays to verify a relay is not faulted or that other faults have not occurred. If Receiver 16*c* is faulted, the Receiver can discontinue start-up operation. With no faults, the Receiver 16*c* then enables its Main Line Contactor Relays for crane operation. The Internal Main Line relays are triggered through an output from the processor 36 and a watchdog timer. If the processor 36 output clears through an E-stop condition or system fault or a watchdog function clears through a processor failure, the Main Line Contactor Interface circuit is disabled and power to all other outputs is disabled rendering the Receiver 16*c* inactive. The Expandable Receiver Carrier Board shown in FIG. 22 further comprises one or more field replacement fuses (98*a*, 98*b*) that protect the Power Supply Module input, and the Main Line Contactor interface 80 located on the Expandable Receiver Carrier Board.

With continued reference to FIGS. FIGS. 21A-21C and 22, the Expandable Receiver 16*c* is provided with enclosure mounted indicators 90 (e.g., LEDs). For example, the Expandable Receiver 16*c* has connections for externally mounted LEDs 90 for user visual notification such as, but not limited to:

- At least one front panel mounted Power/Heartbeat LED 90*a* to indicate Receiver power and processor operation;
- Front panel mounted LED 90*b* to indicate pairing mode/wireless communication to a Receiver;
- Bottom enclosure mounted Fault LED 90*c* to indicate a fault condition.

The Expandable Receiver 16*c* also has an optional enclosure mounted sounder 92 for user audible notification.

With continued reference to FIGS. 21A-21C and 22, the Receiver Carrier Board Card interface allows for the Receiver 16*c* to be configured with different types and quantity internal expansion cards. The local isolated CANbus interface provides communication between the Receiver Carrier Board and the expansion cards. The Expandable Receiver is configured to operate with the following Card Slot expansion

- CSFA—Card Slot Form A Relay Output;
- CSFC—Card Slot Form C Relay Output
- CSAI—Card Slot Analog Interface;

Each Card Slot has a defined address, 0 through 5, associated with its position. If the hardware configuration and the RCM software configuration do not synchronize, a fault is detected, and the Receiver or at least the affected card will not operate. In addition, the External CANbus 86 provided to the Expandable Receiver allows for added output expansion. The external CANbus operates on the same internal CANbus communicating with the expansion cards. The address definition is defined on the external CANbus devices by way of a selector switch on the external CANbus devices. The external CANbus address cannot be 0 through 5 which would conflict with internal CANbus slots. The Expandable Receiver is configured to operate with the following external Assemblies described below:

- ECFA—Expansion Card Form A Relay Output;
- ECFC—Expansion Card Form C Relay Output;
- ECDR—Expansion 1 Card for DC Crane Relays Outputs;
- ECAI—Expansion Card Analog Interface; and
- ECLO—Expansion Card Latching Output.

If the hardware configuration and the RCM Interface software configuration do not synchronize, a fault is detected, and the Receiver will not operate.

The Expandable Receiver 16*c* further comprises a DIP switch 104 setting array to configure unique settings to the Receiver 16*c* for such features as: Dip Switch Control or RCM configuration, Relay Output for Speed operation, External Sounder Present, Channel Selection, and System Configuration.

The Expandable Receiver 16*c* can access data logs through the RCM Interface 28 software by either of two paths; that is, a USB connection 108 provided on the Receiver, or remotely through the link established with a Transmitter 14. The data logs can include the following information: Receiver Operations, Fault Occurrences, Operation Time, and Pairing Configuration. The Debug connection 106 and the USB connection 108 can alternatively be implemented using a single common connection.

Examples of different Expansion Cards 22 in the platform of the improved radio control system 10 will now be described with reference to FIGS. 23 through 27. In accordance with example embodiments of the present disclosure, individual expansion cards can be plugged into the CANbus 86 of an Expandable Receiver 16*c* (e.g., described above in connection with FIGS. 21A through 22). The different Expansion Cards 22 have various outputs per board in which the main Receiver 16*c* board (e.g., a Receiver Carrier Board with processor 36 referenced above with FIG. 22) in the Expandable Receiver 16*c* can control. Each Expansion Card 22 has a processor 36 onboard which can communicate back to the main processor 36 in the Expandable Receiver 16*c* via a CANbus 86. Each Expansion Card 22 has a unique address as set by an onboard hex switch 116. This address (e.g., 0x0 to 0xF) is set as such in the Receiver 16*c*'s configuration. The Expansion Card 22's processor 36 is configured to operate as the CANbus slave, whereas the main processor 36 in the Expandable Receiver 16*c* operates as the CANbus master. The outputs of the Expansion Card 22 will be set or cleared in response to commands from a wireless Transmitter 14. LED status indicators 122 associated with each Expansion Card 22 can report faults, CANbus communication, and power status as described below in connection with the example Expansion Cards 22 shown in FIGS. 23 through 27. A default configuration in the Receiver 16*c* can be used to assign appropriate outputs on the Expansion Card 22 to the incoming wireless commands from the Transmitter 14. The RCM Configuration Generator 26 can also be used if configuration is needed beyond the default configuration. Transferring of the configuration file 26*a* to the Receiver 16*c* is through the RCM Interface 28 Software.

With further regard to different Expansion Cards 22 described below in connection with FIGS. 23 through 27, the Receiver 16*c* performs a Self-Diagnostic Test after power is applied for System Startup. The Receiver 16*c* then loads its most recently stored configuration (e.g., via a configuration file 26*a*). The Self Diagnostic Test that is run on the Receiver 16*c* confirms CANbus communication 86 to the configured Expansion Card(s) 22. The fault LED 90*c* will pulse for 5 seconds during this time. At the end of the 5 seconds, it will remain illuminated if any faults are found or clear if no faults are found. After a successful Self-Diagnostics test, the Receiver 16*c* awaits requests from a Transmitter 14. With regard to Fault Detection/Safety Monitoring, the Transmitters 14/Receivers 16 analyze and report faults during normal operation and show them by illuminating a corresponding Fault LED. To recover from a fault, an operator generally must reconcile the originating fault. A CANbus Communication Fault is declared if an Expansion Card 22 has not received a message from a CANbus master (e.g., Receiver 16*c*) within 1 second. In response to such a fault, associated motion outputs that are being controlled on this CANbus slave 22 are rendered inoperable.

With further regard to different Expansion Cards 22 described below in connection with FIGS. 23 through 27, each Expansion Card 22 is configured to operate with 24 Vdc power. Each Expansion Card has connections for internal Diagnostics LEDs 122 for user visual notification such as, but not limited to:

- One Power/Heartbeat LED to indicate Receiver power and processor operation;
  - Solid indicates power to the Receiver;
  - Blink indicates Power to Receiver and Receiver operation;
- One Tri-Color LED to indicate CANbus communication;
  - Green indicates CANbus operation;
  - Red Indicates CANbus failure; and
- One Red Fault LED to indicate a fault condition.

For fail safe operation, the relay power is triggered through an output from the processor and a watchdog timer. If the processor output clears through an E-stop condition or system fault or the watchdog clears through a processor failure, the relay power is disabled rendering the outputs inactive.

With further regard to different Expansion Cards described below in connection with FIGS. 23 through 26, each Expansion Card has a redundant CANbus and Power interface 86*a*, 86*b* to enable "daisy-chained" operation for multiple devices on the CANbus 86. Each Expansion Card 22 also has a HEX Switch 116 to configure the CANbus address between (0 and 15 (F)) as described above. On the other hand, with regard to the Expansion Card 22*e* described below in connection with FIG. 27; that is, the Expansion Card 22*e* with Analog Outputs connects to the afore-mentioned Receiver Carrier Board of the Expandable Receiver 16*c* described with reference to FIGS. 21A through 22 through its expansion card interface (e.g., Card Slot Analog Interface for analog outputs mentioned above to control a VFD crane).

FIG. 23 is a block diagram of an Expansion Card for DC Relays Outputs (ECDR) 22*a* that can be deployed with an Expandable Receiver 16*c* in accordance with an example embodiment. The ECDR 22*a* includes a CANbus interface indicated at 86 and four Form A output interfaces indicated at 124 that use local power to enable high voltage/current relays required to operate a DC Crane. The ECDR 22*a* is designed to operate with the example Receiver products described above in the improved radio control system 10 platform that incorporate the external CANbus interface 86. The ECDR 22*a* can be installed into a panel or mounted in a SNAP Track in addition to a card slot indicated generally at 120. The ECDR 22*a* has the following features:

- 4 Form A contact interfaces for DC relays 124;
- Redundant CANbus Interface 86 for added expansion;
- Redundant Power Connections 126 for added expansion;
- Internal Diagnostic LEDS 122; and
- Configurable HEX CANbus Address selected via switch 116.

The ECDR has four voltage contacts output interfaces designed to enable CAD32BD contactors due to the voltage and current requirements of DC Crane control signals, for example.

FIG. 24 is a block diagram of an Expansion Form A Output Card (ECFA) 22*b* that can be deployed with an Expandable Receiver 16*c* in accordance with an example embodiment. The ECFA22*b* includes a CANbus interface 86 and 8 Form A relay Outputs (e.g., two groups of four Form A relays that share a common fuse) indicated generally at 124. The ECFA 22*b* is designed to operate with the Expandable Receiver 16*c* (e.g., described above in connection with FIGS. 21A through 22) and the Digital Receiver 16*b* (e.g., described above in connection with FIGS. 18A-18C and 20). The ECFA 22*b* has the following features:

- 8 Form A Outputs 124;
- Redundant CANbus Interface 86 for added expansion;
- LED Fault Indicator 122; and
- Configurable HEX CANbus Address selected via switch 116.

The ECFA contains field replacement fuses that protect each bank of fuses in the output 124.

FIG. 25 is a block diagram of an Expansion Form C Output Card (ECFC) 22*c* that can be deployed with an Expandable Receiver 16*c* in accordance with an example embodiment. The ECFC 22*c* includes a CANbus interface 86 and 4 Form C relay Outputs (e.g., four individual non-fused Form C output relays that supply the Common, Normally Open and Closed Contacts for filed connections) indicated generally at 124. The ECFC 22*c* is designed to operate with the Expandable Receiver 16*c* (e.g., described above in connection with FIGS. 21A through 22) and the Digital Receiver 16*b* (e.g., described above in connection with FIGS. 18A-18C and 20). The ECFC 22*c* has the following features:

- 4 Form C Outputs 124;
- Redundant CANbus Interface 86 for added expansion;
- LED Fault Indicator 122; and
- Configurable HEX CANbus Address selected via a switch 116.

The ECFC contains field replacement fuses that protect each bank of fuses in the outputs indicated at 124.

FIG. 26 is a block diagram of an Expansion Card for Latching Outputs (ECLO) 22*d* that can be deployed with an Expandable Receiver 16*c* in accordance with an example embodiment. The ECLO 22*d* includes a CANbus interface 86 and two latching output interfaces indicated at 124. For example, the ECLO 22*d* has two latching output interfaces designed to enable LA6DK/CAD32BD contactor combination. A pulse between the contactor coil terminals A1 & A2 causes the contactor to close. A pulse between the latch coil terminals E1 & E2 opens the contactor. The duration of the pulse can be a minimum of 250 ms with a maximum of 10 seconds. A terminals and E terminals should not be energized at the same time. The ECLO 22*d* is designed to operate with receiver products that incorporate the external CANbus interface. The ECLO 22*d* can be installed into an enclosure or mounted in a SNAP Track in addition to a card slot indicated generally at 120. The ECLO 22*d* has the following features:

- 2 Latching Output interfaces 124;
- Redundant CANbus Interface 86 for added expansion;
- Redundant Power Connections 126 for added expansion;
- Internal Diagnostic LEDs 122;
- Optional Enclosure Mounted LEDs 128; and
- Configurable HEX CANbus Address selected via a switch 116.

The ECLO 22*d* has internal LEDs 122 to indicate power and to indicate a communication fault with the Receiver Interface, as well as enclosure mounted Diagnostics LEDs 128 as described above for each Expansion Card.

FIG. 27 is a block diagram of an Expansion Card with Analog Interface Outputs (ECAI) 22*e* that can be deployed with an Expandable Receiver 16*c* in accordance with an example embodiment. The ECAI 22*e* supplies 4 Form C relay Outputs (e.g., four individual non-fused Form C output relays that supply the Common, Normally Open and Closed Contacts for filed connections) indicated generally at 124.

Figure 28A:
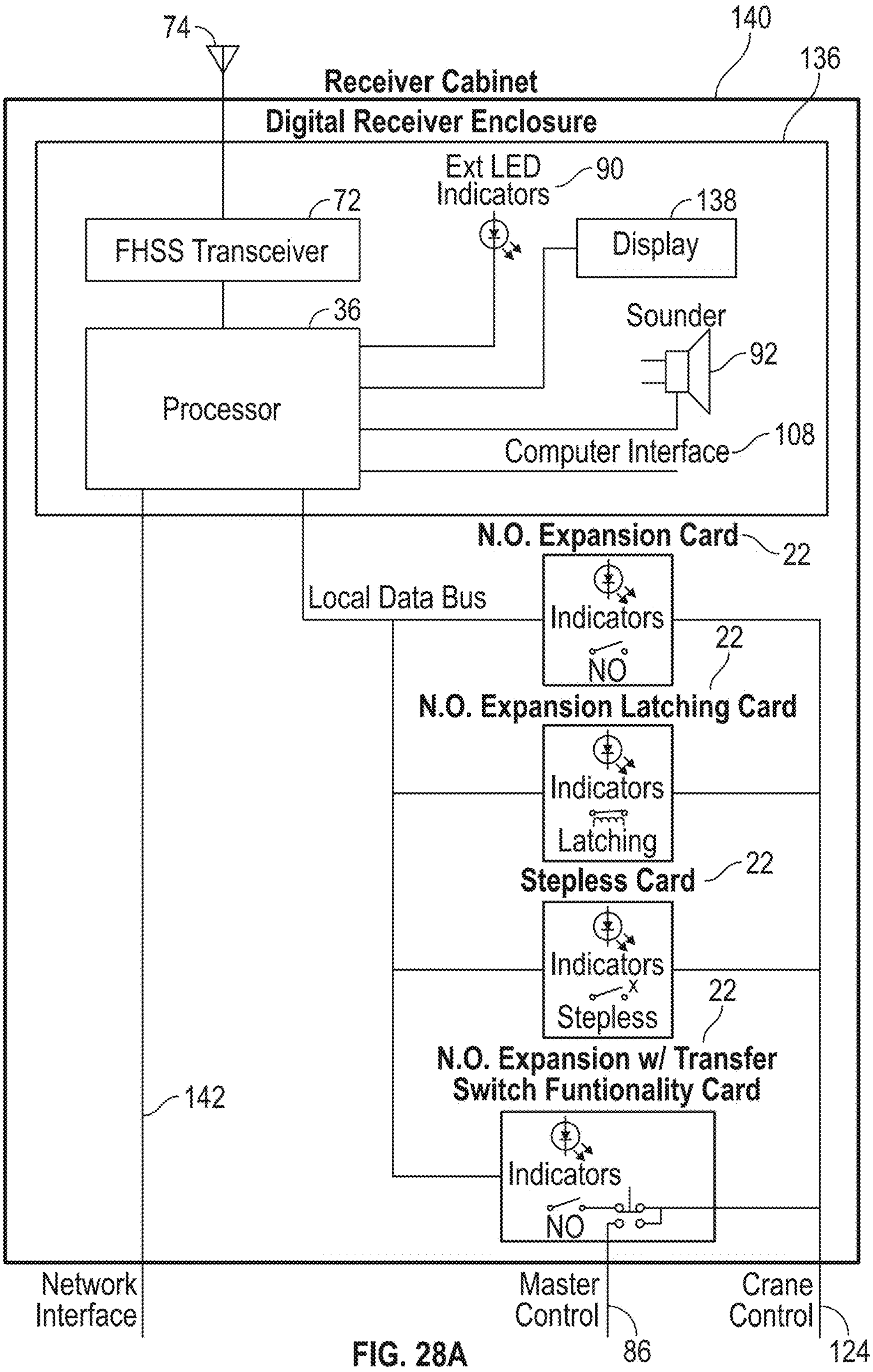
FIGS. 28A and 28B are diagrams of respective example implementations of an Expandable Receiver with different Expansion Cards or Auxiliary Enclosures with Outputs in a Remote Crane Control System in accordance with an example embodiment.
Figure 28B:
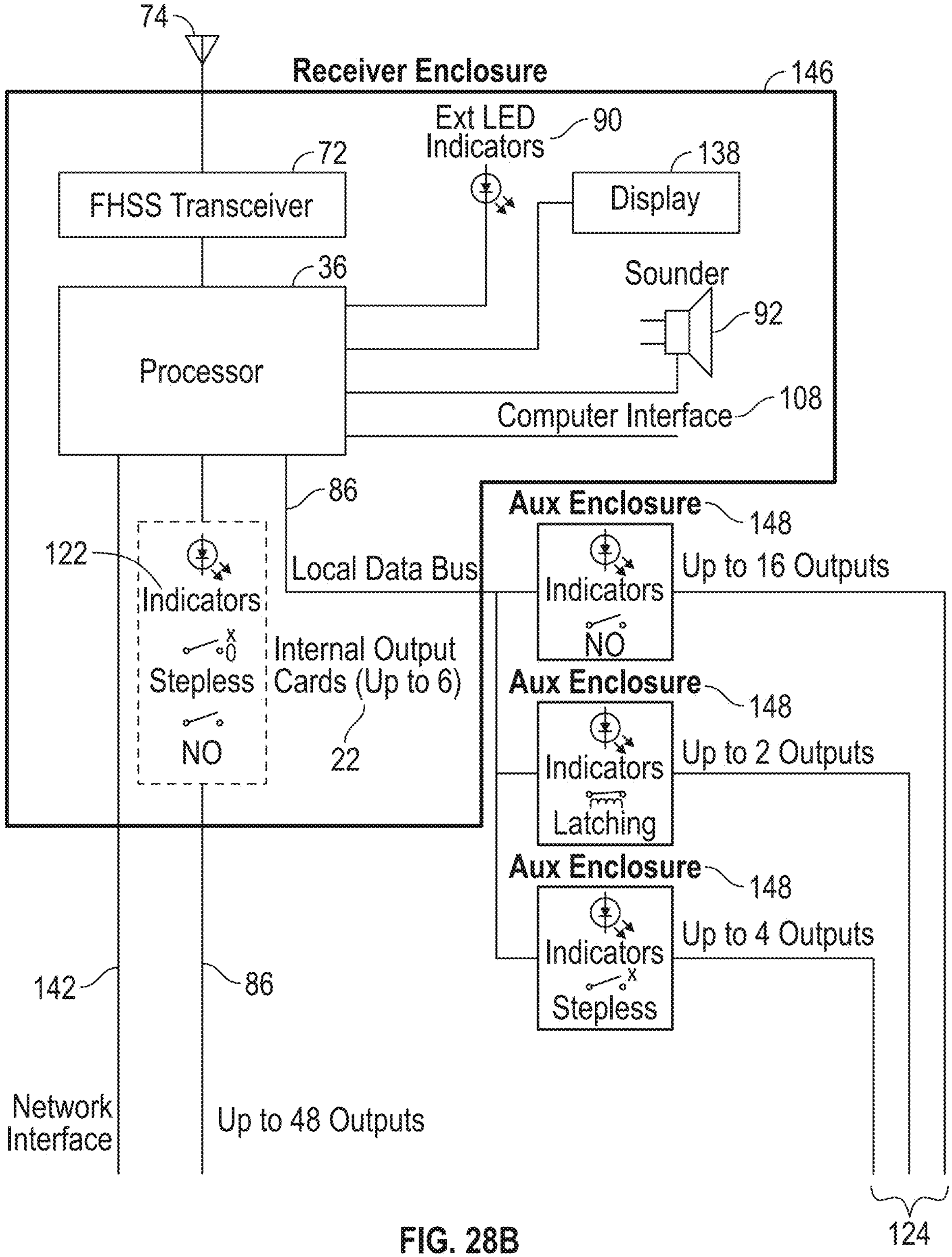

FIGS. 28A and 28B are diagrams of respective example implementations of an Expandable Receiver with different Expansion Cards or Auxiliary Enclosures with Outputs in a Remote Crane Control System in accordance with an example embodiment. For example, FIG. 28A depicts an example Expandable Receiver Cabinet that accommodates Expansion Cards therein which provide different types of Outputs, in accordance with an illustrative embodiment.

The Receiver Cabinet 140 includes a network interface 142 and Local CANbus interface 86. The Expansion Cards 22 interface to the Receiver Cabinet 140 through the Local CANbus interface. The Outputs 124 have pluggable connectors on a single PCBA, for example, for convenient field replacement, and include color-coded and numbered wire that is pigtailed to facilitate field installation. The network interface 142 allows for the Receiver 16 in the cabinet 140 indicated at 136 to connect directly to other system components including PLC for crane operation. The Receiver 136 has a transceiver module 72, a processor 36, a sounder 92, a computer interface 108 and indicators 90 as described above, and a Display 138 for indicating status, for example.

FIG. 28B depicts an example Expandable Receiver Enclosure 146 with interfaces to separate auxiliary Expansion Card Enclosures 148 in accordance with another illustrative embodiment. For example, the design shown in FIG. 28B includes Outputs 124 to control an AC crane 12 in one to several enclosures 148. The Receiver Enclosure 146 includes a Network Interface 142, a Local CANbus interface 86 for up to 6 Internal Expansion Cards for up to 48 Outputs. Auxiliary Enclosures 148 are also connected to the Receiver Enclosure via a Local CANbus interface 86 and each has up to 16 Outputs, depending on the type of Output supported by that particular Auxiliary Enclosure 148 in a manner similar to the above-described different types of Expansion Cards 22. The Auxiliary Enclosure Outputs 124 can be connected using pluggable connectors on a single PCBA, for example, for convenient field replacement, and include color-coded and numbered wire that is pigtailed to facilitate field installation.

Figure 29:
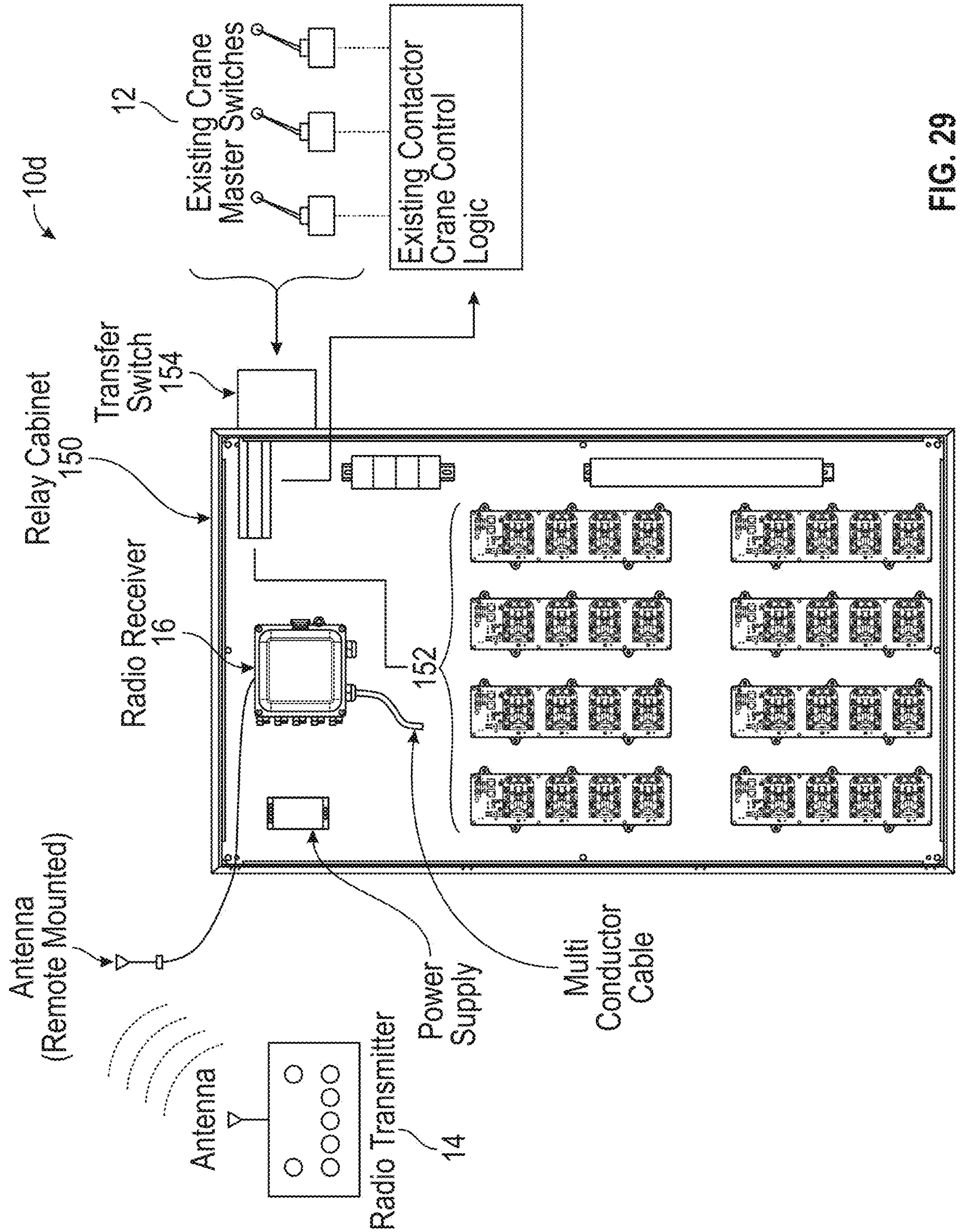
FIG. 29 is a diagram of an example implementation of a Digital or Standard Transmitter in communication with a Digital or Standard Receiver deployed in a remote control relay cabinet in a Remote Crane Control System in accordance with an example embodiment.
Figure 30:
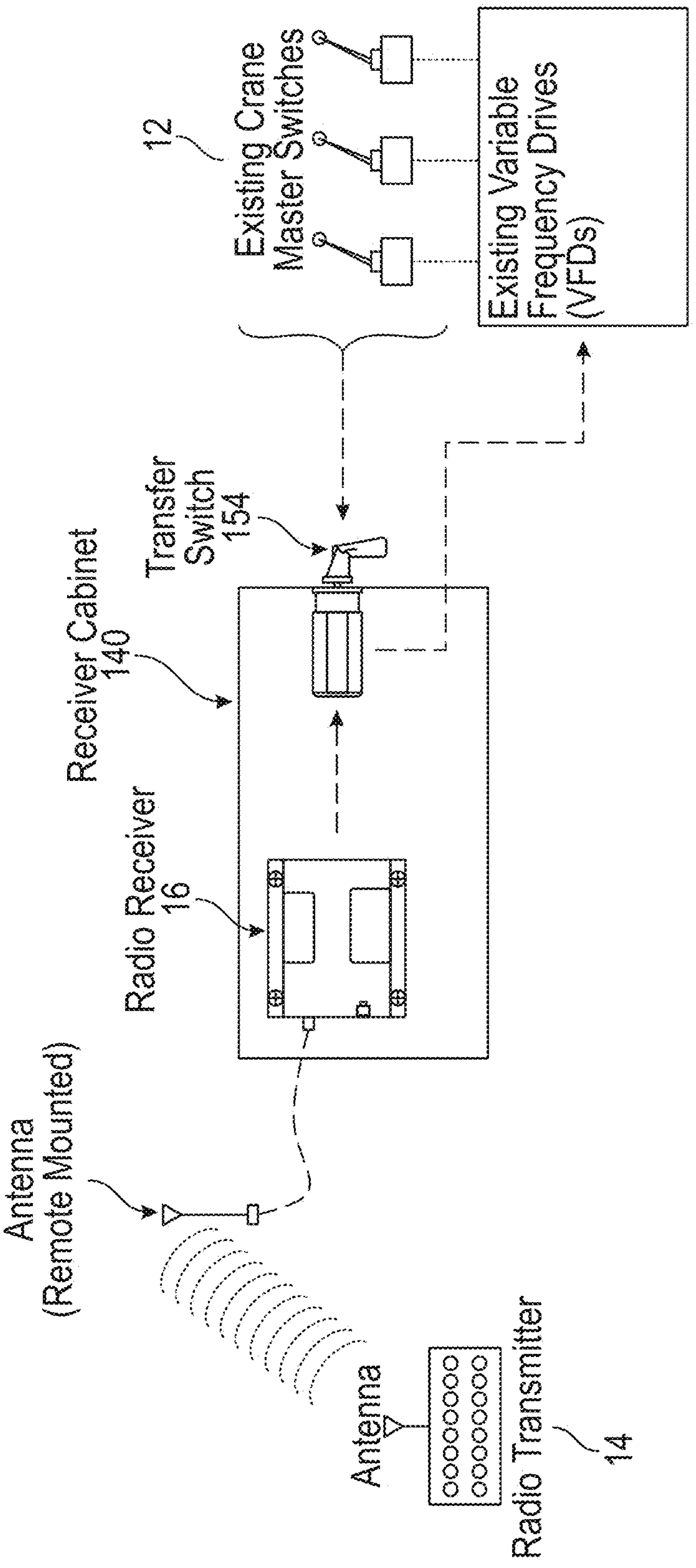
FIG. 30 is a diagram of an example implementation of a Digital or Standard Transmitter in communication with a Digital or Standard Receiver deployed in a receiver cabinet in a Remote Crane Control System to control variable frequency drives (VFDs) in accordance with an example embodiment.
Figure 31:
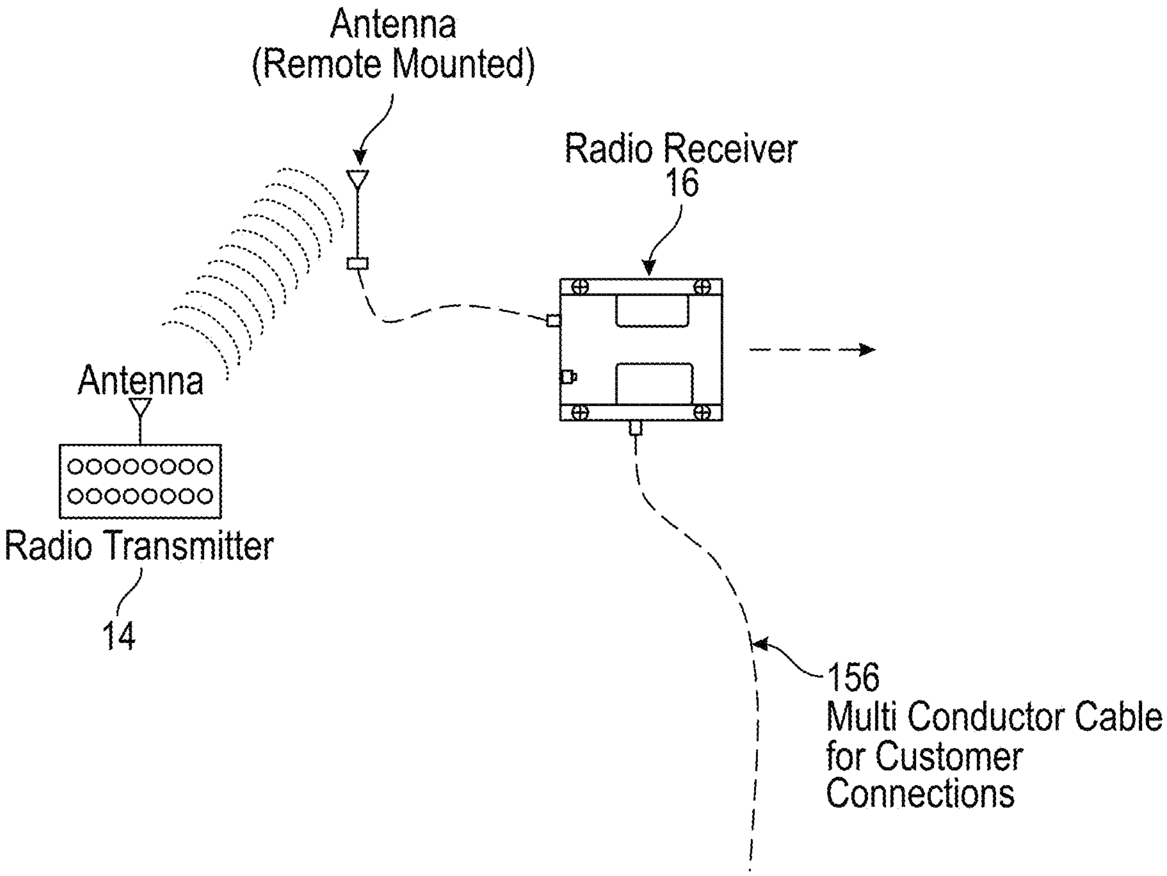
FIG. 31 is a diagram of an example implementation of a Digital or Standard Transmitter in communication with a Digital or Standard Receiver connected to Customer Connections via a multi conductor cable in a Remote Control Customer Connections System constructed in accordance with an example embodiment.

FIGS. 29 through 31 are three different example implementations of an improved radio control system 10 in accordance with example embodiments of the present disclosure. FIG. 29 illustrates a Remote Control Relay Cabinet topology indicated generally at 10*d* wherein a Receiver Relay Cabinet 150 is comprised of a Receiver 16 hardwired to interposing relays indicated at 152, and a transfer switch 154 connected to controls of an existing device 12. FIG. 30 illustrates a Remote Control VFD Cabinet topology wherein a Receiver Cabinet is comprised of a Receiver 16 hardwired through a transfer switch 154 to variable frequency drives in an existing device 12. FIG. 31 illustrates a Remote Control Customer Connections topology wherein a Receiver 16 is supplied with a cable harness with multi-conductor cable 156 for connection directly to a customer for their installations to control mobile equipment such as a crane.

With reference to FIGS. 29-31, the transfer switch for relay cabinets can be comprised of a large drum switch Receiver logic to the transfer switch relays can, for example, be:

- Allow the transfer relays to energize select radio operations when the manual transfer switch is set to radio; and
- Only allow the transfer relays to deenergize when all the directional inputs are centered. This will hold the cabinet energized and active until all sticks are centered. This is because the relays can carry 16A but only break 1.5A@250 VDC.

Various embodiments of a Receiver in an improved radio control system as described herein can be configured to provide CANbus, Modbus RTU (RS-485, 2 wire), and Modbus TCP/IP (Ethernet) field bus protocols. They are bus protocols, but packet collisions can be avoided by sending packets synchronously at defined time intervals. Synchronous packet transmissions can be used to identify loss of communications.

The Transmitters 14 and Receivers 16 described herein in accordance with example embodiments for use in an improved radio control system 10 realize a number of advantages such as new switches, designs and user-friendly interfaces, and more speed and control options due to configurable switches.

Reference is also made to the co-pending application entitled "Programmable Haptic Feedback Fingertip Paddle Switch," which is incorporated herein by reference in its entirety, and which discloses a new 11-point detented-simulated switch capable of operation in Harsh Areas (HA). This new programmable haptic feedback fingertip paddle switch (e.g., switches 32*a* shown and described herein with respect to the Belly Box Transmitter 14*c* and the Mill-Style Belly Box Transmitter 14*d*) is configured to provide customers or transmitter operators the ability to feel haptic feedback at the switch at different detents or conditions, even in industrial environments where the operator is wearing protective gloves. This new programmable haptic feedback fingertip paddle switch 32*a* provides many advantages over conventional joysticks that cannot withstand harsh environments or cannot provide the operational feel that customers want.

The Transmitters 14 and Receivers 16 of the example embodiments described herein are configured to withstand harsh and dirty environments. The Transmitters 14 and Receivers 16 of the example embodiments described herein are also configured to withstand repeated drops from customers or operators.

One or more of the different Transmitters 14 and Receivers 16 described herein for the platform of products from which an improved radio control system 10 can be designed and implemented are configured for compliance with Safety Standards and Certifications. The different Transmitters 14 and Receivers 16 described herein for the platform of products from which an improved radio control system 10 can be designed and implemented are also configured to be compliant with Underwriters Laboratories Inc. (UL) standards such as, but not limited to, UL 1638 for visual signaling appliances, and UL 2017 general-purpose signaling devices and systems.

Different Transmitters 14 described herein are provided with beneficial safety features such as a safety circuit (e.g., a tilt sensor 56 and related cutoff switch), and a cage 62 on the Belly Box and the Mill-Style Bell Box Transmitters 14*c*, 14*d* that prevent inadvertent button presses or motions or other switch operations if the Transmitter is dropped. The cage or safety bar 62 is also ergonomically curved for comfort to an operator who is resting their hands on the safety bar. The Digital and Standard Transmitters 14*a*, 14*b* that have a handheld form factor are advantageously configured to fit in the palm of an operator's hand such that an operator can hold the Transmitter in their hand while the Transmitter is strapped to the operator's wrist or waist and operate the Transmitter buttons with that hand's fingers. The example Transmitters 14 illustrated herein contain additional ergonomic mechanical protection mechanisms to prevent inadvertent operation due to impacts.

Figure 32A:
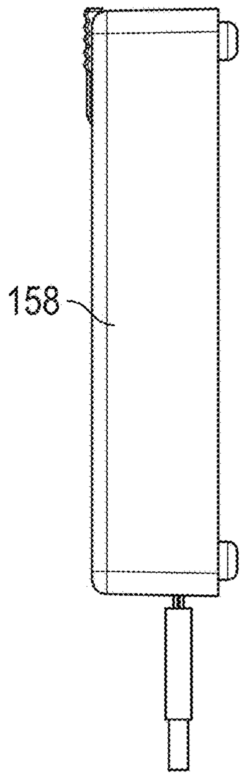
FIGS. 32A, 32B and 32C are side and perspective front views of a handheld battery charger in accordance with an example embodiment with FIG. 32B showing the handheld battery charger without a battery charging therein and FIG. 32C showing the handheld battery charger with a battery charging therein.
Figure 32B:
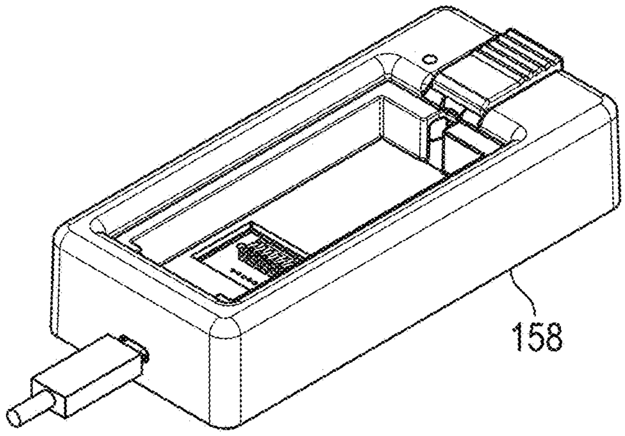
Figure 32C:
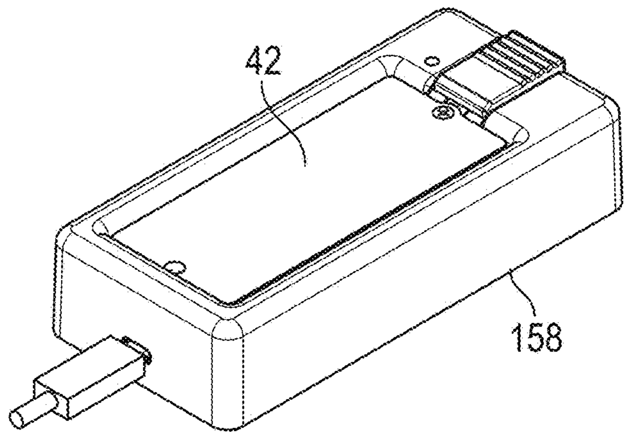
Figure 33:
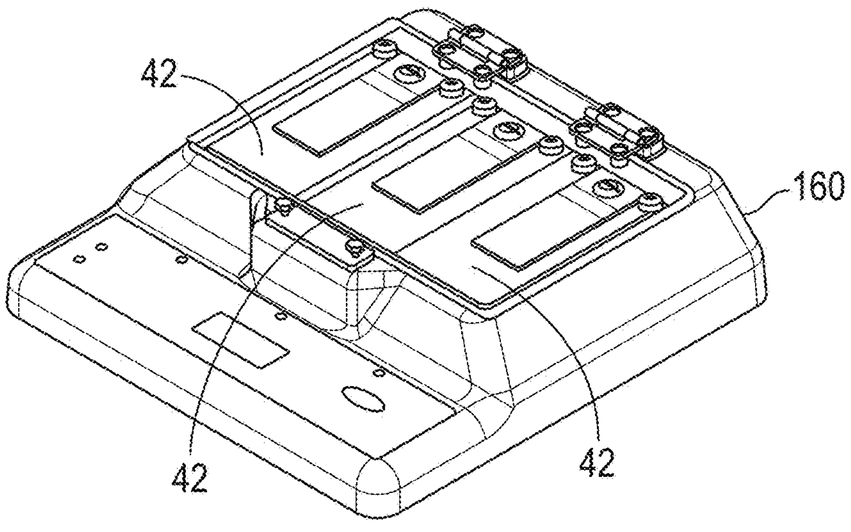
FIG. 33 is a battery charger in accordance with an example embodiment constructed to charge multiple batteries for a Belly Box Transmitter or a Mill-Style Belly Box Transmitter.

The Transmitters' power requirements are advantageously managed to provide crane status, battery status, connection status on their Display. A Transmitter Display can also allow operator inputs (e.g., on a GUI Display 54). The Transmitters 14 can operate on battery power and the batteries are universal across the product platform from which an improved radio control system can be designed and implemented. For example, the Transmitters 14 have a single point battery (e.g., a Lithium battery 42 that is replaceable through a quick connect battery compartment 44 in the Transmitter housing or enclosure). For example, a Transmitter 14*c*, 14*d* having a Belly Box form factor can use two 18650 or custom Lithium battery packs, whereas a Transmitter having a handheld form factor uses a single 18650 Lithium battery or a rechargeable battery pack. This single point battery design in the platform of the improved radio control system 10 of the present disclosure is advantageous over conventional radio control system product lines of various manufacturers that employ different types of batteries (e.g., C and A batteries for form factor transmitters and receivers) or proprietary batteries that are not useable across these manufacturer's product line, which makes use of the product line by a customer and maintaining inventory for the product line by the manufacturer more complicated, costly and less convenient. The lithium ion battery 42 used in the Transmitters 14 can recharge on the Transmitter 14, or via a separate charger. FIGS. 32A, 32B and 32C are side and perspective front views of an example handheld battery charger 158 constructed in accordance with an example embodiment. FIG. 32B shows the handheld battery charger 158 without a battery charging therein, and FIG. 32C shows the handheld battery charger 158 with a battery 42 charging therein. FIG. 33 illustrates another example battery charger 160 constructed in accordance with an example embodiment. The battery charger 160 is configured to charge multiple batteries for convenient use in a Belly Box Transmitter 14*c* or a Mill-Style Belly Box Transmitter 14*d*. The rechargeable batteries have an extended battery life to provide longer operational times.

The Transmitters 14 and Receivers 16 described herein in accordance with example embodiments for use in an improved radio control system 10 are advantageously provided with USB/C connectors (e.g., 46, 108) for transferring switch configurations to the Transmitters 14, accessing data logs, and updating software. The USB/C connectors are more universal and therefore more convenient to system operations (i.e., particularly in the field) than a proprietary stick that is typically required by existing radio control systems. The Transmitters 14 and Receivers 16 described perform operational and fault logging for diagnostics and incident forensic analysis which is very beneficial to users to keep their custom designed improved radio control system working optimally. The Receivers described herein in accordance with example embodiments have external control input and output interfaces (i.e., CANbus, Profibus, and/or Modbus) for factory integration and automation. The convenient and versatile configurability of the Transmitters and Receivers described herein in accordance with example embodiments promotes customization among system operators for different radio control applications for various mobile equipment. Thus, the improved radio control system achieves significant advantages over existing systems from larger OEMs that focus primarily on building custom product lines for larger customers, without the ability to easily configure the same equipment for use in radio control systems for other customers and applications.

The convenient and versatile configurability of the Transmitters 14 and Receivers 16 described herein in accordance with example embodiments also promotes product development and product line or platform expansion of the improve radio control system described herein by system developers. Product line or platform expansion of the improved radio control system is simplified, for example, by the firmware employed across the platform. Since the processors in the Transmitters 14, Receivers 16, and Expansion Cards 22 interface to the hardware for firmware functionality, the same firmware is used with each Transmitter, or Receiver, or Expansion Card that uses the same processor 36, and the processor is configured to recognize the version of the hardware and implement the firmware accordingly.

It will be understood by one skilled in the art that this disclosure is not limited in its application to the details of construction and the arrangement of components set forth in the above description or illustrated in the drawings. The embodiments herein are capable of other embodiments, and capable of being practiced or carried out in various ways. Also, it will be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings. Further, terms such as up, down, bottom, and top are relative, and are employed to aid illustration, but are not limiting.

The components of the illustrative devices, systems and methods employed in accordance with the illustrated embodiments can be implemented, at least in part, in digital electronic circuitry, analog electronic circuitry, or in computer hardware, firmware, software, or in combinations of them. These components can be implemented, for example, as a computer program product such as a computer program, program code or computer instructions tangibly embodied in an information carrier, or in a machine-readable storage device, for execution by, or to control the operation of, data processing apparatus such as a programmable processor, a computer, or multiple computers.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network. Also, functional programs, codes, and code segments for accomplishing the illustrative embodiments can be easily construed as within the scope of claims exemplified by the illustrative embodiments by programmers skilled in the art to which the illustrative embodiments pertain. Method steps associated with the illustrative embodiments can be performed by one or more programmable processors executing a computer program, code or instructions to perform functions (e.g., by operating on input data and/or generating an output). Method steps can also be performed by, and apparatus of the illustrative embodiments can be implemented as, special purpose logic circuitry, e.g., an FPGA (field programmable gate array) or an ASIC (application-specific integrated circuit), for example.

The various illustrative logical blocks, modules, and circuits described in connection with the embodiments disclosed herein may be implemented or performed with a general purpose processor, a digital signal processor (DSP), an ASIC, a FPGA or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example, semiconductor memory devices, e.g., electrically programmable read-only memory or ROM (EPROM), electrically erasable programmable ROM (EEPROM), flash memory devices, and data storage disks (e.g., magnetic disks, internal hard disks, or removable disks, magneto-optical disks, and CD-ROM and DVD-ROM disks). The processor and the memory can be supplemented by, or incorporated in special purpose logic circuitry.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of claims exemplified by the illustrative embodiments. A software module may reside in random access memory (RAM), flash memory, ROM, EPROM, EEPROM, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. In other words, the processor and the storage medium may reside in an integrated circuit or be implemented as discrete components.

Computer-readable non-transitory media includes all types of computer readable media, including magnetic storage media, optical storage media, flash media and solid state storage media. It should be understood that software can be installed in and sold with a central processing unit (CPU) device. Alternatively, the software can be obtained and loaded into the CPU device, including obtaining the software through physical medium or distribution system, including, for example, from a server owned by the software creator or from a server not owned but used by the software creator. The software can be stored on a server for distribution over the Internet, for example.

The above-presented description and figures are intended by way of example only and are not intended to limit the illustrative embodiments in any way except as set forth in the following claims. It is particularly noted that persons skilled in the art can readily combine the various technical aspects of the various elements of the various illustrative embodiments that have been described above in numerous other ways, all of which are considered to be within the scope of the claims.

The invention claimed is:

1. A receiver for controlling operations of a remote controlled machine (RCM) device having one or more motorized controls for moving at least one component associated with the RCM device, the receiver comprising:

an antenna configured to wirelessly receive radio frequency signals;

a power interface coupled to RCM device power;

a processor; and a plurality of card slots, each card slot being configured to removably receive an expansion card chosen from a group of expansion cards having different types of control outputs, a plurality of the control outputs of the expansion cards connected to respective ones among the plurality of card slots being configurable depending on the type of the RCM device and the operations of the RCM device that are to be controlled;

wherein the processor is configured to process signals received from a remote transmitter via the antenna and generate corresponding output signals to the one or more motorized controls in the RCM device via at least one of the plurality of configurable control outputs to control the one or more motorized controls in the RCM device;

wherein the configurable control outputs are chosen from a plurality of control output types comprising a Form A relay contact output, a Form C relay contact output, a DC relay output, a latching relay output, and an analog output.

2. A receiver as recited in claim 1, wherein a quantity of the configurable control outputs can be selected from a range of 1 through 48 control outputs.

3. A receiver as recited in claim 1, wherein the group of expansion cards comprises expansion cards configured with respective ones of the plurality of control output types.

4. A receiver as recited in claim 1, further comprising a controller area network bus (CANbus) interface.

5. A receiver as recited in claim 4, wherein at least one of the expansion cards connected to a respective one of the plurality of card slots comprises a controller area network bus (CANbus) interface.

6. A receiver as recited in claim 1, further comprising at least one external card connected to the receiver via snap-track or enclosure mounting and installed through a CANbus interface.

7. A receiver as recited in claim 6, wherein that at least one external card can have outputs chosen from relay outputs to operate an AC RCM device, a DC RCM device, analog outputs to control a RCM device with variable frequency device, and a latching relay output to remain in current state during loss of power.

8. A receiver as recited in claim 7, wherein a quantity of the configurable control outputs can be selected from a range of 1 through 256 control outputs through the external expansion card.

* * * * *